United States Patent
Sekikawa et al.

(10) Patent No.: US 11,884,760 B2
(45) Date of Patent: Jan. 30, 2024

(54) PRODUCTION METHOD FOR BRANCHED CONJUGATED DIENE-BASED POLYMER, PRODUCTION METHOD FOR RUBBER COMPOSITION, PRODUCTION METHOD FOR TIRE, BRANCHED CONJUGATED DIENE-BASED POLYMER, AND BRANCHED CONJUGATED DIENE-BASED POLYMER COMPOSITION

(71) Applicant: Asahi Kasei Kabushiki Kaisha, Tokyo (JP)

(72) Inventors: Shinichi Sekikawa, Tokyo (JP); Kenta Hisamura, Tokyo (JP); Syogo Sumitani, Tokyo (JP); Yoshifumi Araki, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/116,014

(22) Filed: Dec. 9, 2020

(65) Prior Publication Data
US 2021/0189039 A1    Jun. 24, 2021

(30) Foreign Application Priority Data

| | | |
|---|---|---|
| Dec. 12, 2019 | (JP) | 2019-224387 |
| Mar. 18, 2020 | (JP) | 2020-047421 |
| Dec. 7, 2020 | (JP) | 2020-202847 |

(51) Int. Cl.
| | |
|---|---|
| C08F 236/06 | (2006.01) |
| C08K 3/04 | (2006.01) |
| C08K 3/36 | (2006.01) |
| C08J 3/20 | (2006.01) |

(52) U.S. Cl.
CPC ............ *C08F 236/06* (2013.01); *C08J 3/203* (2013.01); *C08K 3/04* (2013.01); *C08K 3/36* (2013.01); *C08J 2347/00* (2013.01)

(58) Field of Classification Search
CPC ...... C08F 236/06; C08J 3/203; C08J 2347/00; C08K 3/04; C08K 3/36
USPC ......................................................... 526/75
See application file for complete search history.

(56) References Cited

U.S. PATENT DOCUMENTS

| | | | |
|---|---|---|---|
| 4,956,485 A | 9/1990 | Leitz et al. | |
| 6,518,383 B1* | 2/2003 | Wilczek | C08F 2/38 |
| | | | 526/318 |
| 8,569,409 B2 | 10/2013 | Thiele et al. | |
| 8,729,167 B2 | 5/2014 | Thiele et al. | |
| 9,586,980 B2* | 3/2017 | Thiele | C07F 7/226 |
| 10,519,254 B2 | 12/2019 | Kyo et al. | |
| 2004/0059075 A1* | 3/2004 | Lee | C08F 290/04 |
| | | | 526/346 |
| 2007/0135583 A1* | 6/2007 | Lohse | C08G 83/003 |
| | | | 525/333.7 |
| 2008/0287601 A1 | 11/2008 | Thiele et al. | |
| 2013/0296481 A1 | 11/2013 | Tanaka | |
| 2018/0072101 A1 | 3/2018 | Janowski et al. | |
| 2018/0162959 A1 | 6/2018 | Choi et al. | |
| 2018/0223007 A1 | 8/2018 | Yukimura | |
| 2018/0305470 A1 | 10/2018 | Lee et al. | |
| 2019/0023725 A1 | 1/2019 | Mun et al. | |
| 2019/0048115 A1 | 2/2019 | Lee et al. | |
| 2021/0214484 A1 | 7/2021 | Hisamura et al. | |

FOREIGN PATENT DOCUMENTS

| | | |
|---|---|---|
| CN | 107849160 A | 3/2018 |
| CN | 108026186 A | 5/2018 |
| CN | 108368195 A | 8/2018 |
| CN | 110105495 A | 8/2019 |
| CN | 111936536 A | 11/2020 |
| EP | 2003146 A2 | 12/2008 |
| EP | 3260471 A1 | 12/2017 |
| EP | 3476866 A1 | 5/2019 |
| JP | H02-048584 A | 2/1990 |
| JP | 2009-512762 A | 3/2009 |
| JP | 2010-155935 A | 7/2010 |
| JP | 2011-089086 A | 5/2011 |
| JP | 2019-515073 A | 6/2019 |
| WO | 2007/114203 A1 | 10/2007 |
| WO | 2018/125733 A1 | 7/2008 |
| WO | 2012/096300 A1 | 7/2012 |
| WO | 2016/133154 A1 | 8/2016 |
| WO | 2017/019878 A1 | 2/2017 |
| WO | 2017/189100 A1 | 11/2017 |
| WO | 2018/119168 A1 | 6/2018 |

OTHER PUBLICATIONS

Pantazis et al. ("Anionic Polymerization of Styrenic Macromonomers," Macromolecules, 36, 3783-3785 (Year: 2003).*
Supplementary European Search Report issued in corresponding European Patent Application No. 20212868.2 dated Sep. 24, 2021.
Supplementary European Search Report issued in related European Patent Application No. 20212425.1 dated May 10, 2021.
Partial European Search Report issued in corresponding European Patent Application No. 20212868.2 dated May 27, 2021.
Pantazis et al., "Anionic Polymerization of Styrenic Macromonomers," Macromolecules, 36: 3783-3785 (2003).

* cited by examiner

*Primary Examiner* — Kelechi C Egwim
(74) *Attorney, Agent, or Firm* — Morgan, Lewis & Bockius LLP

(57) ABSTRACT

A production method for a branched conjugated diene-based polymer, comprising:
a polymerizing step of obtaining a conjugated diene-based polymer having an active end by polymerizing or copolymerizing a conjugated diene compound, or a conjugated diene compound and an aromatic vinyl compound with an alkali metal compound or an alkaline earth metal compound used as a polymerization initiator; and
a branching step of introducing a branch structure by reacting a styrene derivative as a branching agent with the active end of the conjugated diene-based polymer.

12 Claims, No Drawings

PRODUCTION METHOD FOR BRANCHED CONJUGATED DIENE-BASED POLYMER, PRODUCTION METHOD FOR RUBBER COMPOSITION, PRODUCTION METHOD FOR TIRE, BRANCHED CONJUGATED DIENE-BASED POLYMER, AND BRANCHED CONJUGATED DIENE-BASED POLYMER COMPOSITION

TECHNICAL FIELD

The present invention relates to a production method for a branched conjugated diene-based polymer, a production method for a rubber composition, a production method for a tire, a branched conjugated diene-based polymer, and a branched conjugated diene-based polymer composition.

BACKGROUND ART

There have been increasing demands for reduction of fuel consumption in vehicles from the viewpoint of an environmental load. In particular, a vehicle tire is required to be improved for low fuel consumption in a material used for a tread portion in direct contact with the ground.

Recently, development of a material having low rolling resistance, namely, having a low hysteresis loss property, has been demanded.

At the same time, there is a trend toward weight reduction of a tire, and for this purpose, it is necessary to reduce the thickness of a tire tread portion, and simultaneously, a material having high abrasion resistance is required for a tire tread portion.

On the other hand, a material used for the tire tread portion is required, from the viewpoint of safety, to be excellent in wet skid resistance and have practically sufficient fracture performance.

An example of a material meeting the aforementioned various requirements includes a rubber material containing a rubber-like polymer and a reinforcing filler such as carbon black or silica.

When a rubber material containing silica is used, balance between a low hysteresis loss property (an index of low fuel consumption) and wet skid resistance can be improved. Besides, dispersibility of silica in a rubber material is improved through introduction of a functional group having affinity or reactivity with silica into a molecular end of a rubber-like polymer having high mobility, and in addition, the mobility of the molecular end of the rubber-like polymer is reduced through a bond to a silica particle, and thus, a hysteresis loss can be reduced.

On the other hand, as a method for improving abrasion resistance, a method in which the molecular weight of a rubber-like polymer is increased can be employed. When the molecular weight of a rubber-like polymer is increased, however, processability in kneading the rubber-like polymer and a reinforcing filler tends to be deteriorated.

In consideration of these circumstances, an attempt has been made to introduce a branch structure into a rubber-like polymer in order to increase the molecular weight without impairing the processability.

For example, a resin composition of a modified conjugated diene-based polymer and silica obtained by reacting alkoxysilane having an amino group with an active end of a conjugated diene-based polymer has been conventionally proposed.

In addition, a modified conjugated diene-based polymer into which a branch structure has been introduced obtained through a coupling reaction between a polymer active end and a polyfunctional silane compound has been proposed (see, for example, Patent Documents 1 and 2).

LIST OF PRIOR ART DOCUMENTS

Patent Document

Patent Document 1: International Publication No. WO2007/114203
Patent Document 2: International Publication No. WO2016/133154

SUMMARY OF INVENTION

Problems to be Solved by Invention

In the method for introducing a branch structure into a conjugated diene-based polymer in which a coupling reaction is caused between a polymer active end and a polyfunctional silane compound, however, a branch number of a modified conjugated diene-based polymer thus obtained largely depends on the number of groups of the polyfunctional silane compound reactable with the polymer active end, and does not exceed the number of the reactable groups. From the viewpoint of synthesizability, there is a limit in the number of reactable groups that can be imparted to one polyfunctional silane, and hence, there arises a problem that there is a limit in the branch number of the modified conjugated diene-based polymer to be obtained.

Therefore, an object of the present invention is to provide a production method for a branched conjugated diene-based polymer by which a conjugated diene-based polymer having a larger branch number can be produced than in a case where a branch structure is introduced into a conjugated diene-based polymer by using a modifier or a coupling agent alone by introducing a branch point into a main chain, and in which polymer design freedom is so high that the lengths of a main chain and a side chain can be adjusted, whereby providing a production method for a branched conjugated diene-based polymer excellent in low fuel consumption performance, abrasion resistance, wet skid resistance, and fracture strength.

Means for Solving Problems

The present inventors have studied earnestly to solve the above-described problems of the related art, consequently found that a production method for a branched conjugated diene-based polymer in which a branch point can be introduced into a main chain by reacting a conjugated diene-based polymer having an active end with a specific styrene derivative used as a branching agent, and completed the present invention.

Specifically, the present invention is as follows.

[1] A production method for a branched conjugated diene-based polymer, comprising:
a polymerizing step of obtaining a conjugated diene-based polymer having an active end by polymerizing or copolymerizing a conjugated diene compound, or a conjugated diene compound and an aromatic vinyl compound with an alkali metal compound or an alkaline earth metal compound used as a polymerization initiator; and
a branching step of introducing a branch structure by reacting a styrene derivative as a branching agent with the active end of the conjugated diene-based polymer.

[2] The production method for the branched conjugated diene-based polymer according to [1], further comprising: a step of adding a conjugated diene compound and/or an aromatic vinyl compound to a reaction system during and/or after the branching step.

[3] The production method for the branched conjugated diene-based polymer according to [1] or [2], further comprising:
a reaction step of reacting a coupling agent or a polymerization terminator with the active end of the conjugated diene-based polymer resulting from the branching step.

[4] The production method for the branched conjugated diene-based polymer according to [3], wherein the coupling agent is, in the reaction step, a silane sulfide compound represented by the following formula (3):

wherein Si represents a silicon atom, O represents an oxygen atom, and S represents a sulfur atom;
x represents an integer of 1 to 3, y represents 0, or an integer of 1 to 2, and x+y is 3; and
$R^1$, $R^2$, and $R^4$ may be the same or different, and represent an alkyl group having 1 to 16 carbon atoms, and $R^3$ represents an aryl group having 6 to 16 carbon atoms, an alkylene group having 1 to 16 carbon atoms, or an alkyl chain having 1 to 16 carbon atoms.

[5] The production method for the branched conjugated diene-based polymer according to any one of [1] to [4], wherein the styrene derivative is a compound represented by the following formula (1) and/or formula (2):

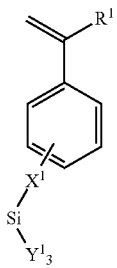

(1)

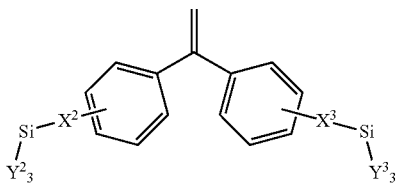

(2)

wherein $R^1$ represents any one selected from the group consisting of a hydrogen atom, an alkyl group having 1 to 20 carbon atoms, and an aryl group having 6 to 20 carbon atoms, and may have a branch structure in a part thereof;
$X^1$, $X^2$ and $X^3$ represent a single bond, or an organic group containing any one selected from the group consisting of carbon, hydrogen, nitrogen, sulfur, and oxygen,
$Y^1$, $Y^2$ and $Y^3$ represent any one selected from the group consisting of an alkyl group having 1 to 20 carbon atoms, an alkoxy group having 1 to 20 carbon atoms, and a halogen atom; and they are respectively independent and may be the same or different.

[6] A production method for a rubber composition, comprising:
a step of obtaining a branched conjugated diene-based polymer by the production method according to any one of [1] to [5];
a step of obtaining a rubber component containing 10% by mass or more of the branched conjugated diene-based polymer; and
a step of obtaining a rubber composition by causing 5.0 parts by mass or more and 150 parts by mass or less of a filler to be contained based on 100 parts by mass of the rubber component.

[7] A production method for a tire, comprising:
a step of obtaining a rubber composition by the production method for the rubber composition according to [6]; and
a step of obtaining a tire by molding the rubber composition.

[8] A branched conjugated diene-based polymer, having 1 or more side chains in a polymer chain, and having a branch number (Bn) obtained by viscosity detector-equipped GPC-light scattering measurement of 1 or more,
wherein the branched conjugated diene-based polymer comprises a sulfur atom and a silicon atom, a molar ratio of the silicon atom to the sulfur atom being 1.05 or more and less than 10, and has a Mooney viscosity measured at 100° C. of 40 or more and 170 or less.

[9] The branched conjugated diene-based polymer according to [8], wherein the branch number (Bn) obtained by viscosity detector-equipped GPC-light scattering measurement is 2 or more and 25 or less.

[10] The branched conjugated diene-based polymer according to [8] or [9],
wherein the branched conjugated diene-based polymer has, in the polymer chain, a portion derived from a vinyl-based monomer containing an alkoxysilyl group or a halosilyl group, and has a side chain in the portion derived from the vinyl-based monomer containing an alkoxysilyl group or a halosilyl group.

[11] The branched conjugated diene-based polymer according to [10],
wherein the portion derived from the vinyl-based monomer containing an alkoxysilyl group or a halosilyl group is a monomer unit based on a compound represented by the following formula (4) or (5), and has a branch point of a polymer chain containing the monomer unit based on the compound represented by the formula (4) or (5):

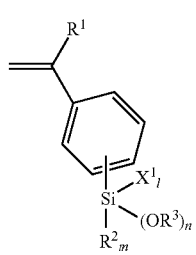

(4)

-continued

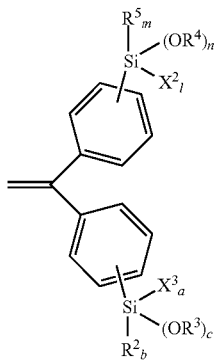
(5)

wherein, in the formula (4), $R^1$ represents a hydrogen atom, or an alkyl group having 1 to 20 carbon atoms or an aryl group having 6 to 20 carbon atoms, and may have a branch structure in a part thereof;

$R^2$ and $R^3$ each independently represent an alkyl group having 1 to 20 carbon atoms, or an aryl group having 6 to 20 carbon atoms, and may have a branch structure in a part thereof;

each of $R^1$ to $R^3$, if present in a plural number, is respectively independent;

$X^1$ represents an independent halogen atom; and m represents an integer of 0 to 2, n represents an integer of 0 to 3, l represents an integer of 0 to 3, and (m+n+l) is 3; and in the formula (5), $R^2$ to $R^5$ each independently represent an alkyl group having 1 to 20 carbon atoms, or an aryl group having 6 to 20 carbon atoms, and may have a branch structure in a part thereof, and each of $R^2$ to $R^5$, if present in a plural number, is respectively independent;

$X^2$ and $X^3$ represent an independent halogen atom;

m represents an integer of 0 to 2, n represents an integer of 0 to 3, l represents an integer of 0 to 3, and (m+n+l) is 3; and a represents an integer of 0 to 2, b represents an integer of 0 to 3, c represents an integer of 0 to 3, and (a+b+c) is 3.

[12] The branched conjugated diene-based polymer according to any one of [8] to [11],
wherein at least one end of the branched conjugated diene-based polymer is modified with a silane sulfide compound represents by the following formula (3):

(3)

wherein Si represents a silicon atom, O represents an oxygen atom, and S represents a sulfur atom;

x represents an integer of 1 to 3, y represents 0, or an integer of 1 to 2, and x+y is 3; and $R^1$, $R^2$, and $R^4$ may be the same or different, and represent an alkyl group having 1 to 16 carbon atoms, and $R^3$ represents an aryl group having 6 to 16 carbon atoms, an alkylene group having 1 to 16 carbon atoms, or an alkyl chain having 1 to 16 carbon atoms.

[13] A branched conjugated diene-based polymer composition, comprising:
10% by mass or more and less than 100% by mass of a branched conjugated diene-based polymer, having 1 or more side chains in a polymer chain, having a branch number (Bn) obtained by viscosity detector-equipped GPC-light scattering method of 1 or more, containing a sulfur atom and a silicon atom in the conjugated diene-based polymer, a molar ratio of the silicon atom to the sulfur atom being 1.05 or more and less than 10, and having a Mooney viscosity measured at 100° C. of 40 or more and 170 or less.

[14] The branched conjugated diene-based polymer composition according to [13], wherein the branched conjugated diene-based polymer contains a branched conjugated diene-based polymer coupled with at least one compound selected from the group consisting of tin halide, tin alkoxide, silicon halide, and alkoxysilane.

Advantages of Invention

According to the present invention, a production method for a branched conjugated diene-based polymer by which a branched conjugated diene-based polymer having a larger branch number can be produced by introducing a branch point into a main chain than in a case using a coupling agent alone, and in which polymer design freedom is so high that the lengths of a main chain and a side chain can be adjusted can be provided, and thus, a production method for a branched conjugated diene-based polymer excellent in low fuel consumption performance, abrasion resistance, wet skid resistance, and fracture strength can be provided.

MODE FOR CARRYING OUT INVENTION

Now, an embodiment for practicing the present invention (hereinafter referred to as the "present embodiment") will be described in detail.

It is noted that the following present embodiment is merely an example for describing the present invention and the present invention is not limited to the following description but may be variously modified within the scope thereof.

[Production Method for Branched Conjugated Diene-Based Polymer]

A production method for a branched conjugated diene-based polymer of the present embodiment includes: a polymerizing step of obtaining a conjugated diene-based polymer having an active end by polymerizing or copolymerizing a conjugated diene compound, or a conjugated diene compound and an aromatic vinyl compound with an alkali metal compound or an alkaline earth metal compound used as a polymerization initiator; and a branching step of introducing a branch structure by reacting a styrene derivative as a branching agent with the active end of the conjugated diene-based polymer.

The conjugated diene-based polymer contained in a branched conjugated diene-based polymer may be any one of a homopolymer of a single conjugated diene compound, a polymer, namely, a copolymer, of different kinds of conjugated diene compounds, and a copolymer of a conjugated diene compound and an aromatic vinyl compound.

According to the production method for the branched conjugated diene-based polymer of the present embodiment, a conjugated diene-based polymer having a larger branch number can be produced by introducing a branch point into a main chain than in a case of introducing a branch structure into a conjugated diene-based polymer by using a coupling agent alone, and in addition, the lengths of a main chain and a side chain can be adjusted.

(Polymerizing Step)

In the polymerizing step of the production method for the branched conjugated diene-based polymer of the present embodiment, a conjugated diene-based polymer having an active end is obtained by polymerizing or copolymerizing a conjugated diene compound or a conjugated diene compound and an aromatic vinyl compound with an alkali metal compound or an alkaline earth metal compound used as a polymerization initiator.

In the polymerizing step, the polymerization is performed preferably by a growth reaction by a living anionic polymerization reaction, and thus, a conjugated diene-based polymer having an active end can be obtained.

<Polymerization Initiator>

As the polymerization initiator, an alkali metal compound or an alkaline earth metal compound is used.

As the polymerization initiator, an organic lithium-based compound is preferably used, and an organomonolithium compound is more preferably used.

Examples of the organomonolithium compound include, but are not limited to, an organomonolithium compound of a low molecular weight compound, and an organomonolithium compound of a soluble oligomer.

As the organomonolithium compound, with respect to a bonding mode between an organic group and lithium thereof, any one of, for example, a compound having a carbon-lithium bond, a compound having a nitrogen-lithium bond, and a compound having a tin-lithium bond can be used.

An amount of the polymerization initiator to be used is preferably determined on the basis of the molecular weight of a target conjugated diene-based polymer.

A ratio of the amount of a monomer such as a conjugated diene compound to be used to the amount of the polymerization initiator to be used relates to the degree of polymerization of the target conjugated diene-based polymer. In other words, there is a tendency that it relates to the number average molecular weight and/or the weight average molecular weight.

Accordingly, in order to increase the molecular weight of the conjugated diene-based polymer, adjustment may be made to reduce the amount of the polymerization initiator, and in order to reduce the molecular weight, the adjustment may be made to increase the amount of the polymerization initiator.

From the viewpoint that it is used as one method for introducing a nitrogen atom into a conjugated diene-based polymer, the organomonolithium compound is preferably an alkyl lithium compound having a substituted amino group or dialkylamino lithium.

In this case, a conjugated diene-based polymer having, at a polymerization starting end, a nitrogen atom of an amino group is obtained.

The substituted amino group refers to an amino group having no active hydrogen or having a structure in which active hydrogen is protected.

Examples of an alkyl lithium compound containing an amino group having no active hydrogen include, but are not limited to, 3-dimethylaminopropyl lithium, 3-diethylaminopropyl lithium, 4-(methylpropylamino)butyl lithium and 4-hexamethyleneiminobutyl lithium.

Examples of an alkyl lithium compound containing an amino group having a structure in which active hydrogen is protected include, but are not limited to, 3-bistrimethylsilylaminopropyl lithium and 4-trimethylsilylmethylaminobutyl lithium.

Examples of the dialkylamino lithium include, but are not limited to, lithium dimethylamide, lithium diethylamide, lithium dipropylamide, lithium dibutylamide, lithium di-n-hexylamide, lithium diheptylamide, lithium diisopropylamide, lithium dioctylamide, lithium-di-2-ethylhexylamide, lithium didecylamide, lithium ethylpropylamide, lithium ethylbutylamide, lithium ethylbenzylamide, lithium methylphenetylamide, lithium hexamethyleneimide, lithium pyrrolidide, lithium piperidide, lithium heptamethyleneimide, lithium morpholide, 1-lithioazacyclooctane, 6-lithio-1,3,3-trimethyl-6-azabicyclo[3.2.1] octane, and 1-lithio-1,2,3,6-tetrahydropyridine.

Such an organomonolithium compound having a substituted amino group can be reacted with a small amount of a polymerizable monomer, such as 1,3-butadiene, isoprene or styrene, to be used as an organomonolithium compound of an oligomer soluble in normal hexane or cyclohexane.

From the viewpoint of the industrial availability and the controllability of the polymerization reaction, the organomonolithium compound is preferably an alkyl lithium compound. In this case, a conjugated diene-based polymer having an alkyl group at a polymerization starting end can be obtained.

Examples of the alkyl lithium compound include, but are not limited to, n-butyllithium, sec-butyllithium, tert-butyllithium, n-hexyllithium, benzyllithium, phenyllithium, and stilbene lithium.

From the viewpoint of the industrial availability and the controllability of the polymerization reaction, the alkyl lithium compound is preferably n-butyllithium or sec-butyllithium.

One of these organomonolithium compounds may be singly used, or two or more of these may be used together. Alternatively, another organic metal compound may be used together.

Examples of such another organic metal compound include alkaline earth metal compounds, other alkali metal compounds, and other organic metal compounds.

Examples of the alkaline earth metal compounds include, but are not limited to, organic magnesium compounds, organic calcium compounds and organic strontium compounds. Other examples include compounds of alkoxides, sulfonates, carbonates and amides of alkaline earth metals.

Examples of the organic magnesium compounds include dibutyl magnesium and ethyl butyl magnesium.

Examples of the other organic metal compounds include organic aluminum compounds.

Examples of a polymerization reaction mode employed in the polymerizing step include, but are not limited to, batch and continuous polymerization reaction modes.

In the continuous mode, one reactor or two or more connected reactors can be used. As a reactor for the continuous mode, for example, a tank or tubular reactor equipped with a stirrer can be used. In the continuous mode, preferably, a monomer, an inert solvent and a polymerization initiator are continuously fed to the reactor, a polymer solution containing a polymer is obtained in the reactor, and the polymer solution is continuously discharged.

As a reactor for the batch mode, for example, a tank reactor equipped with a stirrer is used. It is preferable, in the batch mode, that a monomer, an inert solvent and a polymerization initiator are fed to the reactor, the monomer is continuously or intermittently additionally fed if necessary during the polymerization, a polymer solution containing a polymer is obtained in the reactor, and the polymer solution is discharged after completing the polymerization.

In the production method for the branched conjugated diene-based polymer of the present embodiment, in order to obtain a conjugated diene-based polymer having an active end at a high ratio in the polymerizing step, the continuous mode in which a polymer is continuously discharged to be supplied to a next reaction in a short period of time is preferably employed. In the continuous mode, the number of reactors is not especially limited, and one reactor or two or more connected reactors can be used. A reactor capable of obtaining a sufficient contact between a monomer and a polymerization initiator in a solution is preferably used, and a tank or tubular reactor equipped with a stirrer is used. The number of reactors can be appropriately selected, and one reactor is preferably used from the viewpoint of saving space in a manufacturing facility, or two or more reactors are preferably used from the viewpoint of improving productivity. When two or more reactors are used, it is more preferable that a branching agent described later is added in a second or following reactor.

In the polymerizing step for a conjugated diene-based polymer, the polymerization is performed preferably in an inert solvent.

Examples of the inert solvent include hydrocarbon-based solvents such as saturated hydrocarbons and aromatic hydrocarbons. Examples of the hydrocarbon-based solvent include, but are not limited to, aliphatic hydrocarbons such as butane, pentane, hexane and heptane; alicyclic hydrocarbons such as cyclopentane, cyclohexane, methylcyclopentane and methylcyclohexane; aromatic hydrocarbons such as benzene, toluene and xylene; and a hydrocarbon containing a mixture of any of these.

Impurities of allenes and acetylenes are preferably treated with an organic metal compound before the solvent is supplied to the polymerization reaction because thus, a conjugated diene-based polymer having an active end in a high concentration tends to be obtained, and a modified conjugated diene-based polymer having a high modification ratio tends to be obtained.

In the polymerizing step, a polar compound (a polar material) may be added. Thus, an aromatic vinyl compound can be randomly copolymerized with a conjugated diene compound. In addition, the polar compound tends to be usable also as a vinylation agent for controlling a microstructure of a conjugated diene portion. Besides, it tends to be advantageous for, for example, acceleration of the polymerization reaction.

Examples of the polar compound include, but are not limited to, ethers such as tetrahydrofuran, diethyl ether, dioxane, ethylene glycol dimethyl ether, ethylene glycol dibutyl ether, diethylene glycol dimethyl ether, diethylene glycol dibutyl ether, dimethoxybenzene, and 2,2-bis(2-oxolanyl)propane; tertiary amine compounds such as tetramethylethylenediamine, dipiperidinoethane, trimethylamine, triethylamine, pyridine, and quinuclidine; alkali metal alkoxide compounds such as potassium-tert-amylate, potassium-tert-butylate, sodium-tert-butylate, and sodium amylate; and phosphine compounds such as triphenylphosphine.

One of these polar compounds may be singly used, or two or more of these may be used together.

The amount of the polar compound to be used is not especially limited but can be selected in accordance with the purpose or the like, and is preferably 0.01 mol or more and 100 mol or less per mole of the polymerization initiator.

Such a polar compound (a vinylation agent) can be used, as a microstructure modifier for a conjugated diene portion of the conjugated diene-based polymer, in an appropriate amount in accordance with a desired amount of bound vinyl.

There is a tendency that many of polar compounds simultaneously have a randomizing effect effective in copolymerization of a conjugated diene compound and an aromatic vinyl compound, and can be used as an adjuster for an aromatic vinyl compound distribution, and as an adjuster for a styrene block amount.

As a method for randomizing the conjugated diene compound and the aromatic vinyl compound, for example, a method as described in Japanese Patent Laid-Open No. 59-140211 in which a copolymerization reaction is started with the whole amount of styrene and a part of 1,3-butadiene with the rest of 1,3-butadiene intermittently added during the copolymerization reaction may be employed.

In the polymerizing step, a polymerization temperature is preferably a temperature at which living anionic polymerization proceeds, and from the viewpoint of productivity, is more preferably 0° C. or more and 120° C. or less.

If the polymerization temperature falls in this range, there is a tendency that a reaction amount of the branching agent and the coupling agent reacted to the active end after completing the polymerization can be sufficiently attained. The polymerization temperature is further preferably 50° C. or more and 100° C. or less.

(Branching Step)

In the production method for the branched conjugated diene-based polymer of the present embodiment, the branching step of reacting a styrene derivative as a branching agent with the active end of the conjugated diene-based polymer resulting from the polymerizing step is performed.

The branching agent is polymerized with a monomer with retaining polymerization activity, and an active end of another polymer chain is reacted with a functional group of the branching agent, and thus, a branch structure is formed in the polymer. It is possible to form another branch structure by polymerizing and reacting the branched conjugated diene-based polymer in which the branch structure has been thus introduced further with a monomer and the branching agent, and a modified conjugated diene-based polymer can be obtained through a reaction with a modifier having a functional group, or a polymer chain can be further elongated through a coupling reaction. In this manner, when a styrene derivative that has a functional group reacting with the polymer active end while continuing the polymerization reaction as an aromatic vinyl compound is used as the branching agent, a branched conjugated diene-based polymer can be obtained.

<Branching Agent>

From the viewpoints of continuity of the polymerization and prevention of gelation, the styrene derivative used as the branching agent in the branching step needs to have, as a main skeleton, a skeleton having merely one active end remaining in a branch portion after the branching reaction, and a styrene derivative portion formed after the branching reaction needs to have reactivity sufficiently reactive to an active end of another polymer.

More specifically, the styrene derivative used as the branching agent is preferably a compound having a vinyl group in a benzene ring, and having a functional group quantitatively reacting with the polymer active end in the living anionic polymerization. The functional group of the styrene derivative and the polymer active end react with each other in a one-on-one manner, the functional group is eliminated to form a single bond, and a polymerization reaction is caused between the vinyl group and another monomer present in the reactor, and thus, a branch structure is formed in the polymer. A functional group excluding the vinyl group of the styrene derivative is a group to be eliminated through a nucleophilic substitution reaction with the polymer active end in the living anionic polymerization, and examples of such a functional group include an alkoxy group, halogen, an ester group, a formyl group, a ketone group, an amide group, an acid chloride group, an acid anhydride group, and an epoxy group.

Since the styrene derivative has the above-described structure, the styrene derivative is incorporated into a main chain with retaining the polymerization activity as styrene, another monomer is polymerized with the end having retained activity, and thus, the polymer chain is further elongated. Besides, the functional group of the thus incorporated styrene derivative is reacted with an active end of another polymer chain to form a bond, and thus, a branch structure is formed. When such a reaction repeatedly occurs, branches of the polymer chain increase, so as to make the polymer structure more complicated and to increase the molecular weight.

From the viewpoints of the continuity of the polymerization and controllability of the polymer structure, a functional group eliminated after the reaction of the styrene derivative portion with the active end of another polymer chain needs to have small inhibitory action in the polymerization. Here, the term "to have small inhibitory action in the polymerization" means that activity decrease or the like caused, as a side reaction of the anionic polymerization, through a chain transfer reaction, deactivation in the middle of polymerization, increase in a degree of association of the polymer, is small.

The functional group contained in the styrene derivative used as the branching agent needs to be one that does not excessively improve the polymerization activity, and further needs to be one that does not deactivate the polymerization activity. If a polymer is polymerized by the living anionic polymerization, it is significant that the functional group does not have a hydrogen atom as a functional group not deactivating the active end and is a hard base according to definition based on Pearson's HSAB principle, and specific examples include an alkoxy group and a halogen group. Not only from the viewpoint of the reactivity with the active end but also from the viewpoint that the eliminated functional group does not inhibit the polymerization, the structure of the styrene derivative to be used as the branching agent in the production method of the present embodiment can be selected among these.

More specifically, from the viewpoint of suppressing a chain transfer reaction, suppressing deactivation of the active end and preventing gelation, a branching agent represented by the following formula (1) having a styrene skeleton as a main skeleton, or the following formula (2) having a diphenylethylene skeleton as a main skeleton is preferably used.

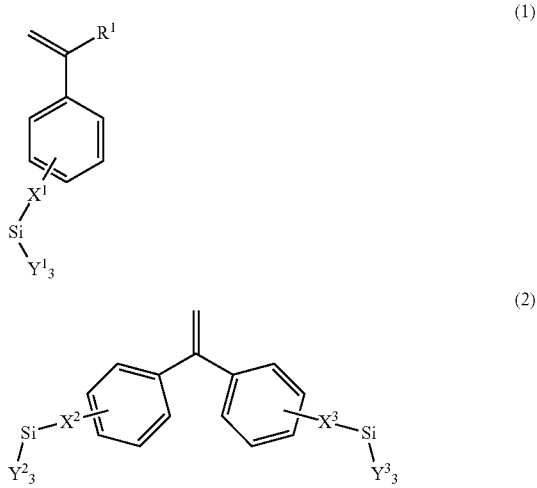

wherein $R^1$ represents any one selected from the group consisting of a hydrogen atom, an alkyl group having 1 to 20 carbon atoms, and an aryl group having 6 to 20 carbon atoms, and may have a branch structure in a part thereof;

$X^1$, $X^2$ and $X^3$ represent a single bond, or an organic group containing any one selected from the group consisting of carbon, hydrogen, nitrogen, sulfur, and oxygen, $Y^1$, $Y^2$ and $Y^3$ represent any one selected from the group consisting of an alkyl group having 1 to 20 carbon atoms, an alkoxy group having 1 to 20 carbon atoms, and a halogen atom; and they are respectively independent and may be the same or different.

In the styrene derivative used as the branching agent in the branching step, from the viewpoint of improving the branch number in the polymerization, it is preferable that $R^1$ is a hydrogen atom and $Y^1$ is any one selected from the group consisting of an alkyl group having 1 to 20 carbon atoms, an alkoxy group having 1 to 20 carbon atoms, and a halogen atom in the formula (1).

Alternatively, in the present embodiment, in the styrene derivative used as the branching agent in the branching step, from the viewpoint of improving the branch number, it is preferable that $Y^2$ is any one selected from the group consisting of an alkyl group having 1 to 20 carbon atoms, an alkoxy group having 1 to 20 carbon atoms, and a halogen atom in the formula (2).

In the present embodiment, in the styrene derivative used as the branching agent in the branching step, from the viewpoints of the continuity of the polymerization and improving the branch number, it is more preferable that $R^1$ is a hydrogen atom and $Y^1$ is alkoxy group having 1 to 20 carbon atoms or a halogen atom in the formula (1)

In the present embodiment, in the styrene derivative used as the branching agent in the branching step, it is preferable, from the viewpoint of continuity of the polymerization and improvement of a branch number, that $Y^2$ is an alkoxy group or a halogen atom, and $Y^3$ is an alkoxy group having 1 to 20 carbon atoms or a halogen atom in the formula (2).

In the present embodiment, in the styrene derivative used as the branching agent in the branching step, it is more preferable, from the viewpoint of continuity of the polymerization, improvement of a branch number, and improvement of a modification ratio, that $R^1$ is a hydrogen atom, and $Y^1$ is an alkoxy group having 1 to 20 carbon atoms in the formula (1).

In the present embodiment, in the styrene derivative used as the branching agent in the branching step, it is further preferable, from the viewpoint of continuity of the polymerization, improvement of a branch number, and further improvement of a modification ratio, that $R^1$ is a hydrogen atom, $X^1$ is a single bond, and $Y^1$ is an alkoxy group having 1 to 20 carbon atoms in the formula (1).

In the present embodiment, in the styrene derivative used as the branching agent in the branching step, from the viewpoints of the continuity of the polymerization, improving the branch number, and further improving the modification ratio, it is still further preferable that $X^2$ is a single bond, $Y^2$ is an alkoxy group having 1 to 20 carbon atoms or a halogen atom, $X^3$ is a single bond, and $Y^3$ is an alkoxy group having 1 to 20 carbon atoms or a halogen atom in the formula (2).

Examples of the branching agent represented by the formula (1) include, but are not limited to, trimethoxy(4-vinylphenyl)silane, triethoxy(4-vinylphenyl)silane, tripropoxy(4-vinylphenyl)silane, tributoxy(4-vinylphenyl)silane, triisopropoxy(4-vinylphenyl)silane, trimethoxy(3-vinylphenyl)silane, triethoxy(3-vinylphenyl)silane, tripropoxy(3-vinylphenyl)silane, tributoxy(3-vinylphenyl)silane, triisopropoxy(3-vinylphenyl)silane, trimethoxy(2-vinylphenyl)silane, triethoxy(2-vinylphenyl)silane, tripropoxy(2-vinylphenyl)silane, tributoxy(2-vinylphenyl)silane, triisopropoxy(2-vinylphenyl)silane, dimethoxymethyl(4-vinylphenyl)silane, diethoxymethyl(4-vinylphenyl)silane, dipropoxymethyl(4-vinylphenyl)silane, dibutoxymethyl(4-vinylphenyl)silane, diisopropoxymethyl(4-vinylphenyl)silane, dimethoxymethyl(3-vinylphenyl)silane, diethoxymethyl(3-vinylphenyl)silane, dipropoxymethyl(3-vinylphenyl)silane, dibutoxymethyl(3-vinylphenyl)silane, diisopropoxymethyl(3-vinylphenyl)silane, dimethoxymethyl(2-vinylphenyl)silane, diethoxymethyl(2-vinylphenyl)silane, dipropoxymethyl(2-vinylphenyl)silane, dibutoxymethyl(2-vinylphenyl)silane, diisopropoxymethyl(2-vinylphenyl)silane, dimethylmethoxy(4-vinylphenyl)silane, dimethylethoxy(4-vinylphenyl)silane, dimethylpropoxy(4-vinylphenyl)silane, dimethylbutoxy(4-vinylphenyl)silane, dimethylisopropoxy(4-vinylphenyl)silane, dimethylmethoxy(3-vinylphenyl)silane, dimethylethoxy(3-vinylphenyl)silane, dimethylpropoxy(3-vinylphenyl)silane, dimethylbutoxy(3-vinylphenyl)silane, dimethylisopropoxy(3-vinylphenyl)silane, dimethylmethoxy(2-vinylphenyl)silane, dimethylethoxy(2-vinylphenyl)silane, dimethylpropoxy(2-vinylphenyl)silane, dimethylbutoxy(2-vinylphenyl)silane, dimethylisopropoxy(2-vinylphenyl)silane, trimethoxy(4-isopropenylphenyl)silane, triethoxy(4-isopropenylphenyl)silane, tripropoxy(4-isopropenylphenyl)silane, tributoxy(4-isopropenylphenyl)silane, triisopropoxy(4-isopropenylphenyl)silane, trimethoxy(3-isopropenylphenyl)silane, triethoxy(3-isopropenylphenyl)silane, tripropoxy(3-isopropenylphenyl)silane, tributoxy(3-isopropenylphenyl)silane, triisopropoxy(3-isopropenylphenyl)silane, trimethoxy(2-isopropenylphenyl)silane, triethoxy(2-isopropenylphenyl)silane, tripropoxy(2-isopropenylphenyl)silane, tributoxy(2-isopropenylphenyl)silane, triisopropoxy(2-isopropenylphenyl)silane, dimethoxymethyl(4-isopropenylphenyl)silane, diethoxymethyl(4-isopropenylphenyl)silane, dipropoxymethyl(4-isopropenylphenyl)silane, dibutoxymethyl(4-isopropenylphenyl)silane, diisopropoxymethyl(4-isopropenylphenyl)silane, dimethoxymethyl(3-isopropenylphenyl)silane, diethoxymethyl(3-isopropenylphenyl)silane, dipropoxymethyl(3-isopropenylphenyl)silane, dibutoxymethyl(3-isopropenylphenyl)silane, diisopropoxymethyl(3-isopropenylphenyl)silane, dimethoxymethyl(2-isopropenylphenyl)silane, diethoxymethyl(2-isopropenylphenyl)silane, dipropoxymethyl(2-isopropenylphenyl)silane, dibutoxymethyl(2-isopropenylphenyl)silane, diisopropoxymethyl(2-isopropenylphenyl)silane, dimethylmethoxy(4-isopropenylphenyl)silane, dimethylethoxy(4-isopropenylphenyl)silane, dimethylpropoxy(4-isopropenylphenyl)silane, dimethylbutoxy(4-isopropenylphenyl)silane, dimethylisopropoxy(4-isopropenylphenyl)silane, dimethylmethoxy(3-isopropenylphenyl)silane, dimethylethoxy(3-isopropenylphenyl)silane, dimethylpropoxy(3-isopropenylphenyl)silane, dimethylbutoxy(3-isopropenylphenyl)silane, dimethylisopropoxy(3-isopropenylphenyl)silane, dimethylmethoxy(2-isopropenylphenyl)silane, dimethylethoxy(2-isopropenylphenyl)silane, dimethylpropoxy(2-isopropenylphenyl)silane, dimethylbutoxy(2-isopropenylphenyl)silane, dimethylisopropoxy(2-isopropenylphenyl)silane, trichloro(4-vinylphenyl)silane, trichloro(3-vinylphenyl)silane, trichloro(2-vinylphenyl)silane, tribromo(4-vinylphenyl)silane, tribromo(3-vinylphenyl)silane, tribromo(2-vinylphenyl)silane, dichloromethyl(4-vinylphenyl)silane, dichloromethyl(3-vinylphenyl)silane, dichloromethyl(2-vinylphenyl)silane, dibromomethyl(4-vinylphenyl)silane, dibromomethyl(3-vinylphenyl)silane, dibromomethyl(2-vinylphenyl)silane, dimethylchloro(4-vinylphenyl)silane, dimethylchloro(3-vinylphenyl)silane, dimethylchloro(2-vinylphenyl)silane, dimethylbromo(4-vinylphenyl)silane, dimethylbromo(3-vinylphenyl)silane, dimethylbromo(2-vinylphenyl)silane, trimethoxy(4-vinylbenzyl)silane, triethoxy(4-vinylbenzyl)silane, and tripropoxy(4-vinylbenzyl)silane.

Among these, trimethoxy(4-vinylphenyl)silane, triethoxy(4-vinylphenyl)silane, tripropoxy(4-vinylphenyl)silane, tributoxy(4-vinylphenyl)silane, triisopropoxy(4-vinylphenyl)silane, trimethoxy(3-vinylphenyl)silane, triethoxy(3-vinylphenyl)silane, tripropoxy(3-vinylphenyl)silane, tributoxy(3-vinylphenyl)silane, triisopropoxy(3-vinylphenyl)silane, and trichloro(4-vinylphenyl)silane are preferred, and trimethoxy(4-vinylphenyl)silane, triethoxy(4-vinylphenyl)silane, tripropoxy(4-vinylphenyl)silane, tributoxy(4-vinylphenyl)silane, triisopropoxy(4-vinylphenyl)silane, trimethoxy(4-vinylbenzyl)silane, and triethoxy(4-vinylbenzyl)silane are more preferred, and trimethoxy(4-vinylphenyl)silane, and triethoxy(4-vinylphenyl)silane are further preferred.

Examples of the branching agent represented by the formula (2) include, but are not limited to, 1-bis(4-trimethoxysilylphenyl)ethylene, 1,1-bis(4-triethoxysilylphenyl)ethylene, 1,1-bis(4-tripropoxysilylphenyl)ethylene, 1,1-bis(4-tripentoxysilylphenyl)ethylene, 1,1-bis(4-triisopropoxysilylphenyl)ethylene, 1,1-bis(3-trimethoxysilylphenyl)ethylene, 1,1-bis(3-triethoxysilylphenyl)ethylene, 1,1-bis(3-tripropoxysilylphenyl)ethylene, 1,1-bis(3-tripentoxysilylphenyl)ethylene, 1,1-bis(3-triisopropoxysilylphenyl)ethylene, 1,1-bis(2-trimethoxysilylphenyl)ethylene, 1,1-bis(2-triethoxysilylphenyl)ethylene, 1,1-bis(3-tripropoxysilylphenyl)ethylene, 1,1-bis(2-tripentoxysilylphenyl)ethylene, 1,1-bis(2-triisopropoxysilylphenyl)ethylene, 1,1-bis(4-(dimethylmethoxysilyl)phenyl)ethylene, 1,1-bis(4-(diethylmethoxysilyl)phenyl)ethylene, 1,1-bis(4-(dipropylmethoxysilyl)phenyl)ethylene, 1,1-bis(4-(dimethylethoxysilyl)phenyl)ethylene, 1,1-bis(4-(diethylethoxysilyl)phenyl)ethylene, 1,1-bis(4-(dipropylethoxysilyl)phenyl)ethylene, 1,1-bis(4-trimethoxysilylbenzyl)ethylene, 1,1-bis(4-triethoxysilylbenzyl)ethylene, 1,1-bis(4-tripropoxysilylbenzyl)ethylene, and 1,1-bis(4-tripentoxysilylbenzyl)ethylene.

Among these, 1,1-bis(4-trimethoxysilylphenyl)ethylene, 1,1-bis(4-triethoxysilylphenyl)ethylene, 1,1-bis(4-tripropoxysilylphenyl)ethylene, 1,1-bis(4-tripentoxysilylphenyl)ethylene, and 1,1-bis(4-triisopropoxysilylphenyl)ethylene are preferred, and 1,1-bis(4-trimethoxysilylphenyl)ethylene is more preferred.

If the branching agent represented by the formula (1) or (2) is used, the branch number is improved, and an effect of improving the abrasion resistance and the processability can be obtained.

The timing of adding the branching agent is not especially limited and can be selected in accordance with the purpose or the like, and from the viewpoints of improvement of an absolute molecular weight of the conjugated diene-based polymer and improvement of a coupling ratio, the timing is timing, after adding the polymerization initiator, when a raw material conversion rate is preferably 20% or more, more preferably 40% or more, further preferably 50% or more, still further preferably 65% or more, and much further preferably 75% or more.

During and/or after the branching step, a monomer corresponding to a desired raw material may be additionally added to a reaction system to continue the polymerizing step after the branching step, or the above-described process may be repeated.

It is noted that the term "after the branching step" refers to after the addition of the branching agent.

The monomer to be additionally added is not especially limited, but is preferably a conjugated diene compound and/or an aromatic vinyl compound. Particularly when the monomer is additionally added in the branching step, from the viewpoint of the improvement of the modification ratio of the conjugated diene-based polymer by reducing steric hindrance at a branch point, the amount of the monomer to be additionally added is preferably 5% or more, more preferably 10% or more, further preferably 15% or more, still further preferably 20% or more, and much further preferably 25% or more based on the total amount of conjugated diene-based monomers, for example, the total amount of butadiene, used in the polymerizing step. In such a case, it is preferable, from the viewpoint of the improvement of the modification ratio, that the monomer is additionally added by continuous polymerization process in the branching step in an amount of 5% or more of the total amount of conjugated diene-based monomers, for example, the total amount of butadiene, used in the polymerizing step.

Since the lengths of a main chain and a side chain can be adjusted in accordance with the timing of adding the branching agent and the amount of the monomer to be additionally added, the polymer design freedom is high.

The branch structure of the branched conjugated diene-based polymer obtained in the branching step of the production method for the branched conjugated diene-based polymer of the present embodiment has preferably 3 branches or more and 24 branches or less, more preferably 4 branches or more and 20 branches or less, and further preferably 5 branches or more and 18 branches or less.

If the number of branches is 24 or less, there is a tendency that it is easy to obtain a modified conjugated diene-based polymer through a reaction with a modifier having a functional group, or to further elongate the polymer chain through a coupling reaction, and if the number of branches is 3 or more, the resultant branched conjugated diene-based polymer tends to be excellent in processability and abrasion resistance.

An amount of the branching agent to be added is not especially limited, but can be selected in accordance with the purpose or the like, and from the viewpoints of improvement of a rate of an end stopping reaction of the conjugated diene-based polymer, improvement of the coupling ratio, and continuity of the polymerization after branching, the amount of the branching agent is, in terms of a molar ratio to the amount of the active polymerization initiator, preferably 1/2 or less and 1/100 or more, more preferably 1/3 or less and 1/50 or more, further preferably 1/4 or less and 1/30 or more, further more preferably 1/6 or less and 1/25 or more, and still further preferably 1/8 or less and 1/12 or more.

Furthermore, as described above, during and/or after the branching step, a monomer may be further additionally added to continue the polymerizing step after the branching, or after the additional addition of the monomer, addition of the branching agent and the monomer may be repeated.

If the monomer is additionally added, steric hindrance around the branch point is reduced, and as a result, effects of improving the continuity of the polymerization and improving the coupling ratio and the modification ratio can be obtained. Thus, with the molecular weight of the polymer increased, a branch structure can be formed in a desired position.

The monomer to be additionally added may be aromatic vinyl such as styrene, or a conjugated diene compound such as butadiene, or a mixture of these, and may be the same as or different from the monomer initially polymerized in the type and ratio, and from the viewpoint of the continuity of the polymerization, is preferably a conjugated diene compound. From the viewpoint of improving heat resistance of the polymer, an aromatic vinyl compound is preferably additionally added.

The branched conjugated diene-based polymer obtained in the branching step of the production method of the present embodiment has a Mooney viscosity, measured at 110° C., of preferably 10 or more and 150 or less, more preferably 15 or more and 140 or less, and further preferably 20 or more and 130 or less. The Mooney viscosity is still further preferably 30 or more and 100 or less.

If the Mooney viscosity falls in this range, a branched conjugated diene-based polymer obtained by the production method of the present embodiment tends to be excellent in processability and abrasion resistance.

The branched conjugated diene-based polymer obtained in the branching step of the production method of the present embodiment has a weight average molecular weight of preferably 10,000 or more and 1,500,000 or less, more preferably 100,000 or more and 1,000,000 or less, and further preferably 200,000 or more and 900,000 or less.

If the weight average molecular weight falls in this range, a branched conjugated diene-based polymer obtained by the production method of the present embodiment tends to be excellent in processability, abrasion resistance and balance between these characteristics.

If an unmodified branched conjugated diene-based polymer is to be produced, in order to attain a weight average molecular weight in a range of 100,000 or more and 1,000,000 or less, the amount of the branching agent to be added is controlled to a molar ratio to the amount of the polymerization initiator of 1/3 or less and 1/50 or more. Thus, it is necessary to prevent the polymerization initiator from being totally consumed before the coupling step while forming a branch, and to make the number of functional groups of the coupling agent two or more. In order to attain a weight average molecular weight in a range of 200,000 or more and 900,000 or less, it is necessary to control the amount of the branching agent to be added to be a molar ratio to the amount of the polymerization initiator of 1/3 or less and 1/50 or more, and to make the number of functional groups of the coupling agent three or more.

If a modified branched conjugated diene-based polymer is to be produced, in order to attain a weight average molecular weight in a range of 100,000 or more and 1,000,000 or less, the amount of the branching agent to be added is controlled to a molar ratio to the amount of the polymerization initiator of 1/3 or less and 1/50 or more. Thus, it is necessary to prevent the polymerization initiator from being totally consumed before the coupling step while forming a branch, and to make the number of functional groups of the coupling agent two or more. In order to attain a weight average molecular weight in a range of 200,000 or more and 900,000 or less, it is necessary to control the amount of the branching agent to be added to be a molar ratio to the amount of the polymerization initiator of 1/3 or less and 1/50 or more, and to make the number of functional groups of the coupling agent three or more.

A branched conjugated diene-based polymer obtained by the production method of the present embodiment may be a polymer of a conjugated diene monomer and the branching agent, or may be a copolymer of a conjugated diene monomer, the branching agent, and another monomer.

For example, when the conjugated diene monomer is butadiene or isoprene, and this diene monomer is polymerized with a branching agent containing an aromatic vinyl portion, a polymer chain is what is called polybutadiene or polyisoprene, and a polymer containing a structure derived from an aromatic vinyl in a branched portion is obtained. Owing to such a structure, linearity of each polymer chain can be improved and a crosslink density obtained after vulcanization can be improved, resulting in obtaining an effect of improving the abrasion resistance of the polymer. Therefore, such a polymer is suitably used for a tire, resin modification, interior/exterior of a vehicle, an anti-vibration rubber, shoes and the like.

When the conjugated diene-based polymer is used in application to a tire tread, a copolymer of a conjugated diene monomer, an aromatic vinyl monomer, and a branching agent is suitably used, and in the copolymer used in this application, the amount of bound conjugated diene is preferably 40% by mass or more and 100% by mass or less, and more preferably 55% by mass or more and 80% by mass or less.

Besides, an amount of bound aromatic vinyl in a branched conjugated diene-based polymer obtained by the production method of the present embodiment is not especially limited, and is preferably 0% by mass or more and 60% by mass or less, and more preferably 20% by mass or more and 45% by mass or less.

When the amounts of the bound conjugated diene and the bound aromatic vinyl fall in the above-described ranges, the balance between a low hysteresis loss property and wet skid resistance, abrasion resistance and fracture performance obtained when in the form of a vulcanizate tend to be more excellent.

Here, the amount of bound aromatic vinyl can be measured in accordance with UV absorption by a phenyl group, and based on the thus obtained amount, the amount of bound conjugated diene can be also obtained. Specifically, these amounts can be measured in accordance with a method described later in the examples.

In the branched conjugated diene-based polymer obtained by the production method of the present embodiment, the amount of bound vinyl in a conjugated diene bond unit is not especially limited, and is preferably 10% by mol or more and 75% by mol or less, and more preferably 20% by mol or more and 65% by mol or less.

If the amount of bound vinyl falls in the above-described range, the balance between a low hysteresis loss property and wet skid resistance, abrasion resistance, and fracture strength obtained when in the form of a vulcanizate tend to be more excellent.

Here, if the branched conjugated diene-based polymer is a copolymer of butadiene and styrene, the amount of bound vinyl (the amount of a 1,2-bond) in a butadiene bond unit can be obtained by Hampton method (R. R. Hampton, Analytical Chemistry, 21, 923 (1949)). Specifically, it can be measured by a method described in the examples below.

As for the microstructure of the branched conjugated diene-based polymer, if the amounts of the aforementioned bonds in the branched conjugated diene-based polymer obtained by the production method of the present embodiment respectively fall in the above-described ranges and the glass transition temperature of the branched conjugated diene-based polymer is −80° C. or more and −15° C. or less, there is a tendency that a vulcanizate more excellent in the balance between a low hysteresis loss property and wet skid resistance can be obtained.

The glass transition temperature is defined as a peak top (an inflection point) of a DSC differential curve obtained by recording a DSC curve during temperature increase in a prescribed temperature range in accordance with ISO 22768: 2006.

If the branched conjugated diene-based polymer obtained by the production method of the present embodiment is a conjugated diene-aromatic vinyl copolymer, the branched conjugated diene-based polymer preferably contains a few or no blocks in which 30 or more aromatic vinyl units are chained. More specifically, if the branched conjugated diene-based polymer obtained by the production method of the present embodiment is a butadiene-styrene copolymer, in employing a known method in which the copolymer is decomposed by Kolthoff method (a method described by I. M. Kolthoff, et al., J. Polym. Sci. 1, 429 (1946)) to analyze the amount of polystyrene insoluble in methanol, blocks in each of which 30 or more aromatic vinyl units are chained are preferably 5.0% by mass or less, and more preferably 3.0% by mass or less based on the total amount of the branched conjugated diene-based polymer.

From the viewpoint of improving fuel efficiency, if the branched conjugated diene-based polymer obtained by the production method of the present embodiment is a conjugated diene-aromatic vinyl copolymer, a larger proportion of an aromatic vinyl unit is preferably present singly.

Specifically, if the branched conjugated diene-based polymer obtained by the production method of the present embodiment is a butadiene-styrene copolymer, when the branched conjugated diene-based polymer is decomposed by employing a method through ozonolysis known as a method of Tanaka et al., (Polymer, 22, 1721 (1981)) to analyze a styrene chain distribution by GPC, it is preferable that the amount of isolated styrene, based on the whole amount of bound styrene, is 40% by mass or more, and that the amount of a chain styrene structure consisting of 8 or more chained styrene is 5.0% by mass or less.

In this case, a resultant vulcanized rubber tends to attain excellent performance of particularly low hysteresis loss.

(Reaction Step)

In the production method for the branched conjugated diene-based polymer of the present embodiment, a step of performing a coupling reaction on the active end of the conjugated diene-based polymer obtained through the polymerizing step and the branching step with a coupling agent of, for example, a tri- or higher functional reactive compound, such as a step of performing a coupling reaction with a coupling agent containing a silane sulfide compound represented by the following formula (3), or a step of performing a polymerization termination reaction on the active end of the conjugated diene-based polymer with a polymerization terminator of, for example, a di- or lower functional reactive compound is preferably performed.

Hereinafter, the step of performing the reaction with a coupling agent (coupling step) and the step of performing the reaction with a polymerization terminator (polymerization termination step) will be together referred to as a reaction step.

In the reaction step, one end of the active end of the conjugated diene-based polymer is reacted with a coupling agent or a polymerization terminator.

<Coupling Step>

In the production method for the branched conjugated diene-based polymer of the present embodiment, the conjugated diene-based polymer obtained through the polymerizing step and the branching step is preferably subjected to the coupling reaction with a coupling agent as the reaction step.

Through the coupling reaction, a molecular chain can be efficiently elongated, and if a tri- or higher functional coupling agent is used, a branch can be introduced into the polymer. The function of forming a branch is similar to that of the step using a branching agent, but the coupling step is preferably performed from the viewpoint that a branch can be formed with a desired element such as nitrogen, sulfur, or silicon introduced by using a known coupling agent.

In the coupling step, for example, on the active end of the conjugated diene-based polymer, a tri- or higher functional reactive compound, a coupling agent having a nitrogen atom-containing group, or a coupling agent containing a silane sulfide compound represented by the following formula (3) (hereinafter sometimes altogether referred to as the "coupling agent") is preferably used.

In the reaction step, for example, one end of the active end of the conjugated diene-based polymer is subjected to the coupling reaction with the tri- or higher functional reactive compound, the coupling agent having a nitrogen atom-containing group, or the silane sulfide compound represented by the following formula (3) that is, a modifier containing silicon and a sulfur atom, and thus, a branched conjugated diene-based polymer can be obtained.

[Tri- or Higher Functional Reactive Compound]

The tri- or higher functional reactive compound used in the coupling step in the production method for the branched conjugated diene-based polymer of the present embodiment is preferably a tri- or higher functional reactive compound having a silicon atom.

Examples of the tri- or higher functional reactive compound having a silicon atom include, but are not limited to, a halogenated silane compound, an epoxidized silane compound, a vinylized silane compound, and an alkoxysilane compound.

Examples of the halogenated silane compound used as the coupling agent include, but are not limited to, methyl trichlorosilane, tetrachlorosilane, tris(trimethylsiloxy)chlorosilane, tris(dimethylamino)chlorosilane, hexachlorodisilane, bis(trichlorosilyl)methane, 1,2-bis(trichlorosilyl)ethane, 1,2-bis(methyldichlorosilyl)ethane, 1,4-bis(trichlorosilyl)butane, and 1,4-bis(methyldichlorosilyl)butane.

Examples of the epoxidized silane compound used as the coupling agent include, but are not limited to, 3-glycidoxypropyltrimethoxysilane, 3-glycidoxypropyltriethoxysilane, 3-glycidoxypropylmethyldiethoxysilane, and epoxy-modified silicone.

Examples of the alkoxysilane compound used as the coupling agent include, but are not limited to, tetramethoxysilane, tetraethoxysilane, triphenoxymethylsilane, 1,2-bis(triethoxysilyl)ethane, and methoxy-substituted polyorganosiloxane.

[Coupling Agent Having Nitrogen Atom-Containing Group]

Examples of the coupling agent having a nitrogen atom-containing group include, but are not limited to, an isocyanate compound, an isothiocyanate compound, an isocyanuric acid derivative, a carbonyl compound having a nitrogen atom-containing group, a vinyl compound having a nitrogen atom-containing group, an epoxy compound having a nitrogen atom-containing group, an alkoxysilane compound having a nitrogen atom-containing group, and a protected amine compound having a nitrogen atom-containing group and capable of forming a primary or secondary amine.

In the coupling agent having a nitrogen atom-containing group, a nitrogen atom-containing functional group can be a functional group derived from an amine-based compound preferably not having active hydrogen, and examples of the amine-based compound include a tertiary amine compound, and a protected amine compound having the active hydrogen substituted by a protecting group. Other examples of a compound capable of forming a nitrogen atom-containing functional group include an imine compound represented by a general formula, —N=C, and an alkoxysilane compound bonded to the nitrogen atom-containing group.

Examples of the isocyanate compound used as the coupling agent having a nitrogen atom-containing group include, but are not limited to, 2,4-tolylene diisocyanate, 2,6-tolylene diisocyanate, diphenylmethane diisocyanate, polymeric type diphenylmethane diisocyanate (C-MDI), phenyl isocyanate, isophorone diisocyanate, hexamethylene diisocyanate, butyl isocyanate, and 1,3,5-benzene triisocyanate.

Examples of the isocyanuric acid derivative used as the coupling agent having a nitrogen atom-containing group include, but are not limited to, 1,3,5-tris(3-trimethoxysilylpropyl)isocyanurate, 1,3,5-tris(3-triethoxysilylpropyl)isocyanurate, 1,3,5-tris(oxysilan-2-yl)-1,3,5-triazinane-2,4,6-trione, 1,3,5-tris(isocyanatomethyl)-1,3,5-triazinane-2,4,6-trione, and 1,3,5-trivinyl-1,3,5-triazinane-2,4,6-trione.

Examples of the carbonyl compound used as the coupling agent having a nitrogen atom-containing group include, but are not limited to, 1,3-dimethyl-2-imidazolidinone, 1-methyl-3-ethyl-2-imidazolidinone, 1-methyl-3-(2-methoxyethyl)-2-imidazolidinone, N-methyl-2-pyrrolidone, N-methyl-2-piperidone, N-methyl-2-quinolone, 4,4'-bis(diethylamino)benzophenone, 4,4'-bis(dimethylamino)benzophenone, methyl-2-pyridylketone, methyl-4-pyridylketone, propyl-2-pyridylketone, di-4-pyridylketone, 2-benzoylpyridine, N,N,N',N'-tetramethylurea, N,N-dimethyl-N',N'-diphenylurea, methyl N,N-diethylcarbamate, N,N-diethylacetamide, N,N-dimethyl-N',N'-dimethylaminoacetamide, N,N-dimethylpicolinamide, and N,N-dimethylisonicotinamide.

Examples of the vinyl compound used as the coupling agent having a nitrogen atom-containing group include, but are not limited to, N,N-dimethylacrylamide, N,N-dimethylmethacrylamide, N-methylmaleimide, N-methylphthalimide, N,N-bistrimethylsilylacrylamide, morpholinoacrylamide, 3-(2-dimethylaminoethyl)styrene, (dimethylamino) dimethyl-4-vinylphenylsilane, 4,4'-vinylidenebis(N,N-dimethylaniline), 4,4'-vinylidenebis(N,N-diethylaniline), 1,1-bis(4-morpholinophenyl)ethylene, and 1-phenyl-1-(4-N, N-dimethylaminophenyl)ethylene.

Examples of the epoxy compound used as the coupling agent having a nitrogen atom-containing group include, but are not limited to, an epoxy group-containing hydrocarbon compound bonded to an amino group, and an epoxy group-containing hydrocarbon compound bonded to an ether group. An example of such an epoxy compound includes, but is not limited to, an epoxy compound represented by the following general formula (i):

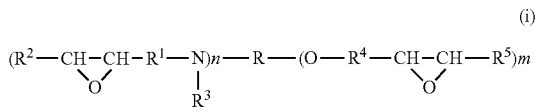

In the formula (i), R represents a di- or higher valent hydrocarbon group, or a di- or higher valent organic group having at least one polar group selected from the group consisting of a polar group having oxygen such as ether, epoxy, or ketone, a polar group having sulfur such as thioether or thioketone, and a polar group having nitrogen such as a tertiary amino group or an imino group.

The di- or higher valent hydrocarbon group is a saturated or unsaturated and optionally straight-chain, branched or cyclic hydrocarbon group, and includes an alkylene group, an alkenylene group, a phenylene group or the like. It is preferably a hydrocarbon group having 1 to 20 carbon atoms. Examples include methylene, ethylene, butylene, cyclohexylene, 1,3-bis(methylene)-cyclohexane, 1,3-bis(ethylene)-cyclohexane, o-, m- or p-phenylene, m- or p-xylene, and bis(phenylene)-methane.

In the formula (i), $R^1$ and $R^4$ represent a hydrocarbon group having 1 to 10 carbon atoms, and $R^1$ and $R^4$ may be the same as or different from each other.

In the formula (i), $R^2$ and $R^5$ represent hydrogen or a hydrocarbon group having 1 to 10 carbon atoms, and $R^2$ and $R^5$ may be the same as or different from each other.

In the formula (i), $R^3$ represents a hydrocarbon group having 1 to 10 carbon atoms, or a structure represented by the following formula (ii).

$R^1$, $R^2$ and $R^3$ may have a cyclic structure mutually bonded.

If $R^3$ is a hydrocarbon group, it may have a cyclic structure bonded to R. When the cyclic structure is formed, N and R bonded to $R^3$ may be directly bonded to each other.

In the formula (i), n represents an integer of 1 or more, and m represents 0, or a nonnegative integer of 1 or more.

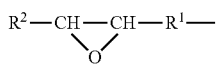

In the formula (ii), $R^1$ and $R^2$ are defined the same as $R^1$ and $R^2$ of the formula (i), and $R^1$ and $R^2$ may be the same as or different from each other.

The epoxy compound used as the coupling agent having a nitrogen atom-containing group is preferably one having an epoxy group-containing hydrocarbon group, and more preferably one having a glycidyl group-containing hydrocarbon group.

The epoxy-group containing hydrocarbon group bonded to an amino group or an ether group is not especially limited, and examples include a glycidylamino group, a diglycidylamino group, and a glycidoxy group. A more preferable molecular structure is an epoxy group-containing compound having a glycidylamino group, a diglycidylamino group, or a glycidoxy group, and an example includes a compound represented by the following general formula (iii):

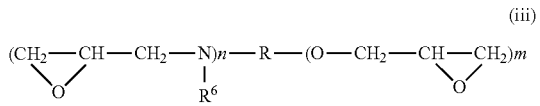

In the formula (iii), R is defined the same as R of the formula (i), and $R^6$ represents a hydrocarbon group having 1 to 10 carbon atoms, or a structure represented by the following formula (iv).

If $R^6$ is a hydrocarbon group, it may be mutually bonded to R to form a ring structure, and in this case, N and R bonded to $R^6$ may be directly bonded to each other.

In the formula (iii), n represents an integer of 1 or more, and m represents 0, or a nonnegative integer of 1 or more.

The epoxy compound used as the coupling agent having a nitrogen atom-containing group is particularly preferably a compound having one or more diglycidylamino groups and one or more glycidoxy groups in a molecule.

Examples of the epoxy compound used as the coupling agent having a nitrogen atom-containing group include, but are not limited to, N,N-diglycidyl-4-glycidoxyaniline, 1-N,N-diglycidylaminomethyl-4-glycidoxy-cyclohexane, 4-(4-glycidoxyphenyl)-(N,N-diglycidyl)aniline, 4-(4-glycidoxyphenoxy)-(N,N-diglycidyl)aniline, 4-(4-glycidoxybenzyl)-(N,N-diglycidyl)aniline, 4-(N,N'-diglycidyl-2-piperazinyl)-glycidoxybenzene, 1,3-bis(N,N-diglycidylaminomethyl)cyclohexane, N,N,N',N'-tetraglycidyl-m-xylenediamine, 4,4-methylene-bis(N,N-diglycidylaniline), 1,4-bis(N,N-diglycidylamino)cyclohexane, N,N,N',N'-tetraglycidyl-p-phenylenediamine, 4,4'-bis(diglycidylamino)benzophenone, 4-(4-glycidylpiperazinyl)-(N,N-diglycidyl)aniline, 2-[2-(N,N-diglycidylamino)ethyl]-1-glycidylpyrrolidine, N,N-diglycidylaniline, 4,4'-diglycidyl-dibenzylmethylamine, N,N-diglycidylaniline, N,N-diglycidylortho-toluidine, and N,N-diglycidylaminomethylcyclohexane. Among these, N,N-diglycidyl-4-glycidoxyaniline and 1,3-bis(N,N-diglycidylaminomethyl)cyclohexane are particularly preferred.

Examples of the alkoxysilane compound used as the coupling agent having a nitrogen atom-containing group include, but are not limited to, 3-dimethylaminopropyltrimethoxysilane, 3-dimethylaminopropylmethyldimethoxysilane, 3-diethylaminopropyltriethoxysilane, 3-morpholinopropyltrimethoxysilane, 3-piperidinopropyltriethoxysilane, 3-hexamethyleneiminopropylmethyl diethoxysilane, 3-(4-methyl-1-piperazino)propyltriethoxysilane, 1-[3-(triethoxysilyl)-propyl]-3-methylhexahydropyrimidine, 3-(4-trimethylsilyl-1-piperazino)propyltriethoxysilane, 3-(3-triethylsilyl-1-imidazolidinyl)propylmethyldiethoxysilane, 3-(3-trimethylsilyl-1-hexahydropyrimidinyl)propyltrimethoxysilane, 3-dimethylamino-2-(dimethylaminomethyl)propyltrimethoxysilane, bis(3-dimethoxymethylsilylpropyl)-N-methylamine, bis(3-trimethoxysilylpropyl)-N-methylamine, bis(3-triethoxysilylpropyl)methylamine, tris(trimethoxysilyl)amine, tris(3-trimethoxysilylpropyl)amine, N,N,N',N'-tetra(3-trimethoxysilylpropyl)ethylenediamine, 3-isocyanatopropyltrimethoxysilane, 3-cyanopropyltrimethoxysilane, 2,2-dimethoxy-1-(3-trimethoxysilylpropyl)-1-aza-2-silacyclopentane, 2,2-diethoxy-1-(3-triethoxysilylpropyl)-1-aza-2-silacyclopentane, 2,2-dimethoxy-1-(4-trimethoxysilylbutyl)-1-aza-2-silacyclohexane, 2,2-dimethoxy-1-(3-dimethoxymethylsilylpropyl)-1-aza-2-silacyclopentane, 2,2-dimethoxy-1-phenyl-1-aza-2-silacyclopentane, 2,2-diethoxy-1-butyl-1-aza-2-silacyclopentane, 2,2-dimethoxy-1-methyl-1-aza-2- silacyclopentane, 2,2-dimethoxy-8-(4-methylpiperazinyl) methyl-1,6-dioxa-2-silacyclooctane, and 2,2-dimethoxy-8-(N,N-diethylamino)methyl-1,6-dioxa-2-silacyclooctane.

Among protected amine compounds capable of forming a primary or secondary amine used as the coupling agent having a nitrogen atom-containing group, examples of a compound having an unsaturated bond and a protected amine in a molecule include, but are not limited to, 4,4'-vinylidenebis[N,N-bis(trimethylsilyl)aniline], 4,4'-vinylidenebis[N,N-bis(triethylsilyl)aniline], 4,4'-vinylidenebis[N,N-bis(t-butyldimethylsilyl)aniline], 4,4'-vinylidenebis[N-methyl-N-(trimethylsilyl)aniline], 4,4'-vinylidenebis[N-ethyl-N-(trimethylsilyl)aniline], 4,4'-vinylidenebis[N-methyl-N-(triethylsilyl)aniline], 4,4'-vinylidenebis[N-ethyl-N-(triethylsilyl)aniline], 4,4'-vinylidenebis[N-methyl-N-(t-butyldimethylsilyl)aniline], 4,4'-vinylidenebis[N-ethyl-N-(t-butyldimethylsilyl)aniline], 1-[4-N,N-bis(trimethylsilyl)aminophenyl]-1-[4-N-methyl-N-(trimethylsilyl)aminophenyl]ethylene, and 1-[4-N,N-bis(trimethylsilyl)aminophenyl]-1-[4-N,N-dimethylaminophenyl]ethylene.

Examples of a protected amine compound, used as the coupling agent having a nitrogen atom-containing group, capable of forming a primary or secondary amine, and containing alkoxysilane and protected amine in a molecule include, but are not limited to, N,N-bis(trimethylsilyl)aminopropyltrimethoxysilane, N,N-bis(trimethylsilyl)aminopropylmethyldimethoxysilane, N,N-bis(trimethylsilyl)aminopropyltriethoxysilane, N,N-bis(trimethylsilyl)aminopropylmethyldiethoxysilane, N,N-bis(trimethylsilyl)aminoethyltrimethoxysilane, N,N-bis(trimethylsilyl)aminoethylmethyldiethoxysilane, N,N-bis(triethylsilyl)aminopropylmethyldiethoxysilane, 3-(4-trimethylsilyl-1-piperazino)propyltriethoxysilane, 3-(3-triethylsilyl)-1-imidazolidinyl)propylmethyldiethoxysilane, 3-(3-trimethylsilyl-1-hexahydropyrimidinyl)propyltrimethoxysilane, 2,2-dimethoxy-1-(3-trimethoxysilylpropyl)-1-aza-2-silacyclopentane, 2,2-diethoxy-1-(3-triethoxysilylpropyl)-1-aza-2-silacyclopentane, 2,2-dimethoxy-1-(4-trimethoxysilylbutyl)-1-aza-2-silacyclohexane, 2,2-dimethoxy-1-(3-dimethoxymethylsilylpropyl)-1-aza-2-silacyclopentane, 2,2-dimethoxy-1-phenyl-1-aza-2-silacyclopentane, 2,2-diethoxy-1-butyl-1-aza-2-silacyclopentane, 2,2-dimethoxy-1-methyl-1-aza-2-silacyclopentane, N-(1,3-dimethylbutylidene)-3-(triethoxysilyl)-1-propanamine, N-(1-methylethylidene)-3-(triethoxysilyl)-1-propanamine, N-ethylidene-3-(triethoxysilyl)-1-propanamine, N-(1-methylpropylidene)-3-(triethoxysilyl)-1-propanamine, N-(4-N,N-dimethylaminobenzylidene)-3-(triethoxysilyl)-1-propanamine, N-(1,3-dimethylbutylidene)-3-(triethoxysilyl)-1-propanamine, 3-(benzylideneamino)propyltrimethoxysilane, 3-(benzylideneamino)propyltriethoxysilane, and 3-(benzylideneamino)propyltripropylsilane.

Examples of the alkoxysilane compound particularly preferably used as the coupling agent having a nitrogen atom-containing group include, but are not limited to, tris(3-trimethoxysilylpropyl)amine, tris(3-triethoxysilylpropyl)amine, tris(3-tripropoxysilylpropyl)amine, bis(3-trimethoxysilylpropyl)-[3-(2,2-dimethoxy-1-aza-2-silacyclopentane)propyl]amine, tetrakis(3-trimethoxysilylpropyl)-1,3-propanediamine, tris(3-trimethoxysilylpropyl)-[3-(1-methoxy-2-trimethylsilyl-1-sila-2-azacyclopentane)propyl]-1,3-propanediamine, tris(3-trimethoxysilylpropyl)-[3-(1-methoxy-2-methyl-1-sila-2-azacyclopentane)propyl]-1,3-propanediamine, bis(3-triethoxysilylpropyl)-[3-(2,2-diethoxy-1-aza-2-silacyclopentane)propyl]-[3-(1-ethoxy-2-trimethylsilyl-1-sila-2-azacyclopentane)propyl]-1,3-propanediamine, tetrakis(3-trimethoxysilylpropyl)-1,3-bisaminomethylcyclohexane, tris(3-trimethoxysilylpropyl)-[3-(2,2-dimethoxy-1-aza-2-silacyclopentane)propyl]-1,3-bisaminomethylcyclohexane, tetrakis(3-trimethoxysilylpropyl)-1,6-hexamethylenediamine, pentakis(3-trimethoxysilylpropyl)-diethylenetriamine, tris(3-trimethoxysilylpropyl)-methyl-1,3-propanediamine, tetrakis[3-(2,2-dimethoxy-1-aza-2-silacyclopentane)propyl]silane, bis(3-trimethoxysilylpropyl)-bis[3-(2,2-dimethoxy-1-aza-2-silacyclopentane)propyl]silane, tris[3-(2,2-dimethoxy-1-aza-2-silacyclopentane)propyl]-(3-trimethoxysilylpropyl)silane, tris[3-(2,2-dimethoxy-1-aza-2-silacyclopentane)propyl]-[3-(1-methoxy-2-trimethylsilyl-1-sila-2-azacyclopentane)propyl]silane, 3-tris[2-(2,2-dimethoxy-1-aza-2-silacyclopentane)ethoxy]silyl-1-trimethoxysilylpropane, 1-[3-(1-methoxy-2-trimethylsilyl-1-sila-2-azacyclopentane)propyl]-3,4,5-tris(3-trimethoxysilylpropyl)-cyclohexane, 1-[3-(2,2-dimethoxy-1-aza-2-silacyclopentane)propyl]-3,4,5-tris(3-trimethoxysilylpropyl)-cyclohexane, 3,4,5-tris(3-trimethoxysilylpropyl)-cyclohexyl-[3-(2,2-dimethoxy-1-aza-2-silacyclopentane)propyl] ether, (3-trimethoxysilylpropyl)phosphate, bis(3-trimethoxysilylpropyl)-[3-(2,2-dimethoxy-1-aza-2-silacyclopentane)propyl]phosphate, bis[3-(2,2-dimethoxy-1-aza-2-silacyclopentane)propyl]-(3-trimethoxysilylpropyl)phosphate, and tris[3-(2,2-dimethoxy-1-aza-2-silacyclopentane)propyl] phosphate.

As the coupling agent used in the reaction step, a silane sulfide compound represented by the following formula (3) is preferably used.

$$(R^1O)_x(R^2)_ySi-R^3-S-SiR^4_3 \qquad (3)$$

wherein Si represents a silicon atom, O represents an oxygen atom, and S represents a sulfur atom;

x represents an integer of 1 to 3, y represents 0, or an integer of 1 to 2, and x+y is 3; and $R^1$, $R^2$, and $R^4$ may be the same or different, and represent an alkyl group having 1 to 16 carbon atoms, and $R^3$ represents an aryl group having 6 to 16 carbon atoms, an alkylene group having 1 to 16 carbon atoms, or an alkyl chain having 1 to 16 carbon atoms.

Examples of the coupling agent represented by the formula (3) include, but are not limited to, S-trimethylsilylmercaptopropyltrimethoxysilane, S-trimethylsilylmercaptopropyltriethoxysilane, S-trimethylsilylmercaptopropyltripropoxysilane, S-trimethylsilylmercaptopropyltributoxysilane, S-trimethylsilylmercaptoethyltrimethoxysilane, S-trimethylsilylmercaptoethyltriethoxysilane, S-trimethylsilylmercaptoethyltripropoxysilane, S-trimethylsilylmercaptoethyltributoxysilane, S-trimethylsilylmercaptomethyltrimethoxysilane, S-trimethylsilylmercaptomethyltriethoxysilane, S-trimethylsilylmercaptomethyltripropoxysilane, S-trimethylsilylmercaptomethyltributoxysilane, S-trimethylsilylmercapto-2,2-dimethylpropyltrimethoxysilane, S-trimethylsilylmercapto-2,2-dimethylpropyltriethoxysilane, S-trimethylsilylmercapto-2,2-dimethylpropyltripropoxysilane, S-trimethylsilylmercapto-2,2-dimethylpropyltributoxysilane, S-trimethylsilylmercapto-2-methylpropyltrimethoxysilane, S-trimethylsilylmercapto-2-methylpropyltriethoxysilane, S-trimethylsilylmercapto-2-methylpropyltripropoxysilane, S-trimethylsilylmercapto-2-methylpropyltributoxysilane, S-trimethylsilylmercaptopropylmethyldimethoxysilane, S-trimethylsilylmercaptopropylmethyldiethoxysilane, S-trimethylsilylmercaptopropylmethyldipropoxysilane, S-trimethylsilylmercaptopropylmethyldibutoxysilane, S-trimethylsilylmercaptoethylmethyldimethoxysilane, S-trimethylsilylmercaptoethylmethyldiethoxysilane, S-trimethylsilylmercaptoethylmethyldipropoxysilane, S-trimethylsilylmercaptoethylmethyldibutoxysilane, S-trimethylsilylmercaptomethylmethyldimethoxysilane, S-trimethylsilylmercaptomethylmethyldiethoxysilane, S-trimethylsilylmercaptomethylmethyldipropoxysilane, S-trimethylsilylmercaptomethylmethyldibutoxysilane, S-trimethylsilylmercapto-2,2-dimethylpropylmethyldimethoxysilane, S-trimethylsilylmercapto-2,2-dimethylpropylmethyldiethoxysilane, S-trimethylsilylmercapto-2,2-dimethylpropylmethyldipropoxysilane, S-trimethylsilylmercapto-2,2-dimethylpropylmethyldibutoxysilane, S-trimethylsilylmercapto-2-methylpropylmethyldimethoxysilane, S-trimethylsilylmercapto-2-methylpropylmethyldiethoxysilane, S-trimethylsilylmercapto-2-methylpropylmethyldipropoxysilane, S-trimethylsilylmercapto-2-methylpropylmethyldibutoxysilane, S-trimethylsilylmercaptopropyldimethylmethoxysilane, S-trimethylsilylmercaptopropyldimethylethoxysilane, S-trimethylsilylmercaptopropyldimethylpropoxysilane, S-trimethylsilylmercaptopropyldimethylbutoxysilane, S-trimethylsilylmercaptoethyldimethylmethoxysilane, S-trimethylsilylmercaptoethyldimethylethoxysilane, S-trimethylsilylmercaptoethyldimethylpropoxysilane, S-trimethylsilylmercaptoethyldimethylbutoxysilane, S-trimethylsilylmercaptomethyldimethylmethoxysilane, S-trimethylsilylmercaptomethyldimethylethoxysilane, S-trimethylsilylmercaptomethyldimethylpropoxysilane, S-trimethylsilylmercaptomethyldimethylbutoxysilane, S-trimethylsilylmercapto-2,2-dimethylpropyldimethylmethoxysilane, S-trimethylsilylmercapto-2,2-dimethylpropyldimethylethoxysilane, S-trimethylsilylmercapto-2,2-dimethylpropyldimethylpropoxysilane, S-trimethylsilylmercapto-2,2-dimethylpropyldimethylbutoxysilane, S-trimethylsilylmercapto-2-methylpropyldimethylmethoxysilane, S-trimethylsilylmercapto-2-methylpropyldimethylethoxysilane, S-trimethylsilylmercapto-2-methylpropyldimethylpropoxysilane, S-trimethylsilylmercapto-2-methylpropyldimethylbutoxysilane, S-triethylsilylmercaptopropyltrimethoxysilane, S-triethylsilylmercaptopropyltriethoxysilane, S-triethylsilylmercaptopropyltripropoxysilane, S-triethylsilylmercaptopropyltributoxysilane, S-triethylsilylmercaptoethyltrimethoxysilane, S-triethylsilylmercaptoethyltriethoxysilane, S-triethylsilylmercaptoethyltripropoxysilane, S-triethylsilylmercaptoethyltributoxysilane, S-triethylsilylmercaptomethyltrimethoxysilane, S-triethylsilylmercaptomethyltriethoxysilane, S-triethylsilylmercaptomethyltripropoxysilane, S-triethylsilylmercaptomethyltributoxysilane, S-triethylsilylmercapto-2,2-dimethylpropyltrimethoxysilane, S-triethylsilylmercapto-2,2-dimethylpropyltriethoxysilane, S-triethylsilylmercapto-2,2-dimethylpropyltripropoxysilane, S-triethylsilylmercapto-2,2-dimethylpropyltributoxysilane, S-triethylsilylmercapto-2-methylpropyltrimethoxysilane, S-triethylsilylmercapto-2-methylpropyltriethoxysilane, S-triethylsilylmercapto-2-methylpropyltripropoxysilane, S-triethylsilylmercapto-2-methylpropyltributoxysilane, S-triethylsilylmercaptopropylmethyldimethoxysilane, S-triethylsilylmercaptopropylmethyldiethoxysilane, S-triethylsilylmercaptopropylmethyldipropoxysilane, S-triethylsilylmercaptopropylmethyldibutoxysilane, S-triethylsilylmercaptoethylmethyldimethoxysilane, S-triethylsilylmercaptoethylmethyldiethoxysilane, S-triethylsilylmercaptoethylmethyldipropoxysilane, S-triethylsilylmercaptoethylmethyldibutoxysilane, S-triethylsilylmercaptomethylmethyldimethoxysilane, S-triethylsilylmercaptomethylmethyldiethoxysilane, S-triethylsilylmercaptomethylmethyldipropoxysilane, S-triethylsilylmercaptomethylmethyldibutoxysilane, S-triethylsilylmercapto-2,2-dimethylpropylmethyldimethoxysilane, S-triethylsilylmercapto-2,2-dimethylpropylmethyldiethoxysilane, S-triethylsilylmercapto-2,2-dimethylpropylmethyldipropoxysilane, S-triethylsilylmercapto-2,2-dimethylpropylmethyldibutoxysilane, S-triethylsilylmercapto-2-methylpropylmethyldimethoxysilane, S-triethylsilylmercapto-2-methylpropylmethyldiethoxysilane, S-triethylsilylmercapto-2-methylpropylmethyldipropoxysilane, S-triethylsilylmercapto-2-methylpropylmethyldibutoxysilane, S-triethylsilylmercaptopropyldimethylmethoxysilane, S-triethylsilylmercaptopropyldimethylethoxysilane, S-triethylsilylmercaptopropyldimethylpropoxysilane, S-triethylsilylmercaptopropyldimethylbutoxysilane, S-triethylsilylmercaptoethyldimethylmethoxysilane, S-triethylsilylmercaptoethyldimethylethoxysilane, S-triethylsilylmercaptoethyldimethylpropoxysilane, S-triethylsilylmercaptoethyldimethylbutoxysilane, S-triethylsilylmercaptomethyldimethylmethoxysilane, S-triethylsilylmercaptomethyldimethylethoxysilane, S-triethylsilylmercaptomethyldimethylpropoxysilane, S-triethylsilylmercaptomethyldimethylbutoxysilane, S-triethylsilylmercapto-2,2-dimethylpropyldimethylmethoxysilane, S-triethylsilylmercapto-2,2-dimethylpropyldimethylethoxysilane, S-triethylsilylmercapto-2,2-dimethylpropyldimethylpropoxysilane, S-triethylsilylmercapto-2,2-dimethylpropyldimethylbutoxysilane, S-dimethyl-tert-butylsilylmercaptopropyltrimethoxysilane, S-dimethyl-tert-butylsilylmercaptopropyltriethoxysilane, S-dimethyl-tert-butylsilylmercaptopropyltripropoxysilane, S-dimethyl-tert-butylsilylmercaptopropyltributoxysilane, S-dimethyl-tert-butylsilylmercaptoethyltrimethoxysilane, S-dimethyl-tert-butylsilylmercaptoethyltriethoxysilane, S-dimethyl-tert-butylsilylmercaptoethyltripropoxysilane, S-dimethyl-tert-butylsilylmercaptoethyltributoxysilane, S-dimethyl-tert-butylsilylmercaptomethyltrimethoxysilane, S-dimethyl-tert-butylsilylmercaptomethyltriethoxysilane, S-dimethyl-tert-butylsilylmercaptomethyltripropoxysilane, S-dimethyl-tert-butylsilylmercaptomethyltributoxysilane, S-dimethyl-tert-butylsilylmercapto-2,2-dimethylpropyltrimethoxysilane, S-dimethyl-tert-butylsilylmercapto-2,2-dimethylpropyltriethoxysilane, S-dimethyl-tert-butylsilylmercapto-2,2-dimethylpropyltripropoxysilane, S-dimethyl-tert-butylsilylmercapto-2,2-dimethylpropyltributoxysilane, S-dimethyl-tert-butylsilylmercapto-2-methylpropyltrimethoxysilane, S-dimethyl-tert-butylsilylmercapto-2-methylpropyltriethoxysilane, S-dimethyl-tert-butylsilylmercapto-2-methylpropyltripropoxysilane, S-dimethyl-tert-butylsilylmercapto-2-methylpropyltributoxysilane, S-dimethyl-tert-butylsilylmercaptopropylmethyldimethoxysilane, S-dimethyl-tert-butylsilylmercaptopropylmethyldiethoxysilane, S-dimethyl-tert-butylsilylmercaptopropylmethyldipropoxysilane, S-dimethyl-tert-butylsilylmercaptopropylmethyldibutoxysilane, S-dimethyl-tert-butylsilylmercaptoethylmethyldimethoxysilane, S-dimethyl-tert-butylsilylmercaptoethylmethyldiethoxysilane, S-dimethyl-tert-butylsilylmercaptoethylmethyldipropoxysilane, S-dimethyl-tert-butylsilylmercaptoethylmethyldibutoxysilane, S-dimethyl-tert-butylsilylmercaptomethylmethyldimethoxysilane, S-dimethyl-tert-butylsilylmercaptomethylmethyldiethoxysilane, S-dimethyl-tert-butylsilylmercaptomethylmethyldipropoxysilane, S-dimethyl-tert-butylsilylmercaptomethylmethyldibutoxysilane, S-dimethyl-tert-butylsilylmercapto-2,2-dimethylpropylmethyldimethoxysilane, S-dimethyl-tert-butylsilylmercapto-2,2-dimethylpropylmethyldiethoxysilane, S-dimethyl-tert-butylsilylmercapto-2,2-dimethylpropylmethyldipropoxysilane, S-dimethyl-tert-butylsilylmercapto-2,2-dimethylpropylmethyldibutoxysilane, S-dimethyl-tert-butylsilylmercapto-2-methylpropylmethyldimethoxysilane, S-dimethyl-tert-butylsilylmercapto-2-methylpropylmethyldiethoxysilane, S-dimethyl-tert-butylsilylmercapto-2-methylpropylmethyldipropoxysilane, S-dimethyl-tert-butylsilylmercapto-2-methylpropylmethyldibutoxysilane, S-dimethyl-tert-butylsilylmercaptopropyldimethylmethoxysilane, S-dimethyl-tert-butylsilylmercaptopropyldimethylethoxysilane, S-dimethyl-tert-butylsilylmercaptopropyldimethylpropoxysilane, S-dimethyl-tert-butylsilylmercaptopropyldimethylbutoxysilane, S-dimethyl-tert-butylsilylmercaptoethyldi- methylmethoxysilane, S-dimethyl-tert-butylsilylmercaptoethyldimethylethoxysilane, S-dimethyl-tert-butylsilylmercaptoethyldimethylpropoxysilane, S-dimethyl-tert-butylsilylmercaptoethyldimethylbutoxysilane, S-dimethyl-tert-butylsilylmercaptomethyldimethylmethoxysilane, S-dimethyl-tert-butylsilylmercaptomethyldimethylethoxysilane, S-dimethyl-tert-butylsilylmercaptomethyldimethylpropoxysilane, S-dimethyl-tert-butylsilylmercaptomethyldimethylbutoxysilane, S-dimethyl-tert-butylsilylmercapto-2,2-dimethylpropyldimethylmethoxysilane, S-dimethyl-tert-butylsilylmercapto-2,2-dimethylpropyldimethyleth- oxysilane, S-dimethyl-tert-butylsilylmercapto-2,2-dimethylpropyldimethylpropoxysilane, S-dimethyl-tert-butylsilylmercapto-2,2-dimethylpropyldimethylbutoxysilane, S-dimethyl-tert-butylsilylmercapto-2-methylpropyldimethylmethoxysilane, S-dimethyl-tert-butylsilylmercapto-2-methylpropyldimethylethoxysilane, S-dimethyl-tert-butylsilylmercapto-2-methylpropyldimethylpropoxysilane, and S-dimethyl-tert-butylsilylmercapto-2-methylpropyldimethylbutoxysilane.

<Branched Conjugated Diene-Based Polymer Obtained Through Polymerizing Step, Branching Step, and Reaction Step>

The branched conjugated diene-based polymer obtained through the reaction step, particularly the step of causing a reaction with a coupling agent, in the production method for the branched conjugated diene-based polymer of the present embodiment preferably contains a structure derived from a compound having a nitrogen atom-containing group represented by the following general formula (i) or any one of the general formulas (A) to (C):

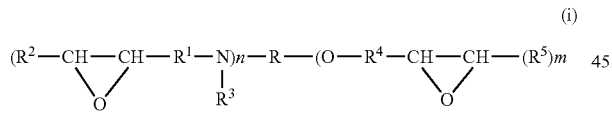

(i)

In the formula (i), R represents a di- or higher valent hydrocarbon group, or a di- or higher valent organic group having at least one polar group selected from a polar group having oxygen such as ether, epoxy, or ketone, a polar group having sulfur such as thioether or thioketone, and a polar group having nitrogen such as a tertiary amino group or an imino group.

The di- or higher valent hydrocarbon group is a saturated or unsaturated and optionally straight-chain, branched or cyclic hydrocarbon group, and includes an alkylene group, an alkenylene group, a phenylene group or the like. It is preferably a hydrocarbon group having 1 to 20 carbon atoms. Examples include methylene, ethylene, butylene, cyclohexylene, 1,3-bis(methylene)-cyclohexane, 1,3-bis(ethylene)-cyclohexane, o-, m- or p-phenylene, m- or p-xylene, and bis(phenylene)-methane.

In the formula (i), $R^1$ and $R^4$ represent a hydrocarbon group having 1 to 10 carbon atoms, and $R^1$ and $R^4$ may be the same as or different from each other.

In the formula (i), $R^2$ and $R^5$ represent hydrogen or a hydrocarbon group having 1 to 10 carbon atoms, and $R^2$ and $R^5$ may be the same as or different from each other.

In the formula (i), $R^3$ represents a hydrocarbon group having 1 to 10 carbon atoms, or a structure represented by the following formula (ii).

$R^1$, $R^2$ and $R^3$ may have a cyclic structure mutually bonded.

If $R^3$ is a hydrocarbon group, it may have a cyclic structure bonded to R. When the cyclic structure is formed, N and R bonded to $R^3$ may be directly bonded to each other.

In the formula (i), n represents an integer of 1 or more, and m represents 0, or a nonnegative integer of 1 or more.

(ii)

In the formula (ii), $R^1$ and $R^2$ are defined the same as $R^1$ and $R^2$ of the formula (i), and $R^1$ and $R^2$ may be the same as or different from each other.

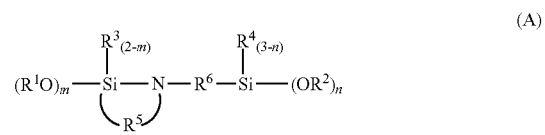

(A)

wherein $R^1$ to $R^4$ each independently represent an alkyl group having 1 to 20 carbon atoms, or an aryl group having 6 to 20 carbon atoms, $R^5$ represents an alkylene group having 1 to 10 carbon atoms, and $R^6$ represents an alkylene group having 1 to 20 carbon atoms;

m represents an integer of 1 or 2, n represents an integer of 2 or 3, (m+n) is an integer of 4 or more, and each of $R^1$ to $R^4$, if present in a plural number, is respectively independent.

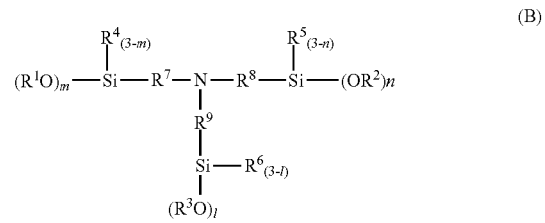

(B)

wherein $R^1$ to $R^6$ each independently represent an alkyl group having 1 to 20 carbon atoms, or an aryl group having 6 to 20 carbon atoms, and $R^7$ to $R^9$ each independently represent an alkylene group having 1 to 20 carbon atoms; and m, n, and l each independently represent an integer of 1 to 3, (m+n+1) is an integer of 4 or more, and each of $R^1$ to $R^6$, if present in a plural number, is respectively independent.

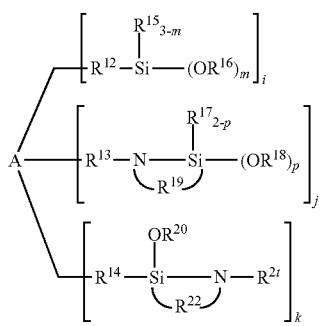
(C)

wherein $R^{12}$ to $R^{14}$ each independently represent a single bond, or an alkylene group having 1 to 20 carbon atoms, $R^{15}$ to $R^{18}$ and $R^{20}$ each independently represent an alkyl group having 1 to 20 carbon atoms, $R^{19}$ and $R^{22}$ each independently represent an alkylene group having 1 to 20 carbon atoms, and $R^{21}$ represents an alkyl group having 1 to 20 carbon atoms or a trialkylsilyl group;

m represents an integer of 1 to 3, and p represents 1 or 2;

each of $R^{12}$ to $R^{22}$, m, and p, if present in a plural number, is respectively independent, and may be the same or different;

i represents an integer of 0 to 6, j represents an integer of 0 to 6, k represents an integer of 0 to 6, and (i+j+k) is an integer of 4 to 10; and A represents a hydrocarbon group having 1 to 20 carbon atoms, or an organic group having at least one atom selected from the group consisting of an oxygen atom, a nitrogen atom, a silicon atom, a sulfur atom, and a phosphorus atom, and not having active hydrogen.

Examples of the coupling agent having a nitrogen atom-containing group represented by the formula (A) include, but are not limited to, 2,2-dimethoxy-1-(3-trimethoxysilylpropyl)-1-aza-2-silacyclopentane, 2,2-diethoxy-1-(3-triethoxysilylpropyl)-1-aza-2-silacyclopentane, 2,2-dimethoxy-1-(4-trimethoxysilylbutyl)-1-aza-2-silacyclohexane, 2,2-dimethoxy-1-(5-trimethoxysilylpentyl)-1-aza-2-silacycloheptane, 2,2-dimethoxy-1-(3-dimethoxymethylsilylpropyl)-1-aza-2-silacyclopentane, 2,2-diethoxy-1-(3-diethoxyethylsilylpropyl)-1-aza-2-silacyclopentane, 2-methoxy,2-methyl-1-(3-trimethoxysilylpropyl)-1-aza-2-silacyclopentane, 2-ethoxy,2-ethyl-1-(3-triethoxysilylpropyl)-1-aza-2-silacyclopentane, 2-methoxy-2-methyl-1-(3-dimethoxymethylsilylpropyl)-1-aza-2-silacyclopentane, and 2-ethoxy-2-ethyl-1-(3-diethoxyethylsilylpropyl)-1-aza-2-silacyclopentane.

Among these, from the viewpoint of reactivity and interactivity between a functional group of the coupling agent having a nitrogen atom-containing group and the inorganic filler such as silica, and from the viewpoint of processability, one in which m represents 2 and n represents 3 is preferred. Specifically, 2,2-dimethoxy-1-(3-trimethoxysilylpropyl)-1-aza-2-silacyclopentane and 2,2-diethoxy-1-(3-triethoxysilylpropyl)-1-aza-2-silacyclopentane are preferred.

The reaction temperature, the reaction time and the like in causing the coupling agent having a nitrogen atom-containing group represented by formula (A) to react with the polymer active end are not especially limited, and it is preferable to perform the reaction at 0° C. or more and 120° C. or less for 30 seconds or more.

A total mole number of an alkoxy group bonded to a silyl group of the compound used as the coupling agent having a nitrogen atom-containing group represented by the formula (A) is preferably 0.6 or more times and 3.0 or less times, more preferably 0.8 or more times and 2.5 or less times, and further preferably 0.8 or more times and 2.0 or less times of a mole number of an alkali metal compound and/or an alkaline earth metal compound to be added as a polymerization initiator. From the viewpoint that the thus obtained branched conjugated diene-based polymer has sufficient modification ratio and molecular weight and has a branch structure, the total mole number is preferably 0.6 times or more, and a branched conjugated diene-based polymer component is preferably obtained by coupling polymer ends for improving processability, and in addition, from the viewpoint of cost of the coupling agent, the total mole number is preferably 3.0 times or less.

A mole number of the polymerization initiator is preferably 3.0-fold moles or more, and more preferably 4.0-fold moles or more relative to the mole number of the coupling agent having a nitrogen atom-containing group represented by the formula (A).

Examples of the coupling agent having a nitrogen atom-containing group represented by the formula (B) include, but are not limited to, tris(3-trimethoxysilylpropyl)amine, tris(3-methyldimethoxysilylpropyl)amine, tris(3-triethoxysilylpropyl)amine, tris(3-methyldiethoxysilylpropyl)amine, tris(trimethoxysilylmethyl)amine, tris(2-trimethoxysilylethyl)amine, and tris(4-trimethoxysilylbutyl)amine.

Among these, from the viewpoint of reactivity and interactivity between a functional group of the coupling agent and the inorganic filler such as silica, and from the viewpoint of processability, one in which n, m and l in the formula (B) are all 3 is preferred. Preferable specific examples include tris(3-trimethoxysilylpropyl)amine, and tris(3-triethoxysilylpropyl)amine.

The reaction temperature, the reaction time and the like in causing the coupling agent having a nitrogen atom-containing group represented by formula (B) to react with the active end of the conjugated diene-based polymer obtained in the branching step are not especially limited, and it is preferable to perform the reaction at 0° C. or more and 120° C. or less for 30 seconds or more.

A total mole number of an alkoxy group bonded to a silyl group of the compound used as the coupling agent represented by the formula (B) is preferably 0.6 or more times and 3.0 or less times, more preferably 0.8 or more times and 2.5 or less times, and further preferably 0.8 or more times and 2.0 or less times of a mole number of lithium contained in the polymerization initiator. From the viewpoint that the branched conjugated diene-based polymer obtained by the production method of the present embodiment has sufficient modification ratio and molecular weight and has a branch structure, the total mole number is preferably 0.6 times or more, and a branched conjugated diene-based polymer component is preferably obtained by coupling polymer ends for improving processability, and in addition, from the viewpoint of cost of the coupling agent, the total mole number is preferably 3.0 times or less.

A mole number of the polymerization initiator is preferably 4.0-fold moles or more, and more preferably 5.0-fold moles or more relative to the mole number of the coupling agent having a nitrogen atom-containing group represented by the formula (B).

In the formula (C), A is preferably represented by any one of the following general formulas (II) to (V):

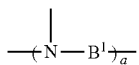

(II)

wherein B¹ represents a single bond, or a hydrocarbon group having 1 to 20 carbon atoms, and a represents an integer of 1 to 10; and B¹, if present in a plural number, are respectively independent.

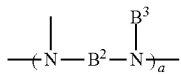

(III)

wherein B² represents a single bond, or a hydrocarbon group having 1 to 20 carbon atoms, B³ represents an alkyl group having 1 to 20 carbon atoms, and a represents an integer of 1 to 10; and each of B² and B³, if present in a plural number, is respectively independent.

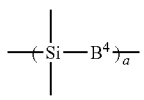

(IV)

wherein B⁴ represents a single bond, or a hydrocarbon group having 1 to 20 carbon atoms, and a represents an integer of 1 to 10; and B⁴, if present in a plural number, are respectively independent.

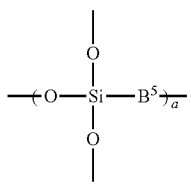

(V)

wherein B⁵ represents a single bond, or a hydrocarbon group having 1 to 20 carbon atoms, and a represents an integer of 1 to 10; and B⁵, if present in a plural number, are respectively independent.

Examples of the coupling agent having a nitrogen atom-containing group in which A is represented by the formula (II) in the formula (C) include, but are not limited to, tris(3-trimethoxysilylpropyl)amine, bis(3-trimethoxysilylpropyl)-[3-(2,2-dimethoxy-1-aza-2-silacyclopentane)propyl]amine, bis[3-(2,2-dimethoxy-1-aza-2-silacyclopentane)propyl]-(3-trimethoxysilylpropyl)amine, tris[3-(2,2-dimethoxy-1-aza-2-silacyclopentane)propyl]amine, tris(3-ethoxysilylpropyl)amine, bis(3-triethoxysilylpropyl)-[3-(2,2-diethoxy-1-aza-2-silacyclopentane)propyl]amine, bis[3-(2,2-diethoxy-1-aza-2-silacyclopentane)propyl]-(3-triethoxysilylpropyl)amine, tris[3-(2,2-diethoxy-1-aza-2-silacyclopentane)propyl]amine, tetrakis(3-trimethoxysilylpropyl)-1,3-propanediamine, tris(3-trimethoxysilylpropyl)-[3-(2,2-dimethoxy-1-aza-2-silacyclopentane)propyl]-1,3-propanediamine, bis(3-trimethoxysilylpropyl)-bis[3-(2,2-dimethoxy-1-aza-2-silacyclopentane)propyl]-1,3-propanediamine, tris[3-(2,2-dimethoxy-1-aza-2-silacyclopentane) propyl]-(3-trimethoxysilylpropyl)-1,3-propanediamine, tetrakis[3-(2,2-dimethoxy-1-aza-2-silacyclopentane)propyl]-1,3-propanediamine, tris(3-trimethoxysilylpropyl)-[3-(1-methoxy-2-trimethylsilyl-1-sila-2-azacyclopentane)propyl]-1,3-propanediamine, bis(3-trimethoxysilylpropyl)-[3-(2,2-dimethoxy-1-aza-2-silacyclopentane)propyl]-[3-(1-methoxy-2-trimethylsilyl-1-sila-2-azacyclopentane)propyl]-1,3-propanediamine, bis[3-(2,2-dimethoxy-1-aza-2-silacyclopentane)propyl]-(3-trimethoxysilylpropyl)-[3-(1-methoxy-2-trimethylsilyl-1-sila-2-azacyclopentane)propyl]-1,3-propanediamine, tris[3-(2,2-dimethoxy-1-aza-2-silacyclopentane)propyl]-[3-(1-methoxy-2-trimethylsilyl-1-sila-2-azacyclopentane)propyl]-1,3-propanediamine, tetrakis(3-triethoxysilylpropyl)-1,3-propanediamine, tris(3-triethoxysilylpropyl)-[3-(2,2-diethoxy-1-aza-2-silacyclopentane) propyl]-1,3-propanediamine, bis(3-triethoxysilylpropyl)-bis[3-(2,2-diethoxy-1-aza-2-silacyclopentane)propyl]-1,3-propanediamine, tris[3-(2,2-diethoxy-1-aza-2-silacyclopentane)propyl]-(3-triethoxysilylpropyl)-1,3-propanediamine, tetrakis[3-(2,2-diethoxy-1-aza-2-silacyclopentane) propyl]-1,3-propanediamine, tris(3-triethoxysilylpropyl)-[3-(1-ethoxy-2-trimethylsilyl-1-sila-2-azacyclopentane) propyl]-1,3-propanediamine, bis(3-triethoxysilylpropyl)-[3-(2,2-diethoxy-1-aza-2-silacyclopentane)propyl]-[3-(1-ethoxy-2-trimethylsilyl-1-sila-2-azacyclopentane)propyl]-1,3-propanediamine, bis[3-(2,2-diethoxy-1-aza-2-silacyclopentane)propyl]-(3-triethoxysilylpropyl)-[3-(1-ethoxy-2-trimethylsilyl-1-sila-2-azacyclopentane)propyl]-1,3-propanediamine, tris[3-(2,2-diethoxy-1-aza-2-silacyclopentane)propyl]-[3-(1-ethoxy-2-trimethylsilyl-1-sila-2-azacyclopentane)propyl]-1,3-propanediamine, tetrakis(3-trimethoxysilylpropyl)-1,3-bisaminomethylcyclohexane, tris(3-trimethoxysilylpropyl)-[3-(2,2-dimethoxy-1-aza-2-silacyclopentane)propyl]-1,3-bisaminomethylcyclohexane, bis(3-trimethoxysilylpropyl)-bis[3-(2,2-dimethoxy-1-aza-2-silacyclopentane)propyl]-1,3-bisaminomethylcyclohexane, tris[3-(2,2-dimethoxy-1-aza-2-silacyclopentane)propyl]-(3-trimethoxysilylpropyl)-1,3-bisaminomethylcyclohexane, tetrakis[3-(2,2-dimethoxy-1-aza-2-silacyclopentane)propyl]-1,3-propanediamine, tris(3-trimethoxysilylpropyl)-[3-(1-methoxy-2-trimethylsilyl-1-sila-2-azacyclopentane)propyl]-1,3-bisaminomethylcyclohexane, bis(3-trimethoxysilylpropyl)-[3-(2,2-dimethoxy-1-aza-2-silacyclopentane)propyl]-[3-(1-methoxy-2-trimethylsilyl-1-sila-2-azacyclopentane)propyl]-1,3-bisaminomethylcyclohexane, bis[3-(2,2-dimethoxy-1-aza-2-silacyclopentane)propyl]-(3-trimethoxysilylpropyl)-[3-(1-methoxy-2-trimethylsilyl-1-sila-2-azacyclopentane)propyl]-1,3-bisaminomethylcyclohexane, tris[3-(2,2-dimethoxy-1-aza-2-silacyclopentane)propyl]-[3-(1-methoxy-2-trimethylsilyl-1-sila-2-azacyclopentane)propyl]-1,3-bisaminomethylcyclohexane, tetrakis(3-triethoxysilylpropyl)-1,3-propanediamine, tris(3-triethoxysilylpropyl)-[3-(2,2-diethoxy-1-aza-2-silacyclopentane)propyl]-1,3-bisaminomethylcyclohexane, bis(3-triethoxysilylpropyl)-bis[3-(2,2-diethoxy-1-aza-2-silacyclopentane)propyl]-1,3-bisaminomethylcyclohexane, tris[3-(2,2-diethoxy-1-aza-2-silacyclopentane)propyl]-(3-triethoxysilylpropyl)-1,3-propanediamine, tetrakis[3-(2,2-diethoxy-1-aza-2-silacyclopentane)propyl]-1,3-propanediamine, tris(3-triethoxysilylpropyl)-[3-(1-ethoxy-2-trimethylsilyl-1-sila-2-azacyclopentane)propyl]-1,3-bisaminomethylcyclohexane, bis(3-triethoxysilylpropyl)-[3-(2,2-diethoxy-1-aza-2-silacyclopentane)propyl]-[3-(1-ethoxy-2-trimethylsilyl-1-sila-2-azacyclopentane)propyl]-1,3-bisaminomethylcyclohexane, bis[3-(2,2-diethoxy-1-aza-2-silacyclopentane)propyl]-(3-triethoxysilylpropyl)-[3-(1-ethoxy-2-trimethylsilyl-1-sila-2-azacyclopentane)propyl]-1,3-bisaminomethylcyclohexane, tris[3-(2,2-diethoxy-1-aza-2-silacyclopentane)propyl]-[3-(1-ethoxy-2-trimethylsilyl-1-sila-2-azacyclopentane)propyl]-1,3-bisaminomethylcyclohexane, tetrakis(3-trimethoxysilylpropyl)-1,6-hexamethylenediamine, and pentakis(3-trimethoxysilylpropyl)-diethylenetriamine.

Examples of the coupling agent having a nitrogen atom-containing group in which A is represented by the formula (III) in the formula (C) include, but are not limited to, tris(3-trimethoxysilylpropyl)-methyl-1,3-propanediamine, bis(2-trimethoxysilylpropyl)-[3-(2,2-dimethoxy-1-aza-2-silacyclopentane)propyl]-methyl-1,3-propanediamine, bis[3-(2,2-dimethoxy-1-aza-2-silacyclopentane)propyl]-(3-trimethoxysilylpropyl)-methyl-1,3-propanediamine, tris(3-triethoxysilylpropyl)-methyl-1,3-propanediamine, bis(2-triethoxysilylpropyl)-[3-(2,2-diethoxy-1-aza-2-silacyclopentane)propyl]-methyl-1,3-propanediamine, bis[3-(2,2-diethoxy-1-aza-2-silacyclopentane)propyl]-(3-triethoxysilylpropyl)-methyl-1,3-propanediamine, N1,N1'-(propane-1,3-diyl)bis(N1-methyl-N3,N3-bis(3-(trimethoxysilyl)propyl)-1,3-propanediamine), and N1-(3-(bis(3-(trimethoxysilyl)propyl)amino)propyl)-N1-methyl-N3-(3-(methyl(3-(trimethoxysilyl)propyl)amino)propyl)-N3-(3-(trimethoxysilyl)propyl)-1,3-propanediamine.

Examples of the coupling agent having a nitrogen atom-containing group in which A is represented by the formula (IV) in the formula (C) include, but are not limited to, tetrakis[3-(2,2-dimethoxy-1-aza-2-silacyclopentane)propyl]silane, tris[3-(2,2-dimethoxy-1-aza-2-silacyclopentane)propyl]-(3-trimethoxysilylpropyl)silane, tris[3-(2,2-dimethoxy-1-aza-2-silacyclopentane)propyl]-[3-(1-methoxy-2-trimethylsilyl-1-sila-2-azacyclopentane)propyl]silane, bis(3-trimethoxysilylpropyl)-bis[3-(2,2-dimethoxy-1-aza-2-silacyclopentane)propyl]silane, (3-trimethoxysilyl)-[3-(1-methoxy-2-trimethylsilyl-1-sila-2-azacyclopentane)-bis[3-(2,2-dimethoxy-1-aza-2-silacyclopentane)propyl]silane, bis[3-(1-methoxy-2-trimethylsilyl-1-sila-2-azacyclopentane)-bis[3-(2,2-dimethoxy-1-aza-2-silacyclopentane)propyl]silane, tris(3-trimethoxysilylpropyl)-[3-(2,2-dimethoxy-1-aza-2-silacyclopentane)propyl]silane, bis(3-trimethoxysilylpropyl)-[3-(1-methoxy-2-trimethylsilyl-1-sila-2-azacyclopentane)propyl]-[3-(2,2-dimethoxy-1-aza-2-silacyclopentane)propyl]silane, bis[3-(1-methoxy-2-trimethylsilyl-1-sila-2-azacyclopentane)propyl]-bis(3-trimethoxysilylpropyl)silane, and bis(3-trimethoxysilylpropyl)-bis[3-(1-methoxy-2-methyl-1-sila-2-azacyclopentane)propyl]silane.

Examples of the coupling agent having a nitrogen atom-containing group in which A is represented by the formula (V) in the formula (C) include, but are not limited to, 3-tris[2-(2,2-dimethoxy-1-aza-2-silacyclopentane)ethoxy]silyl-1-(2,2-dimethoxy-1-aza-2-silacyclopentane)propane, and 3-tris[2-(2,2-dimethoxy-1-aza-2-silacyclopentane)ethoxy]silyl-1-trimethoxysilylpropane.

It is preferable that A is represented by the formula (II) or (III), and k represents 0 in the formula (C).

Such a coupling agent having a nitrogen atom-containing group tends to be easily available, and tends to make the branched conjugated diene-based polymer obtained by the production method of the present embodiment more excellent in abrasion resistance and a low hysteresis loss property when in the form of a vulcanizate. Examples of such a coupling agent having a nitrogen atom-containing group include, but are not limited to, bis(3-trimethoxysilylpropyl)-[3-(2,2-dimethoxy-1-aza-2-silacyclopentane)propyl]amine, tris(3-trimethoxysilylpropyl)amine, tris(3-triethoxysilylpropyl)amine, tris(3-trimethoxysilylpropyl)-[3-(2,2-dimethoxy-1-aza-2-silacyclopentane)propyl]-1,3-propanediamine, tetrakis[3-(2,2-dimethoxy-1-aza-2-silacyclopentane)propyl]-1,3-propanediamine, tetrakis(3-trimethoxysilylpropyl)-1,3-propanediamine, tetrakis(3-trimethoxysilylpropyl)-1,3-bisaminomethylcyclohexane, tris(3-trimethoxysilylpropyl)-methyl-1,3-propanediamine, and bis[3-(2,2-dimethoxy-1-aza-2-silacyclopentane)propyl]-(3-trismethoxysilylpropyl)-methyl-1,3-propanediamine.

It is more preferable that, in the formula (C), A is represented by the formula (II) or (III), k represents 0, and a represents an integer of 2 to 10 in the formula (II) or (III).

Thus, abrasion resistance and a low hysteresis loss property obtained when in the form of a vulcanizate tend to be more excellent.

Examples of such a coupling agent having a nitrogen atom-containing group include, but are not limited to, tetrakis[3-(2,2-dimethoxy-1-aza-2-silacyclopentane)propyl]-1,3-propanediamine, tetrakis(3-trimethoxysilylpropyl)-1,3-propanediamine, tetrakis(3-trimethoxysilylpropyl)-1,3-bisaminomethylcyclohexane, and $N_1$-(3-(bis(3-trimethoxysilyl)propyl)amino)propyl)-$N_1$-methyl-$N_3$-(3-(methyl(3-(trimethoxysilyl)propyl)amino)propyl)-$N_3$-(3-(trimethoxysilyl)propyl)-1,3-propanediamine.

The amount of the compound represented by the formula (C) to be added as the coupling agent having a nitrogen atom-containing group can be adjusted for causing the coupling agent to react with the conjugated diene-based polymer in such a manner that a mole number of the coupling agent relative to a mole number of the conjugated diene-based polymer can be in a desired stoichiometric ratio, and thus, a desired star highly branched structure tends to be attained.

The mole number of the polymerization initiator is preferably 5.0-fold moles or more, and more preferably 6.0-fold moles or more relative to the mole number of the coupling agent having a nitrogen atom-containing group represented by the formula (C).

In this case, in the formula (C), the number of functional groups of the coupling agent ((m−1)×i+p×j+k) is preferably an integer of 5 to 10, and more preferably an integer of 6 to 10.

In the branched conjugated diene-based polymer obtained by the production method of the present embodiment, a ratio of a polymer having a nitrogen atom-containing group in the polymer is expressed as a modification ratio.

The modification ratio is preferably 60% by mass or more, more preferably 65% by mass or more, further preferably 70% by mass or more, still further preferably 75% by mass or more, still further preferably 80% by mass or more, and particularly preferably 82% by mass or more.

If the modification ratio is 60% by mass or more, there is a tendency that processability obtained when used for obtaining a vulcanizate is excellent, and that abrasion resistance and a low hysteresis loss property when in the form of a vulcanizate are more excellent.

<Polymerization Termination Step>

In the production method for the branched conjugated diene-based polymer of the present embodiment, a reaction step of reacting the active end of the conjugated diene-based polymer obtained through the polymerizing step and the branching step with the coupling agent or the polymerization terminator can be performed.

A polymerization termination step is preferably, for example, a polymerization termination step performed on the active end of the conjugated diene-based polymer with a difunctional reactive compound, or a polymerization termination step performed with a polymerization terminator having a nitrogen atom-containing group (hereinafter both sometimes referred to as the "polymerization terminator").

In the polymerization termination step, a polymerization termination reaction is caused on, for example, the polymer active end obtained in the branching step with a difunctional reactive compound or a polymerization terminator having a nitrogen atom-containing group, and thus, a target branched conjugated diene-based polymer can be obtained.

[Difunctional Reactive Compound]

The difunctional reactive compound used in the polymerization termination step in the production method for the branched conjugated diene-based polymer of the present embodiment may have any structure, and is preferably a difunctional reactive compound having a silicon atom.

[Polymerization Terminator Having Nitrogen Atom-Containing Group]

The polymerization terminator having a nitrogen atom-containing group used in the polymerization termination step in the production method for the branched conjugated diene-based polymer of the present embodiment may have any structure, and preferably has a functional group reactive with the conjugated diene-based polymer.

From the viewpoint of improvement of low fuel consumption performance, the polymerization terminator having a nitrogen atom-containing group is preferably an alkoxy compound having a nitrogen atom-containing group. Examples of the polymerization terminator having a nitrogen atom-containing group include 3-(N,N-dimethylaminopropyl)dimethoxymethylsilane, 3-(N,N-diethylaminopropyl)dimethoxymethylsilane, 3-(N,N-dipropylaminopropyl)dimethoxymethylsilane, 3-(N,N-dimethylaminopropyl)diethoxymethylsilane, 3-(N,N-diethylaminopropyl)diethoxymethylsilane, 3-(N,N-dipropylaminopropyl)diethoxymethylsilane, 3-(N,N-dimethylaminopropyl)dimethoxyethylsilane, 3-(N,N-diethylaminopropyl)dimethoxyethylsilane, 3-(N,N-dipropylaminopropyl)dimethoxyethylsilane, 3-(N,N-dimethylaminopropyl)diethoxyethylsilane, 3-(N,N-diethylaminopropyl)diethoxyethylsilane, and 3-(N,N-dipropylaminopropyl)diethoxyethylsilane.

The branch structure of the branched conjugated diene-based polymer obtained by the production method of the present embodiment through the polymerizing step, the branching step and the reaction step has preferably 8 branches or more and 36 branches or less, more preferably 10 branches or more and 24 branches or less, and further preferably 12 branches or more and 20 branches or less.

A total number of branch points in the branched conjugated diene-based polymer obtained by the production method of the present embodiment is preferably 2 or more, more preferably 3 or more, further preferably 4 or more, and much further preferably 5 or more.

If the branch structure and the total number of branch points fall in the above-described ranges, processability, low fuel consumption performance and abrasion resistance tend to be excellent.

In order to construct a branched conjugated diene-based polymer having a branch structure of 8 branches or more and 36 branches or less, and if it is a modified polymer, having a total number of branch points of 2 or more and 15 or less, it is necessary to use a branching agent having a molar ratio to the polymerization initiator of 1/2 or less and 1/100 or more, and a coupling agent having three or more functional groups. If it is a polymer not requiring modification, the number of branch points may be 1 or more.

If the branch structure has 8 branches or more and 36 branches or less, in order to construct one having a total number of branch points of 3 or more and 12 or less, it is preferable to set the molar ratio of the branching agent to 1/3 or less and 1/50 or more of that of the polymerization initiator and to use a coupling agent having 4 or more functional groups.

If the branch structure has 10 branches or more and 24 branches or less, in order to construct one having a total number of branch points of 4 or more and 10 or less, it is preferable to set the molar ratio of the branching agent to 1/6 or less and 1/25 or more of that of the polymerization initiator and to use a coupling agent having 5 or more functional groups.

If the branch structure has 12 branches or more and 20 branches or less, in order to construct one having a total number of branch points of 5 or more and 9 or less, it is preferable to set the molar ratio of the branching agent to 1/8 or less and 1/12 or more of that of the polymerization initiator and to use a coupling agent having 6 or more functional groups.

(Condensation Reaction Step)

In the production method for the branched conjugated diene-based polymer of the present embodiment, a condensation reaction step of performing a condensation reaction in the presence of a condensation accelerator may be performed after the coupling step, or before the coupling step.

(Hydrogenating Step)

In the production method for the branched conjugated diene-based polymer of the present embodiment, a hydrogenating step of hydrogenating a conjugated diene portion may be performed.

A method for hydrogenating the conjugated diene portion of the conjugated diene-based polymer of the present embodiment is not especially limited, and any of known methods can be employed.

As a suitable hydrogenation method, a method in which the hydrogenation is performed by blowing gaseous hydrogen into the polymer solution in the presence of a catalyst can be employed. Examples of the catalyst include, but are not limited to, heterogeneous catalysts such as a catalyst containing a noble metal supported on a porous inorganic substance; and homogenous catalysts such as a catalyst obtained by reacting a solubilized salt of nickel, cobalt or the like with organic aluminum or the like, and a catalyst using metallocene such as titanocene. Among these catalysts, from the viewpoint that a mild hydrogenation condition can be selected, a titanocene catalyst is preferably used. In addition, hydrogenation of an aromatic group can be performed by using a noble metal-supported catalyst.

Examples of the hydrogenation catalyst include, but are not limited to, (1) a supported heterogeneous hydrogenation catalyst obtained by supporting a metal such as Ni, Pt, Pd or Ru on carbon, silica, alumina or diatomite, (2) what is called a ziegler catalyst using an organic acid salt of Ni, Co, Fe, Cr or the like, or a transition metal salt such as acetylacetone salt, and a reducing agent such as organic aluminum, and (3) what is called an organic metal complex such as an organic metal compound of Ti, Ru, Rh or Zr. Furthermore, examples of the hydrogenation catalyst include, but are not especially limited to, known hydrogenation catalysts described in, for example, Japanese Patent Publication No. 42-8704, Japanese Patent Publication No. 43-6636, Japanese Patent Publication No. 63-4841, Japanese Patent Publication No. 1-37970, Japanese Patent Publication No. 1-53851, Japanese Patent Publication No. 2-9041 and Japanese Patent Laid-Open No. 8-109219. A preferable hydrogenation catalyst is a reaction mixture of a titanocene compound and a reducing organic metal compound.

(Step of Adding Deactivator and Neutralizer)

In the production method for the branched conjugated diene-based polymer of the present embodiment, a deactivator, a neutralizer or the like may be added, if necessary, to the polymer solution after the coupling step described above.

Examples of the deactivator include, but are not limited to, water; and alcohols such as methanol, ethanol and isopropanol.

Examples of the neutralizer include, but are not limited to, carboxylic acids such as stearic acid, oleic acid and versatic acid (a mixture of highly branched carboxylic acids having 9 to 11 carbon atoms, mainly 10 carbon atoms); and an aqueous solution of an inorganic acid, and a carbon dioxide gas.

(Step of Adding Stabilizer for Rubber)

In the production method for the branched conjugated diene-based polymer of the present embodiment, from the viewpoints of preventing gel formation after the polymerization and of improving stability in the processing, a stabilizer for rubber is preferably added.

As the stabilizer for rubber, any of known stabilizers, not limited to the following, can be used, and preferable examples include antioxidants such as 2,6-di-tert-butyl-4-hydroxytoluene (hereinafter also referred to as BHT), n-octadecyl-3-(4'-hydroxy-3',5'-di-tert-butylphenol)propionate, and 2-methyl-4,6-bis[(octylthio)methyl]phenol.

(Step of Adding Rubber Softener)

In the production method for the branched conjugated diene-based polymer of the present embodiment, a rubber softener may be added if necessary from the viewpoint of further improving productivity of the branched conjugated diene-based polymer and processability in obtaining a resin composition by blending a filler or the like.

The rubber softener is not especially limited, and for example, an extender oil, a liquid rubber, a resin or the like can be used.

A preferable example of a method for adding the rubber softener to the branched conjugated diene-based polymer includes, but is not limited to, a method in which the rubber softener is added to a solution of the branched conjugated diene-based polymer, the resultant is mixed to obtain a polymer solution containing the rubber softener, and the resultant solution is desolvated.

Examples of the preferable extender oil include an aroma oil, a naphthenic oil and a paraffin oil. Among these oils, from the viewpoint of environmental safety, oil bleeding prevention and wet grip characteristics, an aroma-alternative oil containing 3% by mass or less of a polycyclic aromatic (PCA) component according to the IP 346 is preferred. Examples of the aroma-alternative oil include TDAE (Threated Distillate Aromatic Extracts), MES (Mild Extraction Solvate) and the like mentioned in Kautschuk Gummi Kunststoffe 52 (12) 799 (1999), and RAE (Residual Aromatic Extracts).

Examples of the preferable liquid rubber include, but are not limited to, liquid polybutadiene and liquid styrene-butadiene rubber.

As effects obtained by adding the liquid rubber, not only processability in forming a resin composition by blending the branched conjugated diene-based polymer and a filler or the like can be improved but also there is a tendency that abrasion resistance, a low hysteresis loss property and a low temperature characteristic obtained when in the form of a vulcanizate can be improved because a glass transition temperature of the resin composition can be shifted to a lower temperature.

Examples of a resin used as the rubber softener include, but are not limited to, an aromatic petroleum resin, a coumarone-indene resin, a terpene-based resin, a rosin derivative (including a wood oil resin), tall oil, a derivative of tall oil, a rosin ester resin, a natural or synthetic terpene resin, an aliphatic hydrocarbon resin, an aromatic hydrocarbon resin, a mixed aliphatic/aromatic hydrocarbon resin, a coumarin-indene resin, a phenol resin, a p-tert-butylphenol-acetylene resin, a phenol-formaldehyde resin, a xylene-formaldehyde resin, a monoolefin oligomer, a diolefin oligomer, a hydrogenated aromatic hydrocarbon resin, a cyclic aliphatic hydrocarbon resin, a hydrogenated hydrocarbon resin, a hydrocarbon resin, a hydrogenated wood oil resin, a hydrogenated oil resin, an ester of a hydrogenated oil resin and a monofunctional or polyfunctional alcohol. One of these resins may be singly used, or two or more of these may be used together. When hydrogenated, all unsaturated groups may be hydrogenated, or some may be left not hydrogenated.

As effects obtained by adding the resin as the rubber softener, not only processability in forming a resin composition by blending the branched conjugated diene-based polymer and a filler or the like can be improved but also there is a tendency that fracture strength obtained when in the form of a vulcanizate can be improved, and in addition, there is a tendency that wet skid resistance can be improved because a glass transition temperature of the resin composition can be shifted to a higher temperature.

An amount of the extender oil, the liquid rubber, the resin or the like to be added as the rubber softener is not especially limited, and is preferably 1 part by mass or more and 60 parts by mass or less, more preferably 5 parts by mass or more and 50 parts by mass or less, and further preferably 10 parts by mass or more and 37.5 parts by mass or less based on 100 parts by mass of the branched conjugated diene-based polymer obtained by the production method of the present embodiment.

If the rubber softener is added in an amount falling in this range, there is a tendency that processability obtained in the form of a resin composition by blending the branched conjugated diene-based polymer obtained by the production method of the present embodiment and a filler or the like is good, and that fracture strength and abrasion resistance when in the form of a vulcanizate are good.

(Desolvating Step)

In the production method for the branched conjugated diene-based polymer of the present embodiment, any of known methods can be employed as a method for obtaining the resultant branched conjugated diene-based polymer from the polymer solution. Examples of the method include, but are not especially limited to, a method in which the polymer is filtered after separating the solvent by steam stripping or the like, and the resultant is dehydrated and dried to obtain the polymer, a method in which the solution is concentrated in a flushing tank, and the resultant is devolatilized by using a bent extruder or the like, and a method in which the solution is directly devolatilized by using a drum dryer or the like.

[Branched Conjugated Diene-Based Polymer]

Now, a preferable aspect of a branched conjugated diene-based polymer obtained by the production method for the branched conjugated diene-based polymer of the present embodiment will be described.

In the preferable aspect of the branched conjugated diene-based polymer of the present embodiment, the branched conjugated diene-based polymer has 1 or more side chains in a polymer chain, and has a branch number (Bn) measured by viscosity detector-equipped GPC-light scattering measurement of 1 or more, and the branched conjugated diene-based polymer contains a sulfur atom and a silicon atom, a molar ratio of the silicon atom to the sulfur atom being 1.05 or more and less than 10, and has a Mooney viscosity measured at 100° C. of 40 or more and 170 or less.

If the branched conjugated diene-based polymer of the present embodiment has the above-described structure in particular, it has excellent processability when used for obtaining a vulcanizate, and exhibits particularly excellent abrasion resistance and fracture strength when in the form of a vulcanizate.

The branch number (Bn) measured by viscosity detector-equipped GPC-light scattering measurement of 1 or more means that a polymer chain has 1 or more side chains.

With the structure of the polymer chain specified, the Mooney viscosity and the mole number of a silicon atom to a sulfur atom are specified to specific ranges, and an amount of bound vinyl in a conjugated diene bond unit and an amount of an aromatic vinyl compound are arbitrarily adjusted, and thus, a glass transition temperature (hereinafter also referred to as the "Tg") can be arbitrarily adjusted with attaining processability when used for obtaining a vulcanizate.

For example, when an amount of bound vinyl in a conjugated diene bond unit and an amount of an aromatic vinyl compound are set to be small, the Tg of the branched conjugated diene-based polymer is lowered, and abrasion resistance and fracture strength when in the form of a vulcanizate are improved, and thus, there is a tendency that a rubber composition further excellent in a low hysteresis loss property can be obtained.

Alternatively, when an amount of bound vinyl in a conjugated diene bond unit and an amount of an aromatic vinyl compound are set to be large, the Tg of the branched conjugated diene-based polymer is increased, and processability when used for obtaining a vulcanizate is improved, and thus, there is a tendency that a rubber composition further excellent in wet skid resistance can be obtained.

(Mooney Viscosity)

The branched conjugated diene-based polymer of the present embodiment has 1 or more side chains in the polymer, has a branch number (Bn) measured by viscosity detector-equipped GPC-light scattering measurement of 1 or more, and has a structure in which a branch structure may be included in a side chain as described later.

In general, a polymer having a branch structure tends to have a smaller molecule as compared with a straight-chain polymer having the same molecular weight. Therefore, in employing a molecular weight in terms of polystyrene obtained by gel permeation chromatography (hereinafter also referred to as "GPC"), which is relative comparison with a standard polystyrene sample for screening a polymer in accordance with the size of a molecule, the molecular weight of the polymer having a branch structure tends to be underestimated.

On the other hand, as for an absolute molecular weight measured by viscosity detector-equipped GPC-light scattering measurement, a molecular weight (absolute molecular weight) is measured by directly observing the size of a molecule by a light scattering method, and hence, as compared with a molecular weight in terms of polystyrene obtained by gel permeation chromatography (GPC), is not affected by a structure of the polymer or interaction with a column filler. Therefore, there is a tendency that the molecular weight can be accurately measured without being affected by a polymer structure such as a branch structure of a conjugated diene-based polymer, but is easily affected by a detection method employed by a light scattering detector. Therefore, this molecular weight is effective for relative comparison under specific measurement conditions, but it is difficult to specify a true structure of the conjugated diene-based polymer.

On the other hand, a Mooney viscosity is an index indicating comprehensive characteristics of a branched conjugated diene-based polymer including information on a molecular weight, a molecular weight distribution, a branch number, and a content of a softener of the branched conjugated diene-based polymer. Besides, a measurement method for a Mooney viscosity is defined by ISO 289, has a small error in measured values caused by a device difference, and is extremely effective for controlling performance of a branched conjugated diene-based polymer.

A viscosity is generally grasped as an index alternative to a molecular weight, but it is difficult to accurately grasp the molecular weight of a polymer having a branch structure, and hence, the present inventors set a Mooney viscosity as one of requirements of the branched conjugated diene-based polymer of the present embodiment.

The branched conjugated diene-based polymer of the present embodiment has a Mooney viscosity (hereinafter also referred to as "ML") measured at 100° C. of preferably 40 or more and 170 or less.

If the molecular weight is decreased to adjust the ML to be low, or if the ML is adjusted to be low by adding a softener (such as an oil), abrasion resistance and fracture strength when in the form of a vulcanizate usually tend to be deteriorated.

In other words, in order to obtain a branched conjugated diene-based polymer exhibiting desired performance, it is insufficient to control a molecular weight or control a Mooney viscosity alone. Therefore, in the present embodiment, from the viewpoint of increasing an elastic modulus of a rubber composition, not only a Mooney viscosity but also the structure of a side chain of a polymer, a branch number, and a molar ratio of a silicon atom to a sulfur atom in the polymer are specified, and thus, abrasion resistance and fracture strength of a vulcanizate are improved without impairing processability of the rubber composition.

From the viewpoint of productivity of the branched conjugated diene-based polymer, processability obtained when in the form of a rubber composition by blending a filler or the like, and abrasion resistance and fracture strength obtained when the rubber composition is formed into a vulcanizate, the branched conjugated diene-based polymer of the present embodiment has a Mooney viscosity measured at 100° C. of preferably 40 or more and 170 or less, more preferably 50 or more and 150 or less, and further preferably 55 or more and 130 or less.

If the Mooney viscosity measured at 100° C. is 40 or more, abrasion resistance and fracture strength when in the form of a vulcanizate tend to be improved, and if the Mooney viscosity measured at 100° C. is 170 or less, a problem otherwise occurring in production of the branched conjugated diene-based polymer is suppressed, and processability in obtaining a rubber composition by blending a filler or the like tends to be good.

In the branched conjugated diene-based polymer of the present embodiment, the Mooney viscosity can be controlled by adjusting a molecular weight as described above or by adding a prescribed amount of a rubber softener.

Specifically, the Mooney viscosity can be controlled to fall in the above-described numerical range by adding 1 part by mass or more and 60 parts by mass or less of a rubber softener described later to 100 parts by mass of the branched conjugated diene-based polymer. If the branched conjugated diene-based polymer of the present embodiment is produced by continuous polymerization, from the viewpoint of productivity in a desolvation step, the polymer is generally extended by using an oil or the like as long as the performance of the branched conjugated diene-based polymer is not impaired. Therefore, the present inventors paid attention to that processability and the like of the polymer can be suitably controlled by specifying physical properties in an extended and finished state not in a state of the simple polymer, and presumed that the Mooney viscosity should be specified in a state where a softener is contained if the polymer is finished with the softener added, resulting in determining the above-described definition.

In measurement of the Mooney viscosity, a plate sample obtained by using a press from the branched conjugated diene-based polymer is used and set in an apparatus, the sample is first preheated at 100° for 1 minute, a rotor is rotated at 2 rpm, a torque is measured 4 minutes after, and the thus measured value is determined as a Mooney viscosity ($ML_{(1+4)}$). More specifically, the measurement can be performed by a method described below in examples.

(Side Chain)

The branched conjugated diene-based polymer of the present embodiment in the preferable aspect has a branch number (Bn) obtained by viscosity detector-equipped GPC-light scattering measurement of 1 or more. This means that the polymer has a structure including 1 or more side chains in a polymer chain.

A side chain of the branched conjugated diene-based polymer of the present embodiment indicates that there are 1 or more polymer chains branched from a longest polymer chain.

A side chain can be formed, specifically, by a method in which a polymer chain is introduced into the longest polymer chain via a branching agent described later.

The number of side chains in a polymer chain can be controlled to a desired number by selecting a structure of a branching agent described later, an amount of the branching agent to be added, and a structure of a modifier described later.

The number of side chains of the branched conjugated diene-based polymer of the present embodiment is 1 or more, preferably 2 or more, more preferably 4 or more, and further preferably 5 or more.

If the number of side chains falls in this range, the branched conjugated diene-based polymer tends to be excellent in processability obtained when used for obtaining a vulcanizate, and excellent in abrasion resistance and fracture strength when in the form of a vulcanizate.

An upper limit of the number of side chains of the branched conjugated diene-based polymer of the present embodiment is not especially limited, but in industrial production, is practically 25 or less, more preferably 23 or less, and further preferably 20 or less.

If the number of side chains in a polymer chain of the branched conjugated diene-based polymer of the present embodiment is, for example, 25 or less, there is a tendency that a compound excellent in balance between processability obtained when used for obtaining a vulcanizate, and abrasion resistance and fracture performance when in the form of a vulcanizate, which are properties conflicting with each other, can be obtained.

If the number of side chains in a polymer chain is 1 or more, processability obtained when used for obtaining a vulcanizate is good, and in addition, there is a tendency that a compound excellent in balance between low fuel consumption performance and wet skid resistance when in the form of a vulcanizate, which are properties conflicting with each other, can be obtained.

The structure including 1 or more side chains in a polymer chain has been generally formed as a structure in which a branch structure is introduced by performing a coupling reaction on an end of the polymer chain to bond a uniform polymer chain in a star shape starting from a coupling agent. A side chain is preferably formed by using a branching agent, however, because the length of a polymer chain bonded to a side chain, the number of polymer chains, and the length of a main polymer chain can be arbitrarily adjusted by adjusting timing of adding the branching agent, the structure of the branching agent, and the amount to be added, freedom in designing a polymer structure is high, and there is a tendency that a polymer well balanced in desired physical properties can be easily obtained.

The number of side chains of the branched conjugated diene-based polymer is a sum of branches obtained by the coupling reaction of an end, and branches obtained by the branching agent, and hence can be appropriately set in accordance with the structure of the branched conjugated diene-based polymer to be produced, such as the Mooney viscosity, the ratio between a silicon atom and a sulfur atom, the molecular weight, the amount of vinyl, and the amount of aromatic vinyl, and production steps, such as setting of a polymerization initiator, and whether or not a branching step and a modifying step are to be performed.

In the present embodiment, the number of side chains theoretically obtained based on the type of a coupling agent and an amount thereof to be added, and the type of a branching agent and an amount thereof to be added can be obtained as a branch number (Bn) measured by viscosity detector-equipped GPC-light scattering measurement described later.

(Conjugated Diene-Based Polymer Containing Silicon Atom and Sulfur Atom)

The branched conjugated diene-based polymer of the present embodiment in the preferable aspect contains a silicon atom and a sulfur atom.

Since the branched conjugated diene-based polymer of the present embodiment has a branch number of 1 or more, and has a silicon atom and a sulfur atom, it is excellent in processability obtained when used for obtaining a vulcanizate, and excellent in abrasion resistance and fracture performance when in the form of a vulcanizate.

From the viewpoint of the effect to obtain excellent processability when used for obtaining a vulcanizate, a molar ratio between a silicon atom and a sulfur atom tends to be largely involved. Specifically, if a molar ratio of a silicon atom to a sulfur atom (silicon atom/sulfur atom) is high, the amount of a branching agent to be added is large, and the number of side chains in a polymer chain tends to be large. In this case, processability obtained when used for forming a vulcanizate tends to be more excellent.

In the branched conjugated diene-based polymer in the preferable aspect, the influence of the positions where a silicon atom and a sulfur atom are introduced on the properties is small, and hence, a silicon atom and a sulfur atom may be introduced to any positions.

A silicon atom can be introduced into the branched conjugated diene-based polymer as a residue of a branching agent having a silicon atom with the number of branches of the polymer increased through main chain branching, for example, by reacting the conjugated diene-based polymer with the branching agent. Alternatively, it can be introduced into the branched conjugated diene-based polymer as a residue of a modifier having a silicon atom by reacting the branched conjugated diene-based polymer with the modifier.

A sulfur atom can be introduced into the conjugated diene-based polymer as a residue of a modifier having a sulfur atom by, for example, reacting the conjugated diene-based polymer with the modifier.

If a modifier having a sulfur atom is reacted with the active end of the conjugated diene-based polymer, the sulfur atom can be placed at an end of a polymer chain, and the end of the polymer chain can be vulcanized. Therefore, the number of free polymer ends from a crosslinking point is reduced, crosslinking efficiency is improved, an interface between a silica surface of a filler and the polymer becomes rigid, and thus, a rubber composition excellent in low fuel consumption performance tends to be obtained.

(Molar Ratio of Silicon Atom to Sulfur Atom)

The branched conjugated diene-based polymer of the present embodiment in the preferable aspect has a branch number of 1 or more, and has a structure containing a silicon atom and a sulfur atom, and a molar ratio of a silicon atom to a sulfur atom (silicon atom/sulfur atom) is 1.05 or more and less than 10, preferably 1.07 or more and less than 8, more preferably 1.1 or more and less than 7, and further preferably 1.12 or more and less than 6.

The branched conjugated diene-based polymer having a mole ratio of a silicon atom to a sulfur atom falling in this range tends to be excellent in abrasion resistance and fracture performance when in the form of a vulcanizate.

In an aspect where a branching agent used for forming a main chain branch contains a silicon atom and an end modifier contains a sulfur atom, the silicon atom is derived from a total amount of a residue of the branching agent and a residue of the modifier, and the sulfur atom is derived from the residue of the modifier. If a mole ratio of a silicon atom to a sulfur atom is large, an amount of the branching agent to be added is large, and in this case, processability obtained when used for obtaining a vulcanizate tends to be excellent. If a mole ratio of a silicon atom to a sulfur atom is small, the amount of the branching agent to be added is small, and abrasion resistance and fracture performance when in the form of a vulcanizate tend to be excellent.

A molar ratio of a silicon atom to a sulfur atom can be controlled to fall in the numerical range by adjusting the types of the branching agent and the modifier, and the amounts thereof to be added.

(Branch Number (Bn))

The number of side chains in the branched conjugated diene-based polymer of the present embodiment can be expressed as a branch number (Bn) obtained by viscosity detector-equipped GPC-light scattering measurement (hereinafter also simply referred to as the branch number (Bn)).

In the branched conjugated diene-based polymer of the present embodiment in the preferable aspect having the above-described structure, namely, having 1 or more side chains in a polymer chain, having the branch number (Bn) obtained by viscosity detector-equipped GPC-light scattering measurement of 1 or more, containing a sulfur atom and a silicon atom, a molar ratio of the silicon atom to the sulfur atom being 1.05 or more and less than 10, and having a Mooney viscosity measured at 100° C. of 40 or more and 170 or less, from the viewpoints of processability, abrasion resistance, and fracture strength, the branch number (Bn) obtained by viscosity detector-equipped GPC-light scattering measurement is 1 or more, preferably 2 or more and 25 or less, and more preferably 3 or more and 20 or less.

For example, the branch number (Bn) of 4 or more means that the branched conjugated diene-based polymer of the present embodiment has 4 or more polymer chains of side chains with respect to a substantially longest polymer main chain.

The branch number (Bn) of a branched conjugated diene-based polymer is defined, by using a contracting factor (g') measured by viscosity detector-equipped GPC-light scattering measurement, as $g'=6Bn/\{(Bn+1)(Bn+2)\}$.

In general, a polymer having a branch tends to have a smaller molecule when compared with a straight-chain polymer having the same absolute molecular weight.

The contracting factor (g') is an index of a size ratio occupied by a molecule in a straight-chain polymer assumed to have the same absolute molecular weight. In other words, when the branch number of a polymer is increased, the contracting factor (g') tends to be reduced.

For the contracting factor, an intrinsic viscosity is used as an index of the size of a molecule in the present embodiment, and a straight-chain polymer is assumed to satisfy the relationship: intrinsic viscosity $[\eta]=-3.883 M^{0.771}$, wherein M represents an absolute molecular weight.

The contracting factor expresses, however, a decreasing ratio of the size of a molecule and does not accurately express a branch structure of the polymer.

Therefore, the branch number (Bn) of the branched conjugated diene-based polymer is calculated by using a value of the contracting factor (g') obtained at each absolute molecular weight of the branched conjugated diene-based polymer. The thus calculated "branch number (Bn)" accurately expresses the number of polymers directly or indirectly bonded to a longest main chain structure.

The calculated branch number (Bn) can be an index expressing a branch structure of a branched conjugated diene-based polymer. For example, in a general 4-branched star polymer (having 4 polymer chains connected to a center portion), two polymer chain arms are bonded to a longest highly branched main chain structure, and hence the branch number (Bn) is evaluated as 2.

The branched conjugated diene-based polymer of the present embodiment in the preferable aspect has a branch number (Bn) of 1 or more, and preferably 2 or more and 25 or less, and such a case means that it is a modified conjugated diene-based polymer having, as a star polymer structure, branches similar to a 3-branched to 27-branched star polymer structure.

Here, a "branch" is formed by a direct or indirect bond of one polymer to another polymer. Besides, the "branch number (Bn)" corresponds to the number of polymers directly or indirectly bonded to a longest main chain structure.

Since the branch number (Bn) is 1 or more, and preferably 2 or more and 25 or less, the branched conjugated diene-based polymer of the present embodiment is extremely excellent in processability obtained when used for obtaining a vulcanizate, and excellent in abrasion resistance and fracture strength when in the form of a vulcanizate.

In general, increase of an absolute molecular weight tends to deteriorate processability, and when an absolute molecular weight is increased in a straight chain polymer structure, a vulcanizate obtained therefrom is largely increased in the viscosity and largely deteriorated in the processability.

Therefore, even when a large number of functional groups are introduced into the polymer to improve affinity and/or reactivity with silica to be blended as a filler, there arises a problem that the silica cannot be sufficiently dispersed in the polymer in a kneading step. As a result, the function of the introduced functional groups cannot be exhibited, and hence, there is a tendency that an originally expected effect of improving a low hysteresis loss property and wet skid resistance by the introduction of the functional groups cannot be exhibited.

On the other hand, since the branched conjugated diene-based polymer of the present embodiment is specified to have a branch number (Bn) of 1 or more, and preferably 2 or more and 25 or less, the increase of the viscosity of a vulcanizate obtained therefrom due to increase of the absolute molecular weight is largely suppressed, and hence the polymer can be sufficiently mixed with silica or the like in the kneading step, so that the silica can be dispersed around the branched conjugated diene-based polymer. As a result, abrasion resistance and fracture strength can be improved by setting a molecular weight of the branched conjugated diene-based polymer to be high, and in addition, silica can be dispersed around the polymer by sufficient kneading so as to make functional groups act and/or react, and thus, the polymer can attain practically sufficient low hysteresis loss property and wet skid resistance.

The absolute molecular weight of the branched conjugated diene-based polymer can be measured by a method described in the examples below.

The branch number (Bn) of the branched conjugated diene-based polymer of the present embodiment can be controlled to have a desired value by adjusting the type and an amount to be blended of the branching agent described later.

(Side Chain Structure)

Preferably, the branched conjugated diene-based polymer of the present embodiment has, in a part of the polymer chain, a portion derived from a vinyl-based monomer containing an alkoxysilyl group or a halosilyl group, and has a side chain in the portion derived from the vinyl-based monomer containing an alkoxysilyl group or a halo silyl group.

The side chain has, in terms of branch points in the portion derived from the vinyl-based monomer containing an alkoxysilyl group or a halosilyl group, 1 or more branch points, preferably 3 or more branch points, and further preferably 4 or more branch points.

Besides, the branch point forming the side chain preferably includes at least 1 or more polymer chains, more preferably includes 2 or more polymer chains that are not main chains, and further preferably includes 4 or more polymer chains that are not main chains.

Particularly in a main chain branch structure containing a vinyl-based monomer containing an alkoxysilyl group or a halosilyl group, a peak derived from the main chain branch structure is detected, in signal detection by 29Si-NMR, in a range of −45 ppm to −65 ppm, and more restrictively in a range of −50 ppm to −60 ppm.

The branched conjugated diene-based polymer of the present embodiment in the preferable aspect has a structure in which an end of a polymer chain is modified with a modifier containing a sulfur atom, a part of the polymer chain has a portion derived from the vinyl-based monomer containing an alkoxysilyl group or a halosilyl group, and the portion derived from the vinyl-based monomer containing an alkoxysilyl group or a halosilyl group has another main chain branch structure.

Examples of a method for obtaining the branched conjugated diene-based polymer having the above-described structure include a method in which polymerization is performed by using an organolithium compound as a polymerization initiator, a branching agent for imparting specific branch points is further added during or after the polymerization, and modification is performed by using a modifier containing a sulfur atom for imparting a specific branching ratio after continuing the polymerization. Here, a modifying group can be controlled by adjusting the number of functional groups and an amount to be added of the modifier containing sulfur, and a main chain branch structure can be controlled by adjusting the number of functional groups, and an amount to be added and addition timing of the branching agent.

Control means for such polymerization conditions will be described in a production method in the examples described below.

(Details of Side Chain Structure)

In the branched conjugated diene-based polymer of the present embodiment, it is preferable that the portion derived from the vinyl-based monomer containing an alkoxysilyl group or a halosilyl group is a monomer unit based on a compound represented by the following formula (4) or (5), and contains a branch point of a polymer chain containing the monomer unit based on the compound represented by the formula (4) or (5).

The branched conjugated diene-based polymer of the present embodiment is more preferably a branched conjugated diene-based polymer obtained by using a coupling agent, and is further preferably a modified conjugated diene-based polymer with at least one end of a conjugated diene-based polymer modified with a sulfur atom-containing group.

(4)

(5)

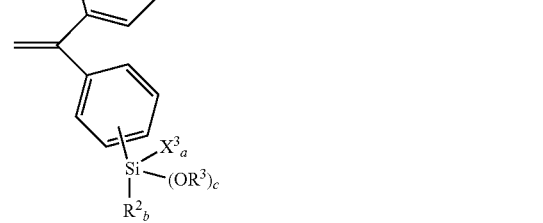

wherein, in the formula (4), $R^1$ represents a hydrogen atom, or an alkyl group having 1 to 20 carbon atoms or an aryl group having 6 to 20 carbon atoms, and may have a branch structure in a part thereof;

$R^2$ and $R^3$ each independently represent an alkyl group having 1 to 20 carbon atoms, or an aryl group having 6 to 20 carbon atoms, and may have a branch structure in a part thereof;

each of $R^1$ to $R^3$, if present in a plural number, is respectively independent;

$X^1$ represents an independent halogen atom; and m represents an integer of 0 to 2, n represents an integer of 0 to 3, l represents an integer of 0 to 3, and (m+n+l) is 3; and in the formula (5), $R^2$ to $R^5$ each independently represent an alkyl group having 1 to 20 carbon atoms, or an aryl group having 6 to 20 carbon atoms, and may have a branch structure in a part thereof, and each of $R^2$ to $R^5$, if present in a plural number, is respectively independent;

$X^2$ and $X^3$ represent an independent halogen atom;

m represents an integer of 0 to 2, n represents an integer of 0 to 3, l represents an integer of 0 to 3, and (m+n+l) is 3; and a represents an integer of 0 to 2, b represents an integer of 0 to 3, c represents an integer of 0 to 3, and (a+b+c) is 3.

The branched conjugated diene-based polymer of the present embodiment is preferably a branched conjugated diene-based polymer having a monomer unit based on a compound represented by the formula (4) in which $R^1$ is a hydrogen atom, and m is 0. Thus, the branch number is improved, and an effect of improving abrasion resistance and processability can be obtained.

Alternatively, the branched conjugated diene-based polymer of the present embodiment is preferably a branched conjugated diene-based polymer having a monomer unit based on a compound represented by the formula (5) in which m is 0, and b is 0. Thus, the effect of improving abrasion resistance and processability can be obtained.

Alternatively, the branched conjugated diene-based polymer of the present embodiment is preferably a branched conjugated diene-based polymer having a monomer unit based on a compound represented by the formula (5) in which m is 0, l is 0, n is 3, a is 0, b is 0, and c is 3. Thus, the effect of improving abrasion resistance and processability can be obtained.

Alternatively, the branched conjugated diene-based polymer of the present embodiment is more preferably a branched conjugated diene-based polymer having a monomer unit based on a compound represented by the formula (4) in $R^1$ is a hydrogen atom, m is 0, l is 0, and n is 3. Thus, the modification ratio and the branch number are improved, and an effect of improving low fuel consumption performance, abrasion resistance and processability can be obtained.

(Branching Agent)

In the branched conjugated diene-based polymer of the present embodiment, a branching agent represented by the following formula (4) or (5) is preferably used as a branching agent in constructing a main chain branch structure.

It is preferable that the portion derived from the vinyl-based monomer containing an alkoxysilyl group or a halosilyl group is a monomer unit based on a compound represented by the following formula (4) or (5), and the branched conjugated diene-based polymer of the present embodiment preferably has a structure having a branch point of a polymer chain containing a monomer unit based on a compound represented by the following formula (4) or (5).

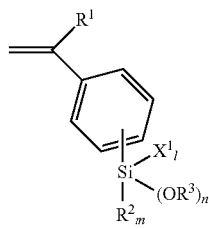

(4)

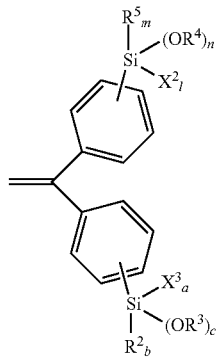

(5)

wherein, in the formula (4), $R^1$ represents a hydrogen atom, or an alkyl group having 1 to 20 carbon atoms or an aryl group having 6 to 20 carbon atoms, and may have a branch structure in a part thereof;

$R^2$ and $R^3$ each independently represent an alkyl group having 1 to 20 carbon atoms, or an aryl group having 6 to 20 carbon atoms, and may have a branch structure in a part thereof;

each of $R^1$ to $R^3$, if present in a plural number, is respectively independent;

$X^1$ represents an independent halogen atom; and m represents an integer of 0 to 2, n represents an integer of 0 to 3, l represents an integer of 0 to 3, and (m+n+l) is 3; and in the formula (5), $R^2$ to $R^5$ each independently represent an alkyl group having 1 to 20 carbon atoms, or an aryl group having 6 to 20 carbon atoms, and may have a branch structure in a part thereof, and each of $R^2$ to $R^5$, if present in a plural number, is respectively independent;

$X^2$ and $X^3$ represent an independent halogen atom;

m represents an integer of 0 to 2, n represents an integer of 0 to 3, l represents an integer of 0 to 3, and (m+n+l) is 3; and a represents an integer of 0 to 2, b represents an integer of 0 to 3, c represents an integer of 0 to 3, and (a+b+c) is 3.

From the viewpoints of continuity of the polymerization and improvement of the branch number, the branching agent used in constructing a main chain branch structure of the branched conjugated diene-based polymer of the present embodiment is preferably a compound of the formula (4) in which $R^1$ is a hydrogen atom, and m is 0.

Alternatively, in the present embodiment, from the viewpoint of improvement of the branch number, the branching agent used in constructing a main chain branch structure of the branched conjugated diene-based polymer is preferably a compound of the formula (5) in which m is 0, and b is 0.

In the present embodiment, from the viewpoints of continuity of the polymerization and improvement of the modification ratio and the branch number, the branching agent used in constructing a main chain branch structure of the branched conjugated diene-based polymer is more preferably a compound of the formula (4) in which $R^1$ is a hydrogen atom, m is 0, 1 is 0, and n is 3.

In the present embodiment, from the viewpoint of improvement of the modification ratio and the branch number, the branching agent used in constructing a main chain branch structure of the branched conjugated diene-based polymer is preferably a compound of the formula (5) in which m is 0, 1 is 0, n is 3, a is 0, b is 0, and c is 3.

Examples of the branching agent represented by the formula (4) include, but are not limited to, trimethoxy(4-vinylphenyl)silane, triethoxy(4-vinylphenyl)silane, tripropoxy(4-vinylphenyl)silane, tributoxy(4-vinylphenyl)silane, triisopropoxy(4-vinylphenyl)silane, trimethoxy(3-vinylphenyl)silane, triethoxy(3-vinylphenyl)silane, tripropoxy(3-vinylphenyl)silane, tributoxy(3-vinylphenyl)silane, triisopropoxy(3-vinylphenyl)silane, trimethoxy(2-vinylphenyl)silane, triethoxy(2-vinylphenyl)silane, tripropoxy(2-vinylphenyl)silane, tributoxy(2-vinylphenyl)silane, triisopropoxy(2-vinylphenyl)silane, dimethoxymethyl(4-vinylphenyl)silane, diethoxymethyl(4-vinylphenyl)silane, dipropoxymethyl(4-vinylphenyl)silane, dibutoxymethyl(4-vinylphenyl)silane, diisopropoxymethyl(4-vinylphenyl)silane, dimethoxymethyl(3-vinylphenyl)silane, diethoxymethyl(3-vinylphenyl)silane, dipropoxymethyl(3-vinylphenyl)silane, dibutoxymethyl(3-vinylphenyl)silane, diisopropoxymethyl(3-vinylphenyl)silane, dimethoxymethyl(2-vinylphenyl)silane, diethoxymethyl(2-vinylphenyl)silane, dipropoxymethyl(2-vinylphenyl)silane, dibutoxymethyl(2-vinylphenyl)silane, diisopropoxymethyl(2-vinylphenyl)silane, dimethylmethoxy(4-vinylphenyl)silane, dimethylethoxy(4-vinylphenyl)silane, dimethylpropoxy(4-vinylphenyl)silane, dimethylbutoxy(4-vinylphenyl)silane, dimethylisopropoxy(4-vinylphenyl)silane, dimethylmethoxy(3-vinylphenyl)silane, dimethylethoxy(3-vinylphenyl)silane, dimethylpropoxy(3-vinylphenyl)silane, dimethylbutoxy(3-vinylphenyl)silane, dimethylisopropoxy(3-vinylphenyl)silane, dimethylmethoxy(2-vinylphenyl)silane, dimethylethoxy(2-vinylphenyl)silane, dimethylpropoxy(2-vinylphenyl)silane, dimethylbutoxy(2-vinylphenyl)silane, dimethylisopropoxy(2-vinylphenyl)silane, trimethoxy(4-isopropenylphenyl)silane, triethoxy(4-isopropenylphenyl)silane, tripropoxy(4-isopropenylphenyl)silane, tributoxy(4-isopropenylphenyl)silane, triisopropoxy(4-isopropenylphenyl)silane, trimethoxy(3-isopropenylphenyl)silane, triethoxy(3-isopropenylphenyl)silane, tripropoxy(3-isopropenylphenyl)silane, tributoxy(3-isopropenylphenyl)silane, triisopropoxy(3-isopropenylphenyl)silane, trimethoxy(2-isopropenylphenyl)silane, triethoxy(2-isopropenylphenyl)silane, tripropoxy(2-isopropenylphenyl)silane, tributoxy(2-isopropenylphenyl)silane, triisopropoxy(2-isopropenylphenyl)silane, dimethoxymethyl(4-isopropenylphenyl)silane, diethoxymethyl(4-isopropenylphenyl)silane, dipropoxymethyl(4-isopropenylphenyl)silane, dibutoxymethyl(4-isopropenylphenyl)silane, diisopropoxymethyl(4-isopropenylphenyl)silane, dimethoxymethyl(3-isopropenylphenyl)silane, diethoxymethyl(3-isopropenylphenyl)silane, dipropoxymethyl(3-isopropenylphenyl)silane, dibutoxymethyl(3-isopropenylphenyl)silane, diisopropoxymethyl(3-isopropenylphenyl)silane, dimethoxymethyl(2-isopropenylphenyl)silane, diethoxymethyl(2-isopropenylphenyl)silane, dipropoxymethyl(2-isopropenylphenyl)silane, dibutoxymethyl(2-isopropenylphenyl)silane, diisopropoxymethyl(2-isopropenylphenyl)silane, dimethylmethoxy(4-isopropenylphenyl)silane, dimethylethoxy(4-isopropenylphenyl)silane, dimethylpropoxy(4-isopropenylphenyl)silane, dimethylbutoxy(4-isopropenylphenyl)silane, dimethylisopropoxy(4-isopropenylphenyl)silane, dimethylmethoxy(3-isopropenylphenyl)silane, dimethylethoxy(3-isopropenylphenyl)silane, dimethylpropoxy(3-isopropenylphenyl)silane, dimethylbutoxy(3-isopropenylphenyl)silane, dimethylisopropoxy(3-isopropenylphenyl)silane, dimethylmethoxy(2-isopropenylphenyl)silane, dimethylethoxy(2-isopropenylphenyl)silane, dimethylpropoxy(2-isopropenylphenyl)silane, dimethylbutoxy(2-isopropenylphenyl)silane, dimethylisopropoxy(2-isopropenylphenyl)silane, trichloro(4-vinylphenyl)silane, trichloro(3-vinylphenyl)silane, trichloro(2-vinylphenyl)silane, tribromo(4-vinylphenyl)silane, tribromo(3-vinylphenyl)silane, tribromo(2-vinylphenyl)silane, dichloromethyl(4-vinylphenyl)silane, dichloromethyl(3-vinylphenyl)silane, dichloromethyl(2-vinylphenyl)silane, dibromomethyl(4-vinylphenyl)silane, dibromomethyl(3-vinylphenyl)silane, dibromomethyl(2-vinylphenyl)silane, dimethylchloro(4-vinylphenyl)silane, dimethylchloro(3-vinylphenyl)silane, dimethylchloro(2-vinylphenyl)silane, dimethylbromo(4-vinylphenyl)silane, dimethylbromo(3-vinylphenyl)silane, and dimethylbromo(2-vinylphenyl)silane.

Among these, trimethoxy(4-vinylphenyl)silane, triethoxy(4-vinylphenyl)silane, tripropoxy(4-vinylphenyl)silane, tributoxy(4-vinylphenyl)silane, triisopropoxy(4-vinylphenyl)silane, trimethoxy(3-vinylphenyl)silane, triethoxy(3-vinylphenyl)silane, tripropoxy(3-vinylphenyl)silane, tributoxy(3-vinylphenyl)silane, triisopropoxy(3-vinylphenyl)silane, and trichloro(4-vinylphenyl)silane are preferred, and trimethoxy(4-vinylphenyl)silane, triethoxy(4-vinylphenyl)silane, tripropoxy(4-vinylphenyl)silane, tributoxy(4-vinylphenyl)silane, and triisopropoxy(4-vinylphenyl)silane are more preferred.

Examples of the branching agent represented by the formula (5) include, but are not limited to, 1,1-bis(4-trimethoxysilylphenyl)ethylene, 1,1-bis(4-triethoxysilylphenyl)ethylene, 1,1-bis(4-tripropoxysilylphenyl)ethylene, 1,1-bis(4-tripentoxysilylphenyl)ethylene, 1,1-bis(4-triisopropoxysilylphenyl)ethylene, 1,1-bis(3-trimethoxysilylphenyl)ethylene, 1,1-bis(3-triethoxysilylphenyl)ethylene, 1,1-bis(3-tripropoxysilylphenyl)ethylene, 1,1-bis(3-tripentoxysilylphenyl)ethylene, 1,1-bis(3-triisopropoxysilylphenyl)ethylene, 1,1-bis(2-trimethoxysilylphenyl)ethylene, 1,1-bis(2-triethoxysilylphenyl)ethylene, 1,1-bis(3-tripropoxysilylphenyl)ethylene, 1,1-bis(2-tripentoxysilylphenyl)ethylene, 1,1-bis(2-triisopropoxysilylphenyl)ethylene, 1,1-bis(4-(dimethylmethoxysilyl)phenyl)ethylene, 1,1-bis(4-(diethylmethoxysilyl)phenyl)ethylene, 1,1-bis(4-(dipropylmethoxysilyl)phenyl)ethylene, 1,1-bis(4-(dimethylethoxysilyl)phenyl)ethylene, 1,1-bis(4-(diethylethoxysilyl)phenyl)ethylene, and 1,1-bis(4-(dipropylethoxysilyl)phenyl)ethylene.

Among these, 1,1-bis(4-trimethoxysilylphenyl)ethylene, 1,1-bis(4-triethoxysilylphenyl)ethylene, 1,1-bis(4-tripropoxysilylphenyl)ethylene, 1,1-bis(4-tripentoxysilylphenyl)ethylene, and 1,1-bis(4-triisopropoxysilylphenyl)ethylene are preferred, and 1,1-bis(4-trimethoxysilylphenyl)ethylene is more preferred.

(Modifier)

In a preferable aspect of the branched conjugated diene-based polymer of the present embodiment, the branched conjugated diene-based polymer contains a sulfur atom and a silicon atom.

The branched conjugated diene-based polymer of the present embodiment is preferably modified with a prescribed modifier, and the modifier used in the modifying step is preferably a compound having a sulfur atom, and more preferably a compound having a silicon atom and a sulfur atom.

The branched conjugated diene-based polymer containing a silicon atom and a sulfur atom of the present embodiment can be obtained, for example, by reacting a branched conjugated diene-based polymer by using a modifier containing a silicon atom and a sulfur atom described below.

The branched conjugated diene-based polymer of the present embodiment is more preferably a branched conjugated diene-based polymer obtained by performing a modification reaction on the active end of the branched conjugated diene-based polymer obtained through the polymerizing and branching steps by using a reactive compound containing a silicon atm and a sulfur atom.

If the branched conjugated diene-based polymer having been modified by using the modifier containing a silicon atom and a sulfur atom is formed into a rubber composition by blending a filler or the like such as silica, and the resultant is vulcanized, the number of free polymer ends from a crosslinking point is reduced, crosslinking efficiency is improved, an interface between a silica surface of the filler and the polymer becomes rigid, and thus, low fuel consumption performance tends to be excellent.

In other words, the branched conjugated diene-based polymer modified with the modifier tends to be good in silica dispersibility, be good in processability of a rubber composition obtained by blending a filler or the like, and attain good abrasion resistance and fracture strength when the rubber composition is formed into a vulcanizate.

The modifier containing a silicon atom and a sulfur atom is not limited, and for example, a sulfide group-containing alkoxysilane compound is preferred. A compound having a silane sulfide structure in which a sulfide group is substituted with an alkylsilane compound is more preferred.

The silane sulfide structure in which a sulfide group is substituted with an alkylsilane compound forms a thiol group through elimination of alkoxysilane in a desolvation step described later. Owing to the thus generated thiol group, in obtaining a rubber composition by blending a filler such as silica, interaction with silica is increased to improve dispersibility of the silica in the polymer, and thus, low fuel consumption performance tends to be improved, and processability tends to be good.

Besides, when the rubber composition is formed into a vulcanizate, an end of a polymer chain is crosslinked due to the sulfur atom introduced into the end of the polymer chain, and hence, the number of free polymer ends from a crosslinking point is reduced, crosslinking efficiency is improved, and thus, abrasion resistance and fracture performance when in the form of a vulcanizate tend to be excellent.

The modifier containing a silicon atom and a sulfur atom is preferably a silane sulfide compound represented by the following formula (3), and the branched conjugated diene-based polymer of the present embodiment is preferably modified with the silane sulfide compound of the formula (3):

$(R^1O)_x(R^2)_y Si-R^3-S-SiR^4_3$ (3)

wherein Si represents a silicon atom, O represents an oxygen atom, and S represents a sulfur atom;
x represents an integer of 1 to 3, y represents 0, or an integer of 1 to 2, and x+y is 3; and $R^1$, $R^2$, $R^4$ may be the same or different, and represent an alkyl group having 1 to 16 carbon atoms, and $R^3$ represents an aryl group having 6 to 16 carbon atoms, an alkylene group having 1 to 16 carbon atoms, or an alkyl chain having 1 to 16 carbon atoms.

Specific examples of the silane sulfide compound represented by the formula (3) have been described above.

(Coupling Agent)

The branched conjugated diene-based polymer of the present embodiment in the preferable aspect is particularly preferably coupled with a coupling agent containing at least one compound selected from the group consisting of tin halide, tin alkoxide, silicon halide, and alkoxysilane.

Besides, the branched conjugated diene-based polymer of the present embodiment may be in the form of a branched conjugated diene-based polymer composition partly containing one coupled as described above, or may be wholly coupled.

The coupling agent may have a coupling function alone, or may be a coupling agent also having a modifying function for introducing sulfur and/or silicon into a polymer.

If the coupling agent does not contain silicon and/or sulfur, from the viewpoint of controlling physical properties of a rubber composition obtained by blending a filler such as silica, it is preferable to modify a part of the polymer with the above-described modifier, and to further add the coupling agent to adjust a molecular weight and/or a branch number of a remaining unmodified conjugated diene-based polymer.

In the branched conjugated diene-based polymer to which the coupling agent has been added, a ratio of a high molecular weight component is increased, and abrasion resistance and fracture performance when in the form of a vulcanizate tend to be excellent.

The coupling agent is selected from the group consisting of tin halide, tin alkoxide, silicon halide, and alkoxysilane. One of these coupling agents may be singly used, or two or more of these may be used together.

In the present embodiment, an amount of the coupling agent to be added is, in terms of a mole number of a functional group of the coupling agent to the mole number of the polymerizing initiator involved in polymerization (hereinafter referred to as the number of equivalents), preferably 0 or more and 0.6 equivalents or less, more preferably 0.1 equivalents or more and 0.5 equivalents or less, and further preferably 0.2 equivalents or more and 0.4 equivalents or less.

The number of functional groups of the coupling agent is defined as the mole number of halogen in using a tin halide compound or a silicon halide compound.

In using a tin alkoxide compound or an alkoxysilane compound, in general, alkoxy groups bonded to tin atoms and silicon atoms are not all reacted but 1 alkoxy group per tin atom or silicon atom tends to remain.

Accordingly, the functional group of a tin alkoxide compound or an alkoxysilane compound is defined as a number obtained by subtracting 1 from the number of alkoxy groups bonded to the same tin atom or silicon atom. More specifically, the number of functional groups of the coupling agent is calculated assuming that a tetraalkoxytin (silyl) compound is trifunctional, a trialkoxytin (silyl) compound is difunctional, a dialkoxytin (silyl) compound is monofunctional, and a monoalkoxysilyl group is 0-functional.

Examples of the tin halide compound used as the coupling agent include, but are not limited to, tin tetrachloride, tin tetrabromide, tin tetrafluoride, methyl trichlorostannane, tris(trimethylsiloxy)chlorostannane, tris(dimethylamino)chlorostannane, hexachlorodistannane, bis(trichlorostannane) methane, 1,2-bis(trichlorostannane)ethane, 1,2-bis (methyldichlorostannane)ethane, 1,4-bis(trichlorostannane) butane, and 1,4-bis(methyldichlorostannane)butane.

Examples of the silicon halide compound used as the coupling agent include, but are not limited to, methyl trichlorosilane, tetrachlorosilane, tris(trimethylsiloxy)chlorosilane, tris(dimethylamino)chlorosilane, hexachlorodisilane, bis(trichlorosilyl)methane, 1,2-bis(trichlorosilyl)ethane, 1,2-bis(methyldichlorosilyl)ethane, 1,4-bis (trichlorosilyl)butane, and 1,4-bis(methyldichlorosilyl) butane.

Examples of the tin alkoxide compound used as the coupling agent include, but are not limited to, tetramethoxystannane, tetraethoxystannane, triphenoxymethylstannane, and 1,2-bis(triethoxystannane)ethane.

Examples of the alkoxysilane compound used as the coupling agent include, but are not limited to, tetramethoxysilane, tetraethoxysilane, triphenoxymethylsilane, 1,2-bis (triethoxysilyl)ethane, and methoxy-substituted polyorganosiloxane.

[Branched Conjugated Diene-Based Polymer Composition]

A branched conjugated diene-based polymer composition of the present embodiment contains a branched conjugated diene-based polymer produced by the production method for the branched conjugated diene-based polymer of the present embodiment described above, or the branched conjugated diene-based polymer in the preferable aspect described above.

Specifically, the branched conjugated diene-based polymer composition contains 10% by mass or more and less than 100% by mass of a branched conjugated diene-based polymer having 1 or more side chains in a polymer chain and having a branch number (Bn) measured by viscosity detector-equipped GPC-light scattering measurement of 1 or more, containing a sulfur atom and a silicon atom, a molar ratio of the silicon atom to the sulfur atom being 1.05 or more and less than 10, and having a Mooney viscosity measured at 100° C. of 40 or more and 170 or less.

If the content of the branched conjugated diene-based polymer of the present embodiment in the branched conjugated diene-based polymer composition of the present embodiment is 10% by mass or more, an effect of excellent abrasion resistance and fracture performance when in the form of a vulcanizate can be obtained. From this point of view, the content of the branched conjugated diene-based polymer is preferably 20% by mass or more, and more preferably 30% by mass or more.

The branched conjugated diene-based polymer composition of the present embodiment may contain, in the branched conjugated diene-based polymer, a coupled conjugated diene-based polymer obtained through the coupling step described above.

Preferably, it may contain a branched conjugated diene-based polymer coupled with at least one compound selected from the group consisting of tin halide, tin alkoxide, silicon halide, and alkoxysilane.

In another aspect, the branched conjugated diene-based polymer composition of the present embodiment may contain the branched conjugated diene-based polymer of the present embodiment, and a rubber softener.

In this structure, from the viewpoint of productivity in producing the branched conjugated diene-based polymer, a content of the rubber softener is preferably 1 to 60 parts by mass, more preferably 5 to 55 parts by mass, and further preferably 10 to 50 parts by mass based on 100 parts by mass of the branched conjugated diene-based polymer.

[Rubber Composition and Production Method for Rubber Composition]

A rubber composition of the present embodiment contains a rubber component containing 10% by mass or more of the branched conjugated diene-based polymer produced by the production method of the present embodiment described above, and 5.0 parts by mass or more and 150 parts by mass or less of a filler based on 100 parts by mass of the rubber component.

A production method for the rubber composition of the present embodiment includes a step of obtaining the branched conjugated diene-based polymer by the above-described production method, a step of obtaining a rubber component containing 10% by mass or more of the branched conjugated diene-based polymer, and a step of causing 5.0 parts by mass or more and 150 parts by mass or less of a filler to be contained based on 100 parts by mass of the rubber component.

If the branched conjugated diene-based polymer obtained by the production method of the present embodiment is contained in the rubber component in an amount of 10% by mass or more, low fuel consumption performance, processability, and abrasion resistance can be improved.

The filler preferably contains a silica-based inorganic filler.

If a silica-based inorganic filler is dispersed as the filler in the rubber composition, the rubber composition tends to be more excellent in processability obtained when used for obtaining a vulcanizate and tends to be more excellent in abrasion resistance and fracture strength, and balance between a low hysteresis loss property and wet skid resistance when in the form of a vulcanizate.

Also when the rubber composition is to be used in application to a vulcanized rubber such as a tire, a vehicle component such as an anti-vibration rubber, or shoes, a silica-based inorganic filler is preferably contained.

The rubber composition of the present embodiment is obtained by mixing the rubber component containing 10% by mass or more of the branched conjugated diene-based polymer obtained by the above-described production method with the filler.

The rubber component may contain a rubber-like polymer different from the branched conjugated diene-based polymer described above (hereinafter simply referred to as the "rubber-like polymer").

Examples of such a rubber-like polymer include, but are not limited to, a conjugated diene-based polymer or a hydrogenated product thereof, a random copolymer of a conjugated diene-based compound and a vinyl aromatic compound, or a hydrogenated product thereof, a block copolymer of a conjugated diene-based compound and a vinyl aromatic compound, or a hydrogenated product thereof as well as a non-diene-based polymer and a natural rubber.

Examples of the rubber-like polymer include a butadiene rubber or a hydrogenated product thereof, an isoprene rubber or a hydrogenated product thereof, styrene-based elastomers such as a styrene-butadiene rubber or a hydrogenated product thereof, and a styrene-butadiene block copolymer or a hydrogenated product thereof, a styrene-isoprene block copolymer or a hydrogenated product thereof, and an acrylonitrile-butadiene rubber or a hydrogenated product thereof.

Examples of the non-diene-based polymer include, but are not limited to, olefin-based elastomers such as an ethylene-propylene rubber, an ethylene-propylene-diene rubber, an ethylene-butene-diene rubber, an ethylene-butene rubber, an ethylene-hexene rubber and an ethylene-octene rubber, a butyl rubber, a brominated butyl rubber, an acrylic rubber, a fluorine rubber, a silicone rubber, a chlorinated polyethylene rubber, an epichlorohydrin rubber, an α,β-unsaturated nitrile-acrylic acid ester-conjugated diene copolymer rubber, a urethane rubber and a polysulfide rubber.

Examples of the natural rubber include, but are not limited to, smoked sheets of RSS Nos. 3 to 5, SMR and epoxidized natural rubber.

The above-described various rubber-like polymers may be in the form of a modified rubber imparted with a functional group having polarity such as a hydroxyl group or an amino group. When used for a tire, a butadiene rubber, an isoprene rubber, a styrene-butadiene rubber, a natural rubber and a butyl rubber are preferably used.

The weight average molecular weight of the rubber-like polymer is, from the viewpoint of balance between various performances of the rubber composition and processing characteristics, preferably 2,000 or more and 2,000,000 or less, and more preferably 5,000 or more and 1,500,000 or less. Besides, a rubber-like polymer having a low molecular weight, namely, what is called a liquid rubber, can be used.

One of these rubber-like polymers may be singly used, or two or more of these may be used together.

In obtaining the rubber composition using the branched conjugated diene-based polymer obtained by the production method of the present embodiment as the rubber composition containing the rubber-like polymer, a content ratio (in a mass ratio) of the branched conjugated diene-based polymer described above to the rubber-like polymer is, in terms of (the branched conjugated diene-based polymer/the rubber-like polymer), preferably 10/90 or more and 100/0 or less, more preferably 20/80 or more and 90/10 or less, and further preferably 50/50 or more and 80/20 or less.

Accordingly, the rubber component contains, based on the total amount (100% by mass) of the rubber component, preferably 10% by mass or more and 100% by mass or less, more preferably 20% by mass or more and 90% by mass or less, and further preferably 50% by mass or more and 80% by mass or less of the branched conjugated diene-based polymer.

If the content ratio of (the branched conjugated diene-based polymer/the rubber-like polymer) falls in the above-described range, there is a tendency that abrasion resistance and fracture strength when in the form of a vulcanizate are excellent, and that balance between a low hysteresis loss property and wet skid resistance is good.

Examples of the filler contained in the rubber composition include, but are not limited to, the silica-based inorganic filler as well as carbon black, a metal oxide, and a metal hydroxide. Among these, the silica-based inorganic filler is preferred.

One of these fillers may be singly used, or two or more of these may be used together.

A content of the filler in the rubber composition is 5.0 parts by mass or more and 150 parts by mass or less, preferably 20 parts by mass or more and 100 parts by mass or less, and further preferably 30 parts by mass or more and 90 parts by mass or less based on 100 parts by mass of the rubber component containing the branched conjugated diene-based polymer.

From the viewpoint of exhibiting the effect of the filler addition, the content of the filler in the rubber composition is 5.0 parts by mass or more based on 100 parts by mass of the rubber component, and from the viewpoint that the filler is sufficiently dispersed to attain practically sufficient processability and mechanical strength of the rubber composition, the content is 150 parts by mass or less based on 100 parts by mass of the rubber component.

The silica-based inorganic filler is not especially limited, any of known fillers can be used, a solid particle containing $SiO_2$ or $Si_3Al$ as a constituent unit is preferred, and a solid particle containing $SiO_2$ or $Si_3Al$ as a principal component of a constituent unit is more preferred. Here, the principal component refers to a component contained in the silica-based inorganic filler in an amount of 50% by mass or more, preferably 70% by mass or more, and more preferably 80% by mass or more.

Examples of the silica-based inorganic filler include, but are not limited to, silica, clay, talc, mica, diatomite, wollastonite, montmorillonite, zeolite and inorganic fibrous substances such as glass fiber. Besides, examples include a silica-based inorganic filler having a hydrophobized surface, and a mixture of a silica-based inorganic filler and an inorganic filler excluding silica.

Among these, from the viewpoint of strength and abrasion resistance, silica and glass fiber are preferred, and silica is more preferred.

Examples of the silica include dry silica, wet silica and synthetic silicate silica. Among these silica, wet silica is preferred from the viewpoint that it is excellent in the effect of improving fracture strength and balance in wet skid resistance.

From the viewpoint of obtaining practically good abrasion resistance and fracture strength of the rubber composition, a nitrogen adsorption specific surface area, obtained by the BET adsorption method, of the silica-based inorganic filler is preferably 100 $m^2/g$ or more and 300 $m^2/g$ or less, and more preferably 170 $m^2/g$ or more and 250 $m^2/g$ or less.

Besides, a silica-based inorganic filler having a comparatively small specific surface area (for example, a specific surface area less than 200 $m^2/g$) and a silica-based inorganic filler having a comparatively large specific surface area (for example, 200 $m^2/g$ or more) can be used in combination if necessary.

If a silica-based inorganic filler having a comparatively large specific surface area (of, for example, 200 $m^2/g$ or more) is used in particular, the rubber composition containing the branched conjugated diene-based polymer described above tends to be improved in dispersibility of silica, and be effective particularly in improvement of abrasion resistance, and be capable of well-balanced in good fracture strength and a low hysteresis loss property.

A content of the silica-based inorganic filler in the rubber composition is preferably 5.0 parts by mass or more and 150 parts by mass, more preferably 20 parts by mass or more and 100 parts by mass or less based on 100 parts by mass of the rubber component containing the branched conjugated diene-based polymer obtained by the production method of the present embodiment. From the viewpoint of exhibiting the effect of the addition of the silica-based inorganic filler, the content of the silica-based inorganic filler in the rubber composition is 5.0 parts by mass or more based on 100 parts by mass of the rubber component, and from the viewpoint that the silica-based inorganic filler is sufficiently dispersed to attain practically sufficient processability and mechanical strength of the rubber composition, the content is preferably 150 parts by mass or less based on 100 parts by mass of the rubber component.

Examples of the carbon black include, but are not limited to, carbon blacks of SRF, FEF, HAF, ISAF and SAF classes. Among these, a carbon black having a nitrogen adsorption specific surface area of 50 m²/g or more and dibutyl phthalate (DBP) oil absorption of 80 mL/100 g or less is preferred.

A content of the carbon black in the rubber composition is preferably 0.5 parts by mass or more and 100 parts by mass or less, more preferably 3.0 parts by mass or more and 100 parts by mass or less, and further preferably 5.0 parts by mass or more and 50 parts by mass or less based on 100 parts by mass of the rubber component containing the branched conjugated diene-based polymer obtained by the production method of the present embodiment. From the viewpoint of exhibiting performances required in use as a tire or the like such as dry grip performance and conductivity, the content of the carbon black in the rubber composition is preferably 0.5 parts by mass or more based on 100 parts by mass of the rubber component, and from the viewpoint of dispersibility, the content is preferably 100 parts by mass or less based on 100 parts by mass of the rubber component.

The metal oxide refers to a solid particle containing a principal component of a constituent unit represented by chemical formula MxOy (wherein M represents a metal atom, and x and y each independently represent an integer of 1 to 6).

Examples of the metal oxide include, but are not limited to, alumina, titanium oxide, magnesium oxide and zinc oxide.

Examples of the metal hydroxide include, but are not limited to, aluminum hydroxide, magnesium hydroxide and zirconium hydroxide.

In a production method for a rubber composition of the present embodiment, a step of causing a silane coupling agent to be contained may be performed.

The silane coupling agent has a function to make the interaction between the rubber component and the inorganic filler close. Specifically, it is preferably a compound having a group having affinity with or a binding property to both of the rubber component and the silica-based inorganic filler, and containing, in one molecule, a sulfur bond portion and an alkoxysilyl group or silanol group portion.

Examples of such a compound include, but are not especially limited to, bis-[3-(triethoxysilyl)-propyl]-tetrasulfide, bis-[3-(triethoxysilyl)-propyl]-disulfide and bis-[2-(triethoxysilyl)-ethyl]-tetrasulfide.

In the rubber composition, a content of the silane coupling agent is preferably 0.1 parts by mass or more and 30 parts by mass or less, more preferably 0.5 parts by mass or more and 20 parts by mass or less, and further preferably 1.0 part by mass or more and 15 parts by mass or less based on 100 parts by mass of the inorganic filler. If the content of the silane coupling agent falls in this range, there is a tendency that the effect of the addition of the silane coupling agent can be more conspicuous.

The rubber composition may contain a rubber softener from the viewpoint of improvement of the processability.

An amount of the rubber softener to be added is expressed, based on 100 parts by mass of the rubber component containing the branched conjugated diene-based polymer obtained by the production method of the present embodiment, as a total amount of the rubber softener precedently contained in the branched conjugated diene-based polymer or another rubber-like polymer, and the rubber softener added in producing the rubber composition.

As the rubber softener, a mineral oil or a liquid or low molecular weight synthetic softer is suitably used.

A mineral oil-based rubber softener, which is used for softening, expanding and improving processability of a rubber and is designated as a process oil or an extender oil, is a mixture of an aromatic ring, a naphthene ring and a paraffin chain, and one in which the number of carbon atoms of the paraffin chain is 50% or more of all the carbon atoms is designated as a paraffin-based softener, one in which the number of carbon atoms of the naphthene ring is 30% or more and 45% or less of all the carbon atoms is designated as a naphthene-based softener, and one in which the number of aromatic carbon atoms exceeds 30% of all the carbon atoms is designated as an aromatic-based softener. When the branched conjugated diene-based polymer of the present embodiment is a copolymer of a conjugated diene compound and a vinyl aromatic compound, a rubber softener to be used is preferably one having an appropriate aromatic content because such a softener tends to fit with the branched conjugated diene-based polymer.

In the rubber composition, the content of the rubber softener is, based on 100 parts by mass of the rubber component, preferably 0 part by mass or more and 100 parts by mass or less, more preferably 10 parts by mass or more and 90 parts by mass or less, and further preferably 30 parts by mass or more and 90 parts by mass or less. Since the content of the rubber softener is 100 parts by mass or less based on 100 parts by mass of the rubber component, there is a tendency that bleeding out is suppressed and stickiness of the surface of the rubber composition is suppressed.

Examples of a method for mixing the branched conjugated diene-based polymer obtained by the production method of the present embodiment with another rubber-like polymer, a silica-based inorganic filler, carbon black or another filler, a silane coupling agent, and additives such as a rubber softener include, but are not limited to, a melt-kneading method using a general mixer such as an open roll, a banbury mixer, a kneader, a single shaft screw extruder, a twin shaft screw extruder or a multi-shaft screw extruder, and a method in which the respective components are melted and mixed followed by removal of a solvent by heating.

Among these methods, the melt-kneading method using a roll, a banbury mixer, a kneader or an extruder is preferred from the viewpoint of productivity and high kneadability. Besides, either of a method in which the rubber component, another filler, a silane coupling agent and additives are kneaded all together or a method in which these are mixed dividedly in plural times is applicable.

The rubber composition may be a vulcanized composition having been vulcanized with a vulcanizing agent. Examples of the vulcanizing agent include, but are not limited to, radical generators such as organic peroxides and azo compounds, oxime compounds, nitroso compounds, polyamine compounds, sulfur and sulfur compounds.

In the rubber composition, a content of the vulcanizing agent is preferably 0.01 parts by mass or more and 20 parts by mass or less, and more preferably 0.1 parts by mass or more and 15 parts by mass or less based on 100 parts by mass of the rubber component. As a vulcanizing method, any of known methods is applicable, and a vulcanization temperature is preferably 120° C. or more and 200° C. or less, and more preferably 140° C. or more and 180° C. or less.

For the vulcanization, a vulcanization accelerator or a vulcanization aid may be used if necessary.

As the vulcanization accelerator, any of known materials can be used, and examples include, but are not limited to, sulphenamide-based, guanidine-based, thiuram-based, aldehyde-amine-based, aldehyde-ammonia-based, thiazole-based, thiourea-based and dithiocarbamate-based vulcanization accelerators.

Besides, examples of the vulcanization aid include, but are not limited to, zinc oxide and stearic acid.

A content of the vulcanization accelerator is preferably 0.01 parts by mass or more and 20 parts by mass or less, and more preferably 0.1 parts by mass or more and 15 parts by mass or less based on 100 parts by mass of the rubber component.

The rubber composition of the present embodiment may contain, as long as the object of the present embodiment is not impaired, various additives such as another softener excluding those described above, and another filler, a heat resistance stabilizer, an antistatic agent, a weathering stabilizer, an anti-ageing agent, a colorant and a lubricant.

As another softener, any of known softeners can be used.

Examples of another filler include, but are not especially limited to, calcium carbonate, magnesium carbonate, aluminum sulfate and barium sulfate.

As each of the heat resistance stabilizer, the antistatic agent, the weathering stabilizer, the anti-ageing agent, the colorant and the lubricant, any of known materials can be used.

[Tire and Production Method for Tire]

A tire of the present embodiment contains the rubber composition of the present embodiment described above.

A production method for a tire of the present embodiment includes a step of obtaining a branched conjugated diene-based polymer by the production method of the present embodiment, a step of obtaining a rubber composition containing the branched conjugated diene-based polymer, and a step of molding the rubber composition.

The rubber composition containing the branched conjugated diene-based polymer obtained by the production method of the present embodiment described above is suitably used as a rubber composition for a tire.

The rubber composition for a tire is applicable to, but not limited to, various tires such as a fuel-efficient tire, an all-season tire, a high-performance tire and a studless tire; and various tire portions such as a tread, a carcass, a sidewall and a bead.

Since the rubber composition for a tire containing the branched conjugated diene-based polymer of the present embodiment is excellent in abrasion resistance, fracture strength, and the balance between a low hysteresis loss property and wet skid resistance obtained when in the form of a vulcanizate, it is suitably used as a tread of a fuel-efficient tire or a high-performance tire.

EXAMPLES

The present embodiment will now be described in more detail with reference to specific examples and comparative examples, and it is noted that the present embodiment is not limited to the following examples and comparative examples at all.

First Example

The present embodiment will now be described in detail with reference to specific examples and comparative examples described as a first example.

In the following description, a conjugated diene-based polymer coupled with a nitrogen atom-containing modifier is referred to as a "coupled conjugated diene-based polymer".

A conjugated diene-based polymer in an unmodified state is referred to as an "unmodified conjugated diene-based polymer". In tables, it is shown simply as "Conjugated Diene-based Polymer".

Besides, a conjugated diene-based polymer having a branch structure is referred to as a "branched conjugated diene-based polymer".

Various physical properties described in the examples and comparative examples were measured by the following methods.

(Physical Property 1) Mooney Viscosity of Polymer

An unmodified conjugated diene-based polymer or a conjugated diene-based polymer coupled by using a nitrogen atom-containing modifier (hereinafter also referred to as the "coupled conjugated diene-based polymer") was used as a sample to measure a Mooney viscosity by using a Mooney viscometer (trade name "VR1132" manufactured by Ueshima Seisakusho Co., Ltd.) in accordance with ISO 289 with an L-type rotor used.

A measurement temperature was 110° C. when an unmodified conjugated diene-based polymer (shown simply as Conjugated Diene-based Polymer in tables) was used as a sample, and was 100° C. when a coupled conjugated diene-based polymer was used as a sample.

First, a sample was preheated at the test temperature for 1 minute, the rotor was rotated at 2 rpm, and a torque was measured 4 minutes after as a Mooney viscosity ($ML_{(1+4)}$).

(Physical Property 2) Mooney Stress Relaxation Rate

After measuring, by using a coupled conjugated diene-based polymer as a sample, a Mooney viscosity by using a Mooney viscometer (trade name "VR1132" manufactured by Ueshima Seisakusho Co., Ltd.) in accordance with ISO 289 with an L-type rotor used, the rotation of the rotor was immediately stopped, and the torque in terms of the Mooney unit was recorded every 0.1 seconds from 1.6 seconds to 5 seconds after the stop. The slope of a straight line resulting from double logarithmic plotting of the torque and the time (sec) was obtained, and the absolute value was defined as a Mooney stress relaxation rate (MSR).

(Physical Property 3) Branch Number (Bn)

A branch number (Bn) of a coupled conjugated diene-based polymer was measured by a viscosity detector-equipped GPC-light scattering measurement method as follows.

A coupled conjugated diene-based polymer was used as a sample, and a gel permeation chromatography (GPC) measurement apparatus (trade name "GPCmax VE-2001" manufactured by Malvern Panalytical Ltd.) including a series of three columns using a polystyrene-based gel as a filler was used. The measurement was performed by using three detectors, that is, a light scattering detector, an RI detector, and a viscosity detector (trade name "TDA305" manufactured by Malvern Panalytical Ltd.) connected in the stated order. Based on standard polystyrene, an absolute molecular weight was obtained from results obtained by using the light scattering detector and the RI detector, and an intrinsic viscosity was obtained from results obtained by using the RI detector and the viscosity detector.

A straight-chain polymer was used under assumption of having an intrinsic viscosity [η] of $-3.883\ M^{0.771}$, and a contracting factor (g') was calculated as a ratio in the intrinsic viscosity corresponding to each molecular weight. It is noted that M herein represents the absolute molecular weight.

Thereafter, the thus obtained contracting factor (g') was used to calculate a branch number (Bn) defined as $g'=6Bn/\{(Bn+1)(Bn+2)\}$.

As an eluent, tetrahydrofuran (hereinafter also referred to as "THF") containing 5 mmol/L of triethylamine was used.

As the columns, columns of trade names "TSKgel G4000HXL", "TSKgel G5000HXL" and "TSKgel G6000HXL" manufactured by Tosoh Corporation were connected for use.

Twenty (20) mg of a sample for the measurement was dissolved in 10 mL of THF to obtain a measurement solution, and 100 µL of the measurement solution was injected into the GPC measurement apparatus for performing the measurement under conditions of an oven temperature of 40° C. and a THF flow rate of 1 mL/min.

(Physical Property 4) Molecular Weight

<Measurement Conditions 1>

An unmodified conjugated diene-based polymer or a coupled conjugated diene-based polymer used as a sample was measured for a chromatogram using a GPC measurement apparatus (trade name "HLC-8320GPC" manufactured by Tosoh Corporation) including a series of three columns using a polystyrene-based gel as a filler with an RI detector (trade name "HLC8020" manufactured by Tosoh Corporation) used, and on the basis of a calibration curve obtained using standard polystyrene, a weight average molecular weight (Mw), a number average molecular weight (Mn) and a molecular weight distribution (Mw/Mn) were obtained.

As an eluent, THF (tetrahydrofuran) containing 5 mmol/L of triethylamine was used. As the columns, trade name "TSKguardcolumn Super MP(HZ)-H" manufactured by Tosoh Corporation connected, as a guard column at a previous stage, to a series of three columns of trade name "TSKgel Super Multipore HZ-H" manufactured by Tosoh Corporation were used.

Ten (10) mg of a sample for the measurement was dissolved in 10 mL of THF to obtain a measurement solution, and 10 µL of the measurement solution was injected into the GPC measurement apparatus for performing the measurement under conditions of an oven temperature of 40° C. and a THF flow rate of 0.35 mL/min.

Among various samples having been subjected to the measurement under the above-described measurement conditions 1, a sample having a molecular weight distribution (Mw/Mn) less than 1.6 was subjected again to the measurement under measurement conditions 2 described below. With respect to a sample having been subjected to the measurement under the measurement conditions 1 and found to have a molecular weight distribution value of 1.6 or more, a measured value obtained under the measurement conditions 1 was employed.

<Measurement Conditions 2>:

An unmodified conjugated diene-based polymer or a coupled conjugated diene-based polymer used as a sample was measured for a chromatogram using a GPC measurement apparatus including a series of three columns using a polystyrene-based gel as a filler, and on the basis of a calibration curve obtained using standard polystyrene, a weight average molecular weight (Mw), and a number average molecular weight (Mn) were obtained.

As an eluent, THF containing 5 mmol/L of triethylamine was used. As the columns, a guard column of trade name "TSKguardcolumn Super H-H" manufactured by Tosoh Corporation, and columns of trade names "TSKgel SuperH5000", "TSKgel SuperH6000", and "TSKgel SuperH7000" manufactured by Tosoh Corporation were used.

An RI detector (trade name "HLC8020" manufactured by Tosoh Corporation) was used under conditions of an oven temperature of 40° C. and a THF flow rate of 0.6 mL/min. Ten (10) mg of a sample for the measurement was dissolved in 20 mL of THF to obtain a measurement solution, and 20 µL of the measurement solution was injected into the GPC measurement apparatus for performing the measurement.

With respect to a sample having been subjected to the measurement under the measurement conditions 1 and found to have a molecular weight distribution value less than 1.6, the measurement was performed under the measurement conditions 2, and the resultant measured value was employed.

(Physical Property 5) Modification Ratio

A modification ratio of a coupled conjugated diene-based polymer was measured by column adsorption GPC as follows.

A coupled conjugated diene-based polymer was used as a sample, and the measurement was performed by applying a characteristic that a modified basic polymer component adsorbs onto a GPC column using a silica-based gel as a filler.

A modification ratio was obtained by measuring an amount of adsorption onto a silica-based column based on a difference between a chromatogram measured by using a polystyrene-based column and a chromatogram measured by using a silica-based column obtained from a sample solution containing a sample and low molecular weight internal standard polystyrene.

Specifically, the measurement was performed as described below.

With respect to a sample having been subjected to the measurement under the measurement conditions 1 of (Physical Property 4) and found to have a molecular weight distribution value of 1.6 or more, the measurement was performed under measurement conditions 3 described below, and the resultant measured value was employed. With respect to a sample having been subjected to the measurement under the measurement conditions 1 of (Physical Property 4) and found to have a molecular weight distribution value less than 1.6, the measurement was performed under measurement conditions 4 described below, and the resultant measured value was employed.

<Preparation of Sample Solution>

Ten (10) mg of a sample and 5 mg of standard polystyrene were dissolved in 20 mL of THF to obtain a sample solution.

<Measurement Conditions 3>

GPC Measurement Conditions Using Polystyrene-Based Column:

An apparatus of trade name "HLC-8320GPC" manufactured by Tosoh Corporation was used, THF containing 5 mmol/L of triethylamine was used as an eluent, and 10 µL of the sample solution was injected into the apparatus to obtain a chromatogram using an RI detector under conditions of a column oven temperature of 40° C. and a THF flow rate of 0.35 mL/min.

As the columns, a series of three columns of trade name "TSKgel Super Multipore HZ-H" and a guard column of trade name "TSKguardcolumn SuperMP(HZ)-H" manufactured by Tosoh Corporation connected at a previous stage were used.

<Measurement Conditions 4>:

THF containing 5 mmol/L of triethylamine was used as an eluent, and 20 µL of the sample solution was injected into the apparatus to perform the measurement.

As the columns, a guard column of trade name "TSKguardcolumn Super H-H" manufactured by Tosoh Corporation and columns of trade names "TSKgel Super H5000", "TSKgel Super H6000", and "TSKgel Super H7000" manufactured by Tosoh Corporation were used. A chromatogram was obtained by performing the measurement by using an RI detector (HLC8020, manufactured by Tosoh Corporation)

under conditions of a column oven temperature of 40° C. and a THF flow rate of 0.6 mL/min.

GPC measurement conditions using silica-based column: An apparatus of trade name "HLC-8320GPC" manufactured by Tosoh Corporation was used, THF was used as an eluent, and 50 μL of the sample solution was injected into the apparatus to obtain a chromatogram by using an RI detector under conditions of a column oven temperature of 40° C. and a THF flow rate of 0.5 mL/min. A series of columns of trade names "Zorbax PSM-1000S", "PSM-300S" and "PSM-60S", and a guard column of trade name "DIOL 4.6×12.5 mm 5 micron" connected at a previous stage were used.

Calculation Method for Modification Ratio:

Assuming that the whole peak area of the chromatogram obtained by using the polystyrene-based column was 100, that a peak area of the sample was P1, that a peak area of standard polystyrene was P2, that the whole peak area of the chromatogram obtained by using the silica-based column was 100, that a peak area of the sample was P3, and that a peak area of standard polystyrene was P4, a modification ratio (%) was obtained in accordance with the following expression:

Modification ratio (%)=[1−(P2×P3)/(P1×P4)]×100 wherein P1+P2=P3+P4=100.

(Physical Property 6) Amount of Bound Styrene

One hundred (100) mg of a coupled conjugated diene-based polymer not containing a rubber softener used as a sample was dissolved in chloroform to be diluted to 100 mL, and the resultant was used as a measurement sample.

Based on the amount of absorption of a phenyl group of styrene at a UV absorption wavelength (about 254 nm), the amount of bound styrene (% by mass) based on 100% by mass of the sample of the coupled conjugated diene-based polymer was measured (measurement apparatus: spectrophotometer "UV-2450" manufactured by Shimadzu Corporation).

(Physical Property 7) Microstructure of Butadiene Portion (Amount of 1,2-Vinyl Bond)

Fifty (50) mg of a coupled conjugated diene-based polymer not containing a rubber softener used as a sample was dissolved in 10 mL of carbon disulfide, and the resultant was used as a measurement sample.

A solution cell was used to measure an infrared spectrum in a range of 600 to 1000 cm-1, and in accordance with a calculation formula of the Hampton method (R. R. Hampton, Analytical Chemistry 21, 923 (1949)) based on absorbance at a prescribed wavelength, a microstructure of a butadiene portion, namely, an amount of 1,2-vinyl bond (mol %), was obtained (measurement apparatus: Fourier transform infrared spectrophotometer "FT-IR230" manufactured by JASCO Corporation).

(Physical Property 8) Molecular Weight (Absolute Molecular Weight) Obtained by GPC-Light Scattering Measurement A coupled conjugated diene-based polymer was used as a sample, and a GPC-light scattering measurement apparatus including a series of three columns using a polystyrene-based gel as a filler was used to measure a chromatogram for obtaining a weight average molecular weight (Mw-i) (also designated as an "absolute molecular weight") based on a viscosity of a solution and a light scattering method.

As an eluent, a mixed solution of tetrahydrofuran and triethylamine (THF in TEA: prepared by mixing 5 mL of triethylamine in 1 L of tetrahydrofuran) was used.

As the columns, a series of a guard column of trade name "TSKguardcolumn HHR-H" manufactured by Tosoh Corporation, and columns of trade names "TSKgel G6000HHR", "TSKgel G5000HHR", and "TSKgel G4000HHR" were connected and used.

A GPC-light scattering measurement apparatus (trade name "Viscotek TDAmax" manufactured by Malvern Panalytical Ltd.) was used under conditions of an oven temperature of 40° C. and a THF flow rate of 1.0 mL/min.

Ten (10) mg of a sample for measurement was dissolved in 20 mL of THF to obtain a measurement solution, and 200 μL of the measurement solution was injected into the GPC measurement apparatus for the measurement.

Branched Conjugated Diene-Based Polymer (Example 1-1) Coupled Conjugated Diene-Based Polymer (Sample 1-1)

Two tank pressure vessels, each of which is a stirrer-equipped tank reactor having an internal volume of 10 L and a ratio (L/D) of internal height (L) and diameter (D) of 4.0, having an inlet at a bottom and an outlet at a top, and equipped with a stirrer and a temperature controlling jacket, were connected to each other as polymerization reactors.

1,3-Butadiene, from which a water content had been precedently removed, styrene and n-hexane were mixed under conditions of 18.6 g/min, 10.0 g/min and 175.2 g/min, respectively. In a static mixer provided in the middle of a pipe for supplying the thus obtained mixed solution to the inlet of the reactor, n-butyllithium to be used for residual impurity inactivation was added and mixed in an amount of 0.103 mmol/min, and the resultant was continuously supplied to the bottom of the reactor. Besides, 2,2-bis(2-oxolanyl)propane used as a polar material and n-butyllithium used as a polymerization initiator were supplied, at rates of respectively 0.081 mmol/min and 0.143 mmol/min, to the bottom of the first reactor in which materials were vigorously mixed by the stirrer, and the internal temperature of the reactor was kept at 67° C.

The thus obtained polymer solution was continuously taken out from the top of the first reactor to be continuously supplied to the bottom of the second reactor for continuing the reaction at 70° C., and the resultant was further supplied to a static mixer from the top of the second reactor. When the polymerization was sufficiently stabilized, while copolymerizing 1,3-butadiene and styrene, trimethoxy(4-vinylphenyl)silane (shown as "BS-1" in the table) used as a branching agent was added at a rate of 0.0190 mmol/min from the bottom of the second reactor to perform a polymerization reaction and a branching reaction for obtaining a conjugated diene-based polymer having a main chain branch structure.

When the polymerization reaction and the branching reaction were stabilized, a small amount of a conjugated diene-based polymer solution prior to addition of a coupling agent was taken out, an antioxidant (BHT) was added thereto in an amount of 0.2 g per 100 g of the polymer, then the solvent was removed, and a Mooney viscosity at 110° C. and various molecular weights were measured. The physical properties are shown in Table 1.

Next, to the polymer solution flowing out of the outlet of the reactor, tetraethoxysilane (shown as "A" in the table) was added, as a coupling agent, continuously at a rate of 0.0480 mmol/min, and the resultant was mixed by using a static mixer for performing a coupling reaction. Here, a time until the addition of the coupling agent to the polymer solution flowing out of the outlet of the reactor was 4.8 min, the temperature was 68° C., and a difference between the temperature in the polymerizing step and the temperature until the addition of the coupling agent was 2° C. After the coupling reaction, a small amount of a conjugated diene-based polymer solution was taken out, an antioxidant (BHT) was added thereto in an amount of 0.2 g per 100 g of the polymer, then the solvent was removed, and the amount of bound styrene (Physical Property 6) and the microstructure of a butadiene portion (the amount of 1,2-vinyl bond; Physical Property 7) were measured. Measurement results are shown in Table 1.

Next, to the polymer solution resulting from the coupling reaction, the antioxidant (BHT) was continuously added in an amount of 0.2 g per 100 g of the polymer at 0.055 g/min (n-hexane solution) to complete the coupling reaction. Simultaneously with the antioxidant, SRAE oil (JOMO Process NC 140, manufactured by JX Nippon Oil & Energy Corporation) was continuously added as a rubber softener in an amount of 25.0 g per 100 g of the polymer, and the resultant was mixed by using a static mixer. The solvent was removed by steam stripping, and thus, a coupled conjugated diene-based polymer (Sample 1-1) having, in a part of a main chain, a 4-branched structure derived from the branching agent corresponding to the compound represented by the formula (1) (hereinafter also referred to as the "branching agent structure (1)") and having a 3-branched star polymer structure derived from the coupling agent was obtained.

Physical properties of the sample 1-1 are shown in Table 1.

In each of the polymer obtained prior to the addition of the branching agent, the polymer obtained after the addition of the branching agent, and the polymers obtained in the respective steps after the addition of the coupling agent, the structure of the coupled conjugated diene-based polymer was identified based on comparison between a molecular weight measured by GPC and a branch number measured by viscosity detector-equipped GPC. Hereinafter, the structure of each sample was similarly identified.

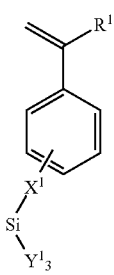

(1)

wherein $R^1$ represents any one selected from the group consisting of a hydrogen atom, an alkyl group having 1 to 20 carbon atoms, and an aryl group having 6 to 20 carbon atoms, and may have a branch structure in a part thereof;

$X^1$ represents a single bond, or an organic group containing any one selected from the group consisting of carbon, hydrogen, nitrogen, sulfur and oxygen, $Y^1$ represents any one selected from the group consisting of an alkyl group having 1 to 20 carbon atoms, an alkoxy group having 1 to 20 carbon atoms, and a halogen atom; and they are respectively independent and may be the same or different.

(Example 1-2) Coupled Conjugated Diene-Based Polymer (Sample 1-2)

A coupled conjugated diene-based polymer (sample 1-2) having, in a part of a main chain, a 4-branched structure derived from the branching agent structure (1) and having a 4-branched star polymer structure derived from the coupling agent was obtained in the same manner as in Example 1-1 except that the coupling agent was changed from tetraethoxysilane to 1,2-bis(triethoxysilyl)ethane (shown as "B" in the table), and that the amount thereof to be added was changed to 0.0360 mmol/min. Physical properties of the sample 1-2 are shown in Table 1.

(Example 1-3) Coupled Conjugated Diene-Based Polymer (Sample 1-3)

A coupled conjugated diene-based polymer (sample 1-3) having, in a part of a main chain, a 4-branched structure derived from the branching agent structure (1) and having a 4-branched star polymer structure derived from the coupling agent was obtained in the same manner as in Example 1-1 except that the coupling agent was changed from tetraethoxysilane to 1,3-bis(N,N-diglycidylaminomethyl)cyclohexane (shown as "C" in the table), and that the amount thereof to be added was changed to 0.0360 mmol/min. Physical properties of the sample 1-3 are shown in Table 1.

(Example 1-4) Coupled Conjugated Diene-Based Polymer (Sample 1-4)

A coupled conjugated diene-based polymer (sample 1-4) having, in a part of a main chain, a 4-branched structure derived from the branching agent structure (1) and having a 4-branched star polymer structure derived from the coupling agent was obtained in the same manner as in Example 1-1 except that the coupling agent was changed from tetraethoxysilane to 2,2-dimethoxy-1-(3-trimethoxysilylpropyl)-1-aza-2-silacylcopentane (shown as "D" in the table), and that the amount thereof to be added was changed to 0.0360 mmol/min. Physical properties of the sample 1-4 are shown in Table 1.

(Example 1-5) Coupled Conjugated Diene-Based Polymer (Sample 1-5)

A coupled conjugated diene-based polymer (sample 1-5) having, in a part of a main chain, a 4-branched structure derived from the branching agent structure (1) and having a 6-branched star polymer structure derived from the coupling agent was obtained in the same manner as in Example 1-1 except that the coupling agent was changed from tetraethoxysilane to tris(3-trimethoxysilylpropyl)amine (shown as "E" in the table), and that the amount thereof to be added was changed to 0.0250 mmol/min. Physical properties of the sample 1-5 are shown in Table 1.

(Example 1-6) Coupled Conjugated Diene-Based Polymer (Sample 1-6)

A coupled conjugated diene-based polymer (sample 1-6) having, in a part of a main chain, a 4-branched structure derived from the branching agent structure (1) and having an 8-branched star polymer structure derived from the coupling agent was obtained in the same manner as in Example 1-1 except that the coupling agent was changed from tetraethoxysilane to tetrakis(3-trimethoxysilylpropyl)-1,3-propanediamine (shown as "F" in the table), and that the amount thereof to be added was changed to 0.0190 mmol/min. Physical properties of the sample 1-6 are shown in Table 1.

(Example 1-7) Coupled Conjugated Diene-Based Polymer (Sample 1-7)

A coupled conjugated diene-based polymer (sample 1-7) having, in a part of a main chain, a 4-branched structure derived from the branching agent structure (1) and having an 8-branched star polymer structure derived from the coupling agent was obtained in the same manner as in Example 1-1 except that the coupling agent was changed from tetraethoxysilane to tetrakis(3-trimethoxysilylpropyl)-1,3-propanediamine (shown as "F" in the table), and that the amount thereof to be added was changed to 0.0160 mmol/min. Physical properties of the sample 1-7 are shown in Table 1.

(Example 1-8) Coupled Conjugated Diene-Based Polymer (Sample 1-8)

A coupled conjugated diene-based polymer (sample 1-8) having, in a part of a main chain, a 4-branched structure derived from the branching agent structure (1) and having an 8-branched star polymer structure derived from the coupling agent was obtained in the same manner as in Example 1-1 except that the rate of adding 1,3-butadiene was changed from 18.6 g/min to 24.3 g/min, that the rate of adding styrene was changed from 10.0 g/min to 4.3 g/min, that the rate of adding 2,2-bis(2-oxolanyl)propane used as a polar material was changed from 0.081 mmol/min to 0.044 mmol/min, that the coupling agent was changed from tetraethoxysilane to tetrakis(3-trimethoxysilylpropyl)-1,3-propanediamine (shown as "F" in the table), and that the amount thereof to be added was changed to 0.0160 mmol/min. Physical properties of the sample 1-8 are shown in Table 1.

(Example 1-9) Coupled Conjugated Diene-Based Polymer (Sample 1-9)

A coupled conjugated diene-based polymer (sample 1-9) having, in a part of a main chain, a 4-branched structure derived from the branching agent structure (1) and having an 8-branched star polymer structure derived from the coupling agent was obtained in the same manner as in Example 1-1 except that the rate of adding 1,3-butadiene was changed from 18.6 g/min to 17.1 g/min, that the rate of adding styrene was changed from 10.0 g/min to 11.5 g/min, that the rate of adding 2,2-bis(2-oxolanyl)propane used as a polar material was changed from 0.081 mmol/min to 0.089 mmol/min, that the coupling agent was changed from tetraethoxysilane to tetrakis(3-trimethoxysilylpropyl)-1,3-propanediamine (shown as "F" in the table), and that the amount thereof to be added was changed to 0.0160 mmol/min. Physical properties of the sample 1-9 are shown in Table 2.

(Example 1-10) Coupled Conjugated Diene-Based Polymer (Sample 1-10)

A coupled conjugated diene-based polymer (sample 1-10) having, in a part of a main chain, a 4-branched structure derived from the branching agent structure (1) and having an 8-branched star polymer structure derived from the coupling agent was obtained in the same manner as in Example 1-1 except that the rate of adding 2,2-bis(2-oxolanyl)propane used as a polar material was changed from 0.081 mmol/min to 0.200 mmol/min, that the coupling agent was changed from tetraethoxysilane to tetrakis(3-trimethoxysilylpropyl)-1,3-propanediamine (shown as "F" in the table), and that the amount thereof to be added was changed to 0.0160 mmol/min. Physical properties of the sample 1-10 are shown in Table 2.

(Example 1-11) Coupled Conjugated Diene-Based Polymer (Sample 1-11)

A coupled conjugated diene-based polymer (sample 1-11) having, in a part of a main chain, a 2-branched structure derived from the branching agent structure (1) and having a 4-branched star polymer structure derived from the coupling agent was obtained in the same manner as in Example 1-1 except that the branching agent was changed from trimethoxy(4-vinylphenyl)silane to dimethylmethoxy(4-vinylphenyl)silane (shown as "BS-2" in the table), that the amount thereof to be added was changed to 0.0350 mmol/min, that the coupling agent was changed from tetraethoxysilane to 1,2-bis(triethoxysilyl)ethane (shown as "B" in the table), and that the amount thereof to be added was changed to 0.0360 mmol/min. Physical properties of the sample 1-11 are shown in Table 2.

(Example 1-12) Coupled Conjugated Diene-Based Polymer (Sample 1-12)

A coupled conjugated diene-based polymer (sample 1-12) having, in a part of a main chain, a 2-branched structure derived from the branching agent structure (1) and having a 4-branched star polymer structure derived from the coupling agent was obtained in the same manner as in Example 1-1 except that the branching agent was changed from trimethoxy(4-vinylphenyl)silane to dimethylmethoxy(4-vinylphenyl)silane (shown as "BS-2" in the table), that the amount thereof to be added was changed to 0.0350 mmol/min, that the coupling agent was changed from tetraethoxysilane to 2,2-dimethoxy-1-(3-trimethoxysilylpropyl)-1-aza-2-silacyclopentane (shown as "D" in the table), and that the amount thereof to be added was changed to 0.0360 mmol/min. Physical properties of the sample 1-12 are shown in Table 2.

(Example 1-13) Coupled Conjugated Diene-Based Polymer (Sample 1-13)

A coupled conjugated diene-based polymer (sample 1-13) having, in a part of a main chain, a 2-branched structure derived from the branching agent structure (1) and having an 8-branched star polymer structure derived from the coupling agent was obtained in the same manner as in Example 1-1 except that the branching agent was changed from trimethoxy(4-vinylphenyl)silane to dimethylmethoxy(4-vinylphenyl)silane (shown as "BS-2" in the table), that the amount thereof to be added was changed to 0.0350 mmol/min, that the coupling agent was changed from tetraethoxysilane to tetrakis(3-trimethoxysilylpropyl)-1,3-propanediamine (shown as "F" in the table), and that the amount thereof to be added was changed to 0.0160 mmol/min. Physical properties of the sample 1-13 are shown in Table 2.

(Example 1-14) Coupled Conjugated Diene-Based Polymer (Sample 1-14)

A coupled conjugated diene-based polymer (sample 1-14) having, in a part of a main chain, a 3-branched structure derived from the branching agent corresponding to the compound represented by the following formula (2) (hereinafter also referred to as the "branching agent structure (2)") and having a 4-branched star polymer structure derived from the coupling agent was obtained in the same manner as in Example 1-1 except that the branching agent was changed from trimethoxy(4-vinylphenyl)silane to 1,1-bis(4-(dimethylmethoxysilyl)phenyl)ethylene (shown as "BS-3" in the table), that the amount thereof to be added was changed to 0.0120 mmol/min, that the coupling agent was changed from tetraethoxysilane to 1,2-bis(triethoxysilyl)ethane (shown as "B" in the table), and that the amount thereof to be added was changed to 0.0360 mmol/min. Physical properties of the sample 1-14 are shown in Table 2.

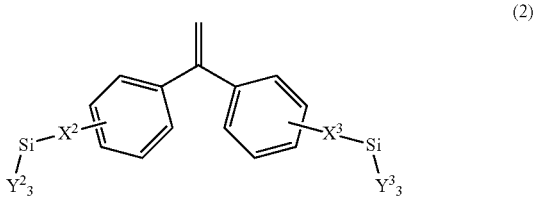

(2)

wherein $X^2$ and $X^3$ represent a single bond, or an organic group containing any one selected from the group consisting of carbon, hydrogen, nitrogen, sulfur, and oxygen, $Y^2$ and $Y^3$ represent any one selected from the group consisting of an alkyl group having 1 to 20 carbon atoms, an alkoxy group having 1 to 20 carbon atoms, and a halogen atom; and they are respectively independent and may be the same or different.

(Example 1-15) Coupled Conjugated Diene-Based Polymer (Sample 1-15)

A coupled conjugated diene-based polymer (sample 1-15) having, in a part of a main chain, a 3-branched structure derived from the branching agent structure (2) and having a 4-branched star polymer structure derived from the coupling agent was obtained in the same manner as in Example 1-1 except that the branching agent was changed from trimethoxy(4-vinylphenyl)silane to 1,1-bis(4-(dimethylmethoxysilyl)phenyl)ethylene (shown as "BS-3" in the table), that the amount thereof to be added was changed to 0.0120 mmol/min, that the coupling agent was changed from tetraethoxysilane to 2,2-dimethoxy-1-(3-trimethoxysilylpropyl)-1-aza-2-silacyclopentane (shown as "D" in the table), and that the amount thereof to be added was changed to 0.0360 mmol/min. Physical properties of the sample 1-15 are shown in Table 2.

(Example 1-16) Coupled Conjugated Diene-Based Polymer (Sample 1-16)

A coupled conjugated diene-based polymer (sample 1-16) having, in a part of a main chain, a 3-branched structure derived from the branching agent structure (2) and having an 8-branched star polymer structure derived from the coupling agent was obtained in the same manner as in Example 1-1 except that the branching agent was changed from trimethoxy(4-vinylphenyl)silane to 1,1-bis(4-(dimethylmethoxysilyl)phenyl)ethylene (shown as "BS-3" in the table), that the amount thereof to be added was changed to 0.0120 mmol/min, that the coupling agent was changed from tetraethoxysilane to tetrakis(3-trimethoxysilylpropyl)-1,3-propanediamine (shown as "F" in the table), and that the amount thereof to be added was changed to 0.0160 mmol/min. Physical properties of the sample 1-16 are shown in Table 2.

(Example 1-17) Coupled Conjugated Diene-Based Polymer (Sample 1-17)

A coupled conjugated diene-based polymer (sample 1-17) having, in a part of a main chain, a 7-branched structure derived from the branching agent structure (2) and having a 4-branched star polymer structure derived from the coupling agent was obtained in the same manner as in Example 1-1 except that the branching agent was changed from trimethoxy(4-vinylphenyl)silane to 1,1-bis(4-trimethoxysilylphenyl)ethylene (shown as "BS-4" in the table), that the amount thereof to be added was changed to 0.0210 mmol/min, that the coupling agent was changed from tetraethoxysilane to 1,2-bis(triethoxysilyl)ethane (shown as "B" in the table), and that the amount thereof to be added was changed to 0.0360 mmol/min. Physical properties of the sample 1-17 are shown in Table 3.

(Example 1-18) Coupled Conjugated Diene-Based Polymer (Sample 1-18)

A coupled conjugated diene-based polymer (sample 1-18) having, in a part of a main chain, a 7-branched structure derived from the branching agent structure (2) and having a 4-branched star polymer structure derived from the coupling agent was obtained in the same manner as in Example 1-1 except that the branching agent was changed from trimethoxy(4-vinylphenyl)silane to 1,1-bis(4-trimethoxysilylphenyl)ethylene (shown as "BS-4" in the table), that the amount thereof to be added was changed to 0.0210 mmol/min, that the coupling agent was changed from tetraethoxysilane to 2,2-dimethoxy-1-(3-trimethoxysilylpropyl)-1-aza-2-silacyclopentane (shown as "D" in the table), and that the amount thereof to be added was changed to 0.0360 mmol/min. Physical properties of the sample 1-18 are shown in Table 3.

(Example 1-19) Coupled Conjugated Diene-Based Polymer (Sample 1-19)

A coupled conjugated diene-based polymer (sample 1-19) having, in a part of a main chain, a 7-branched structure derived from the branching agent structure (2) and having an 8-branched star polymer structure derived from the coupling agent was obtained in the same manner as in Example 1-1 except that the branching agent was changed from trimethoxy(4-vinylphenyl)silane to 1,1-bis(4-trimethoxysilylphenyl)ethylene (shown as "BS-4" in the table), that the amount thereof to be added was changed to 0.0210 mmol/min, that the coupling agent was changed from tetraethoxysilane to tetrakis(3-trimethoxysilylpropyl)-1,3-propanediamine (shown as "F" in the table), and that the amount thereof to be added was changed to 0.0160 mmol/min. Physical properties of the sample 1-19 are shown in Table 3.

(Example 1-20) Coupled Conjugated Diene-Based Polymer (Sample 1-20)

A coupled conjugated diene-based polymer (sample 1-20) having, in a part of a main chain, a 4-branched structure derived from the branching agent structure (1) and having an 8-branched star polymer structure derived from the coupling agent was obtained in the same manner as in Example 1-1 except that the branching agent was changed from trimethoxy(4-vinylphenyl)silane to trichloro(4-vinylphenyl) silane (shown as "BS-5" in the table), that the amount thereof to be added was changed to 0.0190 mmol/min, that the coupling agent was changed from tetraethoxysilane to 1,2-bis(triethoxysilyl)ethane (shown as "B" in the table), and that the amount thereof to be added was changed to 0.0360 mmol/min. Physical properties of the sample 1-20 are shown in Table 3.

(Example 1-21) Coupled Conjugated Diene-Based Polymer (Sample 1-21)

A coupled conjugated diene-based polymer (sample 1-21) having, in a part of a main chain, a 4-branched structure derived from the branching agent structure (1) and having an 8-branched star polymer structure derived from the coupling agent was obtained in the same manner as in Example 1-1 except that the branching agent was changed from trimethoxy(4-vinylphenyl)silane to trichloro(4-vinylphenyl) silane (shown as "BS-5" in the table), that the amount thereof to be added was changed to 0.0190 mmol/min, that the coupling agent was changed from tetraethoxysilane to 2,2-dimethoxy-1-(3-trimethoxysilylpropyl)-1-aza-2-silacyclopentane (shown as "D" in the table), and that the amount thereof to be added was changed to 0.0360 mmol/min. Physical properties of the sample 1-21 are shown in Table 3.

(Example 1-22) Coupled Conjugated Diene-Based Polymer (Sample 1-22)

A coupled conjugated diene-based polymer (sample 1-22) having, in a part of a main chain, a 4-branched structure derived from the branching agent structure (1) and having an 8-branched star polymer structure derived from the coupling agent was obtained in the same manner as in Example 1-1 except that the branching agent was changed from trimethoxy(4-vinylphenyl)silane to trichloro(4-vinylphenyl) silane (shown as "BS-5" in the table), that the amount thereof to be added was changed to 0.0190 mmol/min, that the coupling agent was changed from tetraethoxysilane to tetrakis(3-trimethoxysilylpropyl)-1,3-propanediamine (shown as "F" in the table), and that the amount thereof to be added was changed to 0.0160 mmol/min. Physical properties of the sample 1-22 are shown in Table 3.

(Example 1-23) Coupled Conjugated Diene-Based Polymer (Sample 1-23)

A coupled conjugated diene-based polymer (sample 1-23) having, in a part of a main chain, a 4-branched structure derived from the branching agent structure (1) and having an 8-branched star polymer structure derived from the coupling agent was obtained in the same manner as in Example 1-1 except that the amount of the branching agent trimethoxy (4-vinylphenyl)silane (shown as "BS-1" in the table) to be added was changed from 0.0190 mmol/min to 0.0100 mmol/min, that the coupling agent was changed from tetraethoxysilane to tetrakis(3-trimethoxysilylpropyl)-1,3-propanediamine (shown as "F" in a table), and that the amount thereof to be added was changed to 0.0190 mmol/min. Physical properties of the sample 1-23 are shown in Table 3.

(Example 1-24) Coupled Conjugated Diene-Based Polymer (Sample 1-24)

A coupled conjugated diene-based polymer (sample 1-24) having, in a part of a main chain, a 4-branched structure derived from the branching agent structure (1) and having an 8-branched star polymer structure derived from the coupling agent was obtained in the same manner as in Example 1-1 except that the amount of the branching agent trimethoxy (4-vinylphenyl)silane (shown as "BS-1" in the table) to be added was changed from 0.0190 mmol/min to 0.0250 mmol/min, that the coupling agent was changed from tetraethoxysilane to tetrakis(3-trimethoxysilylpropyl)-1,3-propanediamine (shown as "F" in a table), and that the amount thereof to be added was changed to 0.0190 mmol/min. Physical properties of the sample 1-24 are shown in Table 4.

(Example 1-25) Coupled Conjugated Diene-Based Polymer (Sample 1-25)

A coupled conjugated diene-based polymer (sample 1-25) having, in a part of a main chain, a 4-branched structure derived from the branching agent structure (1) and having an 8-branched star polymer structure derived from the coupling agent was obtained in the same manner as in Example 1-1 except that the amount of the branching agent trimethoxy (4-vinylphenyl)silane (shown as "BS-1" in the table) to be added was changed from 0.0190 mmol/min to 0.0350 mmol/min, that the coupling agent was changed from tetraethoxysilane to tetrakis(3-trimethoxysilylpropyl)-1,3-propanediamine (shown as "F" in a table), and that the amount thereof to be added was changed to 0.0190 mmol/min. Physical properties of the sample 1-25 are shown in Table 4.

(Example 1-26) Coupled Conjugated Diene-Based Polymer (Sample 1-26)

A coupled conjugated diene-based polymer (sample 1-26) having, in a part of a main chain, a 4-branched structure derived from the branching agent structure (1) and having an 8-branched star polymer structure derived from the coupling agent was obtained in the same manner as in Example 1-1 except that the coupling agent was changed from tetraethoxysilane to tetrakis(3-trimethoxysilylpropyl)-1,3-propanediamine (shown as "F" in the table), that the amount thereof to be added was changed to 0.0190 mmol/min, and that a liquid rubber (liquid polybutadiene LBR-302, manufactured by Kuraray Co., Ltd.) was added instead of SRAE oil added as the rubber softener. Physical properties of the sample 1-26 are shown in Table 4.

(Example 1-27) Coupled Conjugated Diene-Based Polymer (Sample 1-27)

A coupled conjugated diene-based polymer (sample 1-27) having, in a part of a main chain, a 4-branched structure derived from the branching agent structure (1) and having an 8-branched star polymer structure derived from the coupling agent was obtained in the same manner as in Example 1-1 except that the coupling agent was changed from tetraethoxysilane to tetrakis(3-trimethoxysilylpropyl)-1,3-propanediamine (shown as "F" in the table), that the amount thereof to be added was changed to 0.0190 mmol/min, and that a resin (terpene resin YS resin PX1250, manufactured by Yasuhara Chemical Co., Ltd.) was added instead of SRAE oil added as the rubber softener. Physical properties of the sample 1-27 are shown in Table 4.

(Example 1-28) Coupled Conjugated Diene-Based Polymer (Sample 1-28)

A coupled conjugated diene-based polymer (sample 1-28) having, in a part of a main chain, a 4-branched structure derived from the branching agent structure (1) and having an 8-branched star polymer structure derived from the coupling agent was obtained in the same manner as in Example 1-1 except that the coupling agent was changed from tetraethoxysilane to tetrakis(3-trimethoxysilylpropyl)-1,3-propanediamine (shown as "F" in the table), that the amount thereof to be added was changed to 0.0190 mmol/min, and that a naphthene oil (naphthene oil Nytex810, manufactured by Nynas) was added instead of SRAE oil added as the rubber softener. Physical properties of the sample 1-28 are shown in Table 4.

(Example 1-29) Coupled Conjugated Diene-Based Polymer (Sample 1-29)

A coupled conjugated diene-based polymer (sample 1-29) having, in a part of a main chain, a 4-branched structure derived from the branching agent structure (1) and having an 8-branched star polymer structure derived from the coupling agent was obtained in the same manner as in Example 1-1 except that the coupling agent was changed from tetraethoxysilane to tetrakis(3-trimethoxysilylpropyl)-1,3-propanediamine (shown as "F" in the table), that the amount thereof to be added was changed to 0.0190 mmol/min, and that a rubber softener was not added. Physical properties of the sample 1-29 are shown in Table 4.

(Example 1-30) Coupled Conjugated Diene-Based Polymer (Sample 1-30)

A coupled conjugated diene-based polymer (sample 1-30) having, in a part of a main chain, a 4-branched structure derived from the branching agent structure (1) and having an 8-branched star polymer structure derived from the coupling agent was obtained in the same manner as in Example 1-1 except that the coupling agent was changed from tetraethoxysilane to tetrakis(3-trimethoxysilylpropyl)-1,3-propanediamine (shown as "F" in the table), that the amount thereof to be added was changed to 0.0190 mmol/min, and that the amount of SRAE oil to be added as the rubber softener was changed from 25.0 g to 37.5 g per 100 g of the polymer. Physical properties of the sample 1-30 are shown in Table 4.

(Example 1-31) Conjugated Diene-Based Polymer (Sample 1-31)

A conjugated diene-based polymer (sample 1-31) having, in a part of a main chain, a 4-branched structure derived from the branching agent structure (1) but not having a star coupled structure derived from a coupling agent was obtained in the same manner as in Example 1-1 except that trimethoxy(4-vinylphenyl)silane (shown as "BS-1" in the table) was added as the branching agent at a rate of 0.190 mmol/min from the bottom of the second reactor when polymerization was sufficiently stabilized, and that a coupling agent was not added. Physical properties of the sample 1-31 are shown in Table 5.

(Example 1-32) Coupled Conjugated Diene-Based Polymer (Sample 1-32)

A coupled conjugated diene-based polymer (sample 1-32) having, in a part of a main chain, a 4-branched structure derived from the branching agent structure (1) and having a 3-branched star polymer structure derived from the coupling agent was obtained in the same manner as in Example 1-1 except that trimethoxy(4-vinylphenyl)silane (shown as "BS-1" in the table) was added as the branching agent at a rate of 0.190 mmol/min from the bottom of the second reactor when polymerization was sufficiently stabilized, and that the amount of tetraethoxysilane (shown as "A" in the table) to be added as the coupling agent was changed from 0.0480 mmol/min to 0.0120 mmol/min. Physical properties of the sample 1-32 are shown in Table 5.

(Example 1-33) Coupled Conjugated Diene-Based Polymer (Sample 1-33)

A coupled conjugated diene-based polymer (sample 1-33) having, in a part of a main chain, a 4-branched structure derived from the branching agent structure (1) and having an 8-branched star polymer structure derived from the coupling agent was obtained in the same manner as in Example 1-1 except that trimethoxy(4-vinylphenyl)silane (shown as "BS-1" in the table) was added as the branching agent at a rate of 0.190 mmol/min from the bottom of the second reactor when polymerization was sufficiently stabilized, that the coupling agent was changed from tetraethoxysilane to tetrakis(3-trimethoxysilylpropyl)-1,3-propanediamine (shown as "F" in the table), and that the amount thereof to be added was changed to 0.0038 mmol/min. Physical properties of the sample 1-33 are shown in Table 5.

(Example 1-34) Coupled Conjugated Diene-Based Polymer (Sample 1-34)

A coupled conjugated diene-based polymer (sample 1-34) having, in a part of a main chain, a 2-branched structure derived from the branching agent structure (1) and having a 3-branched star polymer structure derived from the coupling agent was obtained in the same manner as in Example 1-1 except that dimethylmethoxy(4-vinylphenyl)silane (shown as "BS-2" in the table) was added as the branching agent at a rate of 0.0350 mmol/min from the bottom of the second reactor when polymerization was sufficiently stabilized, and that the amount of tetraethoxysilane to be added as the coupling agent was changed from 0.0480 mmol/min to 0.0120 mmol/min. Physical properties of the sample 1-34 are shown in Table 5.

(Example 1-35) Coupled Conjugated Diene-Based Polymer (Sample 1-35)

A coupled conjugated diene-based polymer (sample 1-35) having, in a part of a main chain, a 3-branched structure derived from the branching agent structure (2) and having a 3-branched star polymer structure derived from the coupling agent was obtained in the same manner as in Example 1-1 except that 1,1-bis(4-(dimethylmethoxysilyl)phenyl)ethylene (shown as "BS-3" in the table) was added as the branching agent at a rate of 0.0120 mmol/min from the bottom of the second reactor when polymerization was sufficiently stabilized, and that the amount of tetraethoxysilane to be added as the coupling agent was changed from 0.0480 mmol/min to 0.0120 mmol/min. Physical properties of the sample 1-35 are shown in Table 5.

(Example 1-36) Coupled Conjugated Diene-Based Polymer (Sample 1-36)

A coupled conjugated diene-based polymer (sample 1-36) having, in a part of a main chain, a 4-branched structure derived from the branching agent structure (1) and having a 2-branched star polymer structure derived from the coupling agent was obtained in the same manner as in Example 1-1 except that the coupling agent was changed from tetraethoxysilane to 3-(benzylideneamino)propyltriethoxysilane (shown as "G" in the table), and that the amount thereof to be added was changed to 0.0620 mmol/min. Physical properties of the sample 1-36 are shown in Table 5.

(Example 1-37) Coupled Conjugated Diene-Based Polymer (Sample 1-37)

A coupled conjugated diene-based polymer (sample 1-37) having, in a part of a main chain, a 4-branched structure derived from the branching agent structure (1) and having a 4-branched star polymer structure derived from the coupling agent was obtained in the same manner as in Example 1-1 except that the amount of 1,3-butadiene to be added to the first reactor was changed from 18.6 g/min to 13.95 g/min, and that 1,3-butadiene was added in an amount of 4.65 g/min from the bottom of the second reactor at the same time as the branching agent. Physical properties of the sample 1-37 are shown in Table 5.

(Example A-1) Coupled Conjugated Diene-Based Polymer (Sample A-1)

Two tank pressure vessels, each of which is a stirrer-equipped tank reactor having an internal volume of 10 L and a ratio (L/D) of internal height (L) and diameter (D) of 4.0, having an inlet at a bottom and an outlet at a top, and equipped with a stirrer and a temperature controlling jacket, were connected to each other as polymerization reactors.

1,3-Butadiene, from which a water content had been precedently removed, styrene and n-hexane were mixed under conditions of 14 g/min, 10.0 g/min and 175.2 g/min, respectively.

In a static mixer provided in the middle of a pipe for supplying the thus obtained mixed solution to the inlet of the reactor, n-butyllithium to be used for residual impurity inactivation was added and mixed in an amount of 0.103 mmol/min, and the resultant was continuously supplied to the bottom of the reactor. Besides, 2,2-bis(2-oxolanyl)propane used as a polar material and n-butyllithium used as a polymerization initiator were supplied, at rates of respectively 0.081 mmol/min and 0.143 mmol/min, to the bottom of the first reactor in which materials were vigorously mixed by the stirrer, and the internal temperature of the reactor was kept at 67° C.

The thus obtained polymer solution was continuously taken out from the top of the first reactor to be continuously supplied to the bottom of the second reactor for continuing the reaction at 70° C., and the resultant was further supplied to a static mixer from the top of the second reactor. When the polymerization was sufficiently stabilized, while copolymerizing 1,3-butadiene and styrene, trimethoxy(4-vinylphenyl)silane (shown as "BS-1" in the table) used as a branching agent was added at a rate of 0.0190 mmol/min from the bottom of the second reactor, and 1,3-butadiene was added in parallel at 4.6 g/min, so as to perform a polymerization reaction and a branching reaction for obtaining a conjugated diene-based polymer having a main chain branch structure.

When the polymerization reaction and the branching reaction were stabilized, a small amount of a conjugated diene-based polymer solution prior to addition of a coupling agent was taken out, an antioxidant (BHT) was added thereto in an amount of 0.2 g per 100 g of the polymer, then the solvent was removed, and a Mooney viscosity at 110° C. and various molecular weights were measured. The physical properties are shown in Table 7.

Next, to the polymer solution flowing out of the outlet of the reactor, 2,2-dimethoxy-1-(3-trimethoxysilylpropyl)-1-aza-2-silacyclopentane (shown as "D" in the table) was added, as a coupling agent, continuously in an amount to be added of 0.0360 mmol/min, and the resultant was mixed by using a static mixer for performing a coupling reaction.

Here, a time until the addition of the coupling agent to the polymer solution flowing out of the outlet of the reactor was 4.8 min, the temperature was 68° C., and a difference between the temperature in the polymerizing step and the temperature until the addition of the coupling agent was 2° C.

After the coupling reaction, a small amount of a conjugated diene-based polymer solution was taken out, an antioxidant (BHT) was added thereto in an amount of 0.2 g per 100 g of the polymer, then the solvent was removed, and the amount of bound styrene (Physical Property 6) and the microstructure of a butadiene portion (the amount of 1,2-vinyl bond; Physical Property 7) were measured. Measurement results are shown in Table 7.

Next, to the polymer solution resulting from the coupling reaction, an antioxidant (BHT) was continuously added in an amount of 0.2 g per 100 g of the polymer at 0.055 g/min (n-hexane solution) to complete the coupling reaction.

Simultaneously with the antioxidant, SRAE oil (JOMO Process NC 140, manufactured by JX Nippon Oil & Energy Corporation) was continuously added as a rubber softener in an amount of 25.0 g per 100 g of the polymer, and the resultant was mixed by using a static mixer.

The solvent was removed by steam stripping, and thus, a coupled conjugated diene-based polymer (Sample A-1) having, in a part of a main chain, a 4-branched structure derived from the branching agent corresponding to the compound represented by the formula (1) (hereinafter also referred to as the "branching agent structure (1)") and having a 4-branched star polymer structure derived from the coupling agent was obtained.

Physical properties of the sample A-1 are shown in Table 7.

In each of the polymer obtained prior to the addition of the branching agent, the polymer obtained after the addition of the branching agent, and the polymers obtained in the respective steps after the addition of the coupling agent, the structure of the coupled conjugated diene-based polymer was identified based on comparison between a molecular weight measured by GPC and a branch number measured by viscosity detector-equipped GPC.

(Example A-2) Coupled Conjugated Diene-Based Polymer (Sample A-2)

Two tank pressure vessels, each of which was a stirrer-equipped tank reactor having an internal volume of 10 L and a ratio (L/D) of an internal height (L) and a diameter (D) of 4.0, having an inlet at a bottom and an outlet at a top, and equipped with a stirrer and a temperature controlling jacket, were connected to each other as polymerization reactors.

1,3-Butadiene, from which a water content had been precedently removed, styrene and n-hexane were mixed under conditions of 14 g/min, 8.0 g/min and 175.2 g/min, respectively.

In a static mixer provided in the middle of a pipe for supplying the thus obtained mixed solution to the inlet of the reactor, n-butyllithium to be used for residual impurity inactivation was added and mixed in an amount of 0.103 mmol/min, and the resultant was continuously supplied to the bottom of the reactor. Besides, 2,2-bis(2-oxolanyl)propane used as a polar material and n-butyllithium used as a polymerization initiator were supplied, at rates of respectively 0.081 mmol/min and 0.143 mmol/min, to the bottom of the first reactor in which materials were vigorously mixed by the stirrer, and the internal temperature of the reactor was kept at 67° C.

The thus obtained polymer solution was continuously taken out from the top of the first reactor to be continuously supplied to the bottom of the second reactor for continuing the reaction at 70° C., and the resultant was further supplied to a static mixer from the top of the second reactor. When the polymerization was sufficiently stabilized, while copolymerizing 1,3-butadiene and styrene, trimethoxy(4-vinylphenyl)silane (shown as "BS-1" in the table) used as a branching agent was added at a rate of 0.0190 mmol/min from the bottom of the second reactor, and 1,3-butadiene and styrene were added in parallel at 4.6 g/min and 2.0 g/min, so as to perform a polymerization reaction and a branching reaction for obtaining a conjugated diene-based polymer having a main chain branch structure.

When the polymerization reaction and the branching reaction were stabilized, a small amount of a conjugated diene-based polymer solution prior to addition of a coupling agent was taken out, an antioxidant (BHT) was added thereto in an amount of 0.2 g per 100 g of the polymer, then the solvent was removed, and a Mooney viscosity at 110° C. and various molecular weights were measured. The physical properties are shown in Table 7.

Next, to the polymer solution flowing out of the outlet of the reactor, 2,2-dimethoxy-1-(3-trimethoxysilylpropyl)-1-aza-2-silacyclopentane (shown as "D" in the table) was added, as a coupling agent, continuously in an amount to be added of 0.0360 mmol/min, and the resultant was mixed by using a static mixer for performing a coupling reaction.

Here, a time until the addition of the coupling agent to the polymer solution flowing out of the outlet of the reactor was 4.8 min, the temperature was 68° C., and a difference between the temperature in the polymerizing step and the temperature until the addition of the coupling agent was 2° C. A small amount of a conjugated diene-based polymer solution after the coupling reaction was taken out, an antioxidant (BHT) was added thereto in an amount of 0.2 g per 100 g of the polymer, then the solvent was removed, and the amount of bound styrene (Physical Property 6) and the microstructure of a butadiene portion (the amount of 1,2-vinyl bond; Physical Property 7) were measured. Measurement results are shown in Table 7.

Next, to the polymer solution resulting from the coupling reaction, an antioxidant (BHT) was continuously added in an amount of 0.2 g per 100 g of the polymer at 0.055 g/min (n-hexane solution) to complete the coupling reaction.

Simultaneously with the antioxidant, SRAE oil (JOMO Process NC 140, manufactured by JX Nippon Oil & Energy Corporation) was continuously added as a rubber softener in an amount of 25.0 g per 100 g of the polymer, and the resultant was mixed by using a static mixer.

The solvent was removed by steam stripping, and thus, a coupled conjugated diene-based polymer (Sample A-2) having, in a part of a main chain, a 4-branched structure derived from the branching agent corresponding to the compound represented by the formula (1) (hereinafter also referred to as the "branching agent structure (1)") and having a 4-branched star polymer structure derived from the coupling agent was obtained. Physical properties of the sample A-2 are shown in Table 7.

In each of the polymer obtained prior to the addition of the branching agent, the polymer obtained after the addition of the branching agent, and the polymers obtained in the respective steps after the addition of the coupling agent, the structure of the coupled conjugated diene-based polymer was identified based on comparison between a molecular weight measured by GPC and a branch number measured by viscosity detector-equipped GPC.

Coupled Conjugated Diene-Based Polymer (Comparative Example 1-1) Coupled Conjugated Diene-Based Polymer (Sample 1-38)

Two tank pressure vessels, each of which was a stirrer-equipped tank reactor having an internal volume of 10 L and a ratio (L/D) of an internal height (L) and a diameter (D) of 4.0, having an inlet at a bottom and an outlet at a top, and equipped with a stirrer and a temperature controlling jacket, were connected to each other as polymerization reactors.

1,3-Butadiene, from which a water content had been precedently removed, styrene and n-hexane were mixed under conditions of 18.6 g/min, 10.0 g/min and 175.2 g/min, respectively. In a static mixer provided in the middle of a pipe for supplying the thus obtained mixed solution to the inlet of the reactor, n-butyllithium to be used for residual impurity inactivation was added and mixed in an amount of 0.103 mmol/min, and the resultant was continuously supplied to the bottom of the reactor. Besides, 2,2-bis(2-oxolanyl)propane used as a polar material and n-butyllithium used as a polymerization initiator were supplied, at rates of respectively 0.081 mmol/min and 0.143 mmol/min, to the bottom of the first reactor in which materials were vigorously mixed by the stirrer, and the internal temperature of the reactor was kept at 67° C.

The thus obtained polymer solution was continuously taken out from the top of the first reactor to be continuously supplied to the bottom of the second reactor for continuing the reaction at 70° C., and the resultant was further supplied to a static mixer from the top of the second reactor. When polymerization was sufficiently stabilized, a small amount of a polymer solution prior to addition of a coupling agent was taken out, an antioxidant (BHT) was added thereto in an amount of 0.2 g per 100 g of the polymer, then the solvent was removed, and a Mooney viscosity at 110° C. and various molecular weights were measured. The physical properties are shown in Table 6.

Next, to the polymer solution flowing out of the outlet of the reactor, tetraethoxysilane (shown as "A" in the table) was added, as a coupling agent, continuously at a rate of 0.0480 mmol/min, and the resultant was mixed by using a static mixer for performing a coupling reaction. Here, a time until the addition of the coupling agent to the polymer solution flowing out of the outlet of the reactor was 4.8 min, the temperature was 68° C., and a difference between the temperature in the polymerizing step and the temperature until the addition of the coupling agent was 2° C. After the coupling reaction, a small amount of a conjugated diene-based polymer solution was taken out, an antioxidant (BHT) was added thereto in an amount of 0.2 g per 100 g of the polymer, then the solvent was removed, and the amount of bound styrene (Physical Property 6) and the microstructure of a butadiene portion (the amount of 1,2-vinyl bond; Physical Property 7) were measured. Measurement results are shown in Table 6.

Next, to the polymer solution resulting from the coupling reaction, an antioxidant (BHT) was continuously added in an amount of 0.2 g per 100 g of the polymer at 0.055 g/min (n-hexane solution) to complete the coupling reaction. Simultaneously with the antioxidant, SRAE oil (JOMO Process NC 140, manufactured by JX Nippon Oil & Energy Corporation) was continuously added as a rubber softener in an amount of 25.0 g per 100 g of the polymer, and the resultant was mixed by using a static mixer. The solvent was removed by steam stripping, and thus, a coupled conjugated diene-based polymer (Sample 1-38) not having a main chain branch derived from a branching agent but having a 3-branched star polymer structure derived from the coupling agent was obtained. Physical properties of the sample 1-38 are shown in Table 6.

(Comparative Example 1-2) Coupled Conjugated Diene-Based Polymer (Sample 1-39)

A coupled conjugated diene-based polymer (sample 1-39) not having a main chain branch derived from a branching agent but having a 4-branched star polymer structure derived from the coupling agent was obtained in the same manner as in Comparative Example 1-1 except that the coupling agent was changed from tetraethoxysilane to 2,2-dimethoxy-1-(3-trimethoxysilylpropyl)-1-aza-2-silacyclopentane (shown as "D" in the table), and that the amount thereof to be added was changed to 0.0360 mmol/min. Physical properties of the sample 1-39 are shown in Table 6.

(Comparative Example 1-3) Coupled Conjugated Diene-Based Polymer (Sample 1-40)

A coupled conjugated diene-based polymer (sample 1-40) not having a main chain branch derived from a branching agent but having an 8-branched star polymer structure derived from the coupling agent was obtained in the same manner as in Comparative Example 1-1 except that the coupling agent was changed from tetraethoxysilane to tetrakis(3-trimethoxysilylpropyl)-1,3-propanediamine (shown as "F" in the table), and that the amount thereof to be added was changed to 0.0190 mmol/min. Physical properties of the sample 1-40 are shown in Table 6.

(Comparative Example B-1) Coupled Conjugated Diene-Based Polymer (Sample B-1)

Two tank pressure vessels, each of which was a stirrer-equipped tank reactor having an internal volume of 10 L and a ratio (L/D) of an internal height (L) and a diameter (D) of 4.0, having an inlet at a bottom and an outlet at a top, and equipped with a stirrer and a temperature controlling jacket, were connected to each other as polymerization reactors.

1,3-Butadiene, from which a water content had been precedently removed, styrene and n-hexane were mixed under conditions of 18.6 g/min, 10.0 g/min and 175.2 g/min, respectively.

In a static mixer provided in the middle of a pipe for supplying the thus obtained mixed solution to the inlet of the reactor, n-butyllithium to be used for residual impurity inactivation was added and mixed in an amount of 0.103 mmol/min, and the resultant was continuously supplied to the bottom of the reactor. Besides, 2,2-bis(2-oxolanyl)propane used as a polar material and n-butyllithium used as a polymerization initiator were supplied, at rates of respectively 0.081 mmol/min and 0.143 mmol/min, to the bottom of the first reactor in which materials were vigorously mixed by the stirrer, and the internal temperature of the reactor was kept at 67° C.

The thus obtained polymer solution was continuously taken out from the top of the first reactor to be continuously supplied to the bottom of the second reactor for continuing the reaction at 70° C., and the resultant was further supplied to a static mixer from the top of the second reactor. When the polymerization was sufficiently stabilized, a small amount of a polymer solution prior to addition of a coupling agent was taken out, an antioxidant (BHT) was added thereto in an amount of 0.2 g per 100 g of the polymer, then the solvent was removed, and a Mooney viscosity at 110° C. and various molecular weights were measured. The physical properties are shown in Table 7.

Next, to the polymer solution flowing out of the outlet of the reactor, trimethoxy(4-vinylphenyl)silane (shown as "BS-1" in the table) was added at a rate of 0.0190 mmol/min, and simultaneously, tetraethoxysilane (shown as "A" in the table) was continuously added at a rate of 0.0480 mmol/min, and the resultant was mixed by using a static mixer to perform a coupling reaction.

Here, a time until the addition of the coupling agent to the polymer solution flowing out of the outlet of the reactor was 4.8 min, the temperature was 68° C., and a difference between the temperature in the polymerizing step and the temperature until the addition of the coupling agent was 2° C. After the coupling reaction, a small amount of a conjugated diene-based polymer solution was taken out, an antioxidant (BHT) was added thereto in an amount of 0.2 g per 100 g of the polymer, then the solvent was removed, and the amount of bound styrene (Physical Property 6) and the microstructure of a butadiene portion (the amount of 1,2-vinyl bond; Physical Property 7) were measured. Measurement results are shown in Table 7.

Next, to the polymer solution resulting from the coupling reaction, the antioxidant (BHT) was continuously added in an amount of 0.2 g per 100 g of the polymer at 0.055 g/min (n-hexane solution) to complete the coupling reaction. Simultaneously with the antioxidant, SRAE oil (JOMO Process NC 140, manufactured by JX Nippon Oil & Energy Corporation) was continuously added as a rubber softener in an amount of 25.0 g per 100 g of the polymer, and the resultant was mixed by using a static mixer. The solvent was removed by steam stripping, and thus, a coupled conjugated diene-based polymer (sample B-1) was obtained. Physical properties of the sample B-1 are shown in Table 7.

Although "BS-1" is shown in the column of the branching agent of Comparative Example B-1 in Table 7 below, a main chain branch point could not be formed, and it did not work as the branching agent when the addition method of this example in which "BS-1" and "A" are simultaneously added was employed.

In each of the polymer obtained prior to the addition of "BS-1", the polymer obtained after the addition of "BS-1", and the polymers obtained in the respective steps after the addition of "A", the structure of the coupled conjugated diene-based polymer was identified based on comparison between a molecular weight measured by GPC and a branch number measured by viscosity detector-equipped GPC.

(Comparative Example B-2) Coupled Conjugated Diene-Based Polymer (Sample B-2)

A branching agent was not used.
Besides, a coupling agent (shown as "Z-1" in the table) represented by the following formula (Z-1) was used as the coupling agent, and the amount thereof to be added was 0.0360 mmol/min. In the same manner as in Comparative Example B-1 except for these, a coupled conjugated diene-based polymer (sample B-2) not having a main chain branch derived from a branching agent but having a 10-branched star polymer structure derived from the coupling agent was obtained. Physical properties of the sample B-2 are shown in Table 7.

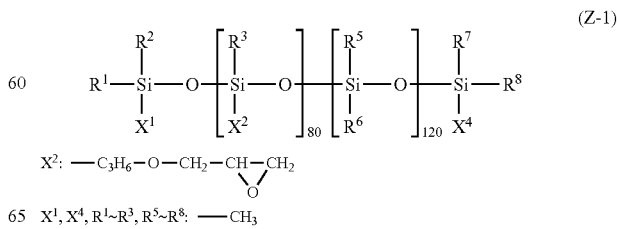

TABLE 1

|  |  |  |  | Example 1-1 | Example 1-2 | Example 1-3 | Example 1-4 | Example 1-5 |
|---|---|---|---|---|---|---|---|---|
|  | Branched Conjugated Diene-based Polymer (Sample No.) |  |  | 1-1 | 1-2 | 1-3 | 1-4 | 1-5 |
| Polymerization Conditions |  | Butadiene | (g/min) | 18.6 | 18.6 | 18.6 | 18.6 | 18.6 |
|  |  | Styrene | (g/min) | 10.0 | 10.0 | 10.0 | 10.0 | 10.0 |
|  |  | n-Hexane | (g/min) | 175.2 | 175.2 | 175.2 | 175.2 | 175.2 |
|  | Polymerization Temperature |  | (° C.) | 70 | 70 | 70 | 70 | 70 |
|  | n-Butyllithium for Treatment |  | (mmol/min) | 0.103 | 0.103 | 0.103 | 0.103 | 0.103 |
|  | n-Butyllithium as Polymerization Initiator |  | (mmol/min) | 0.143 | 0.143 | 0.143 | 0.143 | 0.143 |
|  | Amount of Polar Material Added |  | (mmol/min) | 0.081 | 0.081 | 0.081 | 0.081 | 0.081 |
|  | Branching Agent | Type |  | BS-1 | BS-1 | BS-1 | BS-1 | BS-1 |
|  |  | Amount Added | (mmol/min) | 0.0190 | 0.0190 | 0.0190 | 0.0190 | 0.0190 |
|  | Coupling Agent | Type |  | A | B | C | D | E |
|  |  | Amount Added | (mmol/min) | 0.048 | 0.0360 | 0.0360 | 0.0360 | 0.0250 |
| Physical Property Values | Conjugated Diene-based Polymer | (Physical Property 4) Weight Average Molecular Weight | ($10^4$ g/mol) | 63.9 | 63.9 | 63.9 | 63.9 | 63.9 |
|  |  | (Physical Property 4) Number Average Molecular Weight | ($10^4$ g/mol) | 33.1 | 33.1 | 33.1 | 33.1 | 33.1 |
|  |  | (Physical Property 4) Mw/Mn |  | 1.93 | 1.93 | 1.93 | 1.93 | 1.93 |
|  |  | (Physical Property 1) Mooney Viscosity (110° C.) |  | 92.1 | 92.1 | 92.1 | 92.1 | 92.1 |
|  | Coupled Conjugated Diene-based Polymer | Type of Rubber Softener |  | SRAE | SRAE | SRAE | SRAE | SRAE |
|  |  | Amount of Rubber Softener Added | (phm) | 25.0 | 25.0 | 25.0 | 25.0 | 25.0 |
|  |  | (Physical Property 1) Mooney Viscosity (100° C.) |  | 91 | 98 | 99 | 98 | 98 |
|  |  | (Physical Property 2) Mooney Relaxation Rate (100° C.) |  | 0.264 | 0.253 | 0.252 | 0.253 | 0.253 |
|  |  | (Physical Property 3) Branch Number Bn | per molecule | 8.2 | 8.8 | 8.8 | 8.7 | 12.0 |
|  |  | (Physical Property 4) Weight Average Molecular Weight | ($10^4$ g/mol) | 89.3 | 92.1 | 92.3 | 92.0 | 96.0 |
|  |  | (Physical Property 4) Number Average Molecular Weight | ($10^4$ g/mol) | 45.6 | 46.6 | 46.8 | 46.7 | 48.7 |
|  |  | (Physical Property 4) Mw/Mn |  | 1.96 | 1.98 | 1.97 | 1.97 | 1.97 |
|  |  | (Physical Property 5) Modification Ratio | (%) | — | — | 87 | 88 | 86 |
|  |  | (Physical Property 6) Amount of Bound Styrene | (mass %) | 35 | 35 | 35 | 35 | 35 |
|  |  | (Physical Property 7) Amount of Bound Vinyl (Amount of 1,2-Vinyl Bond) | (mol %) | 40 | 40 | 40 | 40 | 40 |
|  |  | (Physical Property 8) Absolute Molecular Weight (Mw-i) | ($10^4$ Daltons) | 132 | 142 | 148 | 144 | 170 |

|  |  |  |  | Example 1-6 | Example 1-7 | Example 1-8 |
|---|---|---|---|---|---|---|
|  | Branched Conjugated Diene-based Polymer (Sample No.) |  |  | 1-6 | 1-7 | 1-8 |
| Polymerization Conditions |  | Butadiene | (g/min) | 18.6 | 18.6 | 24.3 |
|  |  | Styrene | (g/min) | 10.0 | 10.0 | 4.3 |
|  |  | n-Hexane | (g/min) | 175.2 | 175.2 | 175.2 |
|  | Polymerization Temperature |  | (° C.) | 70 | 70 | 70 |
|  | n-Butyllithium for Treatment |  | (mmol/min) | 0.103 | 0.103 | 0.103 |
|  | n-Butyllithium as Polymerization Initiator |  | (mmol/min) | 0.143 | 0.143 | 0.143 |
|  | Amount of Polar Material Added |  | (mmol/min) | 0.081 | 0.081 | 0.044 |
|  | Branching Agent | Type |  | BS-1 | BS-1 | BS-1 |
|  |  | Amount Added | (mmol/min) | 0.0190 | 0.0190 | 0.0190 |
|  | Coupling Agent | Type |  | F | F | F |
|  |  | Amount Added | (mmol/min) | 0.0190 | 0.0160 | 0.0160 |
| Physical Property Values | Conjugated Diene-based Polymer | (Physical Property 4) Weight Average Molecular Weight | ($10^4$ g/mol) | 63.9 | 63.9 | 62.3 |
|  |  | (Physical Property 4) Number Average Molecular Weight | ($10^4$ g/mol) | 33.1 | 33.1 | 32.7 |
|  |  | (Physical Property 4) Mw/Mn |  | 1.93 | 1.93 | 1.93 |
|  |  | (Physical Property 1) Mooney Viscosity (110° C.) |  | 92.1 | 92.1 | 89.4 |
|  | Coupled Conjugated Diene-based Polymer | Type of Rubber Softener |  | SRAE | SRAE | SRAE |
|  |  | Amount of Rubber Softener Added | (phm) | 25.0 | 25.0 | 25.0 |
|  |  | (Physical Property 1) Mooney Viscosity (100° C.) |  | 97 | 95 | 93 |
|  |  | (Physical Property 2) Mooney Relaxation Rate (100° C.) |  | 0.255 | 0.258 | 0.261 |
|  |  | (Physical Property 3) Branch Number Bn | per molecule | 15.8 | 20.0 | 19.2 |

TABLE 1-continued

| | | | | | |
|---|---|---|---|---|---|
| (Physical Property 4) Weight Average Molecular Weight | (10⁴ g/mol) | 105.3 | 106.0 | 105.8 |
| (Physical Property 4) Number Average Molecular Weight | (10⁴ g/mol) | 53.4 | 54.6 | 54.8 |
| (Physical Property 4) Mw/Mn | | 1.97 | 1.94 | 1.93 |
| (Physical Property 5) Modification Ratio | (%) | 86 | 82 | 84 |
| (Physical Property 6) Amount of Bound Styrene | (mass %) | 35 | 35 | 15 |
| (Physical Property 7) Amount of Bound Vinyl (Amount of 1,2-Vinyl Bond) | (mol %) | 40 | 40 | 28 |
| (Physical Property 8) Absolute Molecular Weight (Mw-i) | (10⁴ Daltons) | 186 | 281 | 273 |

TABLE 2

| | | | | Example 1-9 | Example 1-10 | Example 1-11 | Example 1-12 | Example 1-13 |
|---|---|---|---|---|---|---|---|---|
| | Branched Conjugated Diene-based Polymer (Sample No.) | | | 1-9 | 1-10 | 1-11 | 1-12 | 1-13 |
| Polymerization Conditions | Butadiene | | (g/min) | 17.1 | 18.6 | 18.6 | 18.6 | 18.6 |
| | Styrene | | (g/min) | 11.5 | 10.0 | 10.0 | 10.0 | 10.0 |
| | n-Hexane | | (g/min) | 175.2 | 175.2 | 175.2 | 175.2 | 175.2 |
| | Polymerization Temperature | | (° C.) | 70 | 70 | 70 | 70 | 70 |
| | n-Butyllithium for Treatment | | (mmol/min) | 0.103 | 0.103 | 0.103 | 0.103 | 0.103 |
| | n-Butyllithium as Polymerization Initiator | | (mmol/min) | 0.143 | 0.143 | 0.143 | 0.143 | 0.143 |
| | Amount of Polar Material Added | | (mmol/min) | 0.089 | 0.2 | 0.081 | 0.081 | 0.081 |
| | Branching Agent | Type | | BS-1 | BS-1 | BS-2 | BS-2 | BS-2 |
| | | Amount Added | (mmol/min) | 0.0190 | 0.0190 | 0.0350 | 0.0350 | 0.0350 |
| | Coupling Agent | Type | | F | F | B | D | F |
| | | Amount Added | (mmol/min) | 0.0160 | 0.0160 | 0.0360 | 0.0360 | 0.0160 |
| Physical Property Values | Conjugated Diene-based Polymer | (Physical Property 4) Weight Average Molecular Weight | (10⁴ g/mol) | 64.2 | 64.7 | 60.3 | 60.3 | 60.3 |
| | | (Physical Property 4) Number Average Molecular Weight | (10⁴ g/mol) | 33.5 | 33.8 | 32.2 | 32.2 | 32.2 |
| | | (Physical Property 4) Mw/Mn | | 1.93 | 1.93 | 1.87 | 1.87 | 1.87 |
| | | (Physical Property 1) Mooney Viscosity (110° C.) | | 93.8 | 95.1 | 88.2 | 88.2 | 88.2 |
| | Coupled Conjugated Diene-based Polymer | Type of Rubber Softener | | SRAE | SRAE | SRAE | SRAE | SRAE |
| | | Amount of Rubber Softener Added | (phm) | 25.0 | 25.0 | 25.0 | 25.0 | 25.0 |
| | | (Physical Property 1) Mooney Viscosity (100° C.) | | 96 | 99 | 93 | 94 | 97 |
| | | (Physical Property 2) Mooney Relaxation Rate (100° C.) | | 0.256 | 0.252 | 0.261 | 0.260 | 0.255 |
| | | (Physical Property 3) Branch Number Bn | per molecule | 21.6 | 22.3 | 8.2 | 8.2 | 13.0 |
| | | (Physical Property 4) Weight Average Molecular Weight | (10⁴ g/mol) | 107.0 | 107.4 | 91.7 | 92.0 | 105.3 |
| | | (Physical Property 4) Number Average Molecular Weight | (10⁴ g/mol) | 55.4 | 54.2 | 46.5 | 46.5 | 54.6 |
| | | (Physical Property 4) Mw/Mn | | 1.93 | 1.98 | 1.97 | 1.98 | 1.93 |
| | | (Physical Property 5) Modification Ratio | (%) | 82 | 81 | — | 85 | 81 |
| | | (Physical Property 6) Amount of Bound Styrene | (mass %) | 40 | 35 | 35 | 35 | 35 |
| | | (Physical Property 7) Amount of Bound Vinyl (Amount of 1,2-Vinyl Bond) | (mol %) | 40 | 58 | 40 | 40 | 40 |
| | | (Physical Property 8) Absolute Molecular Weight (Mw-i) | (10⁴ Daltons) | 287 | 291 | 133 | 136 | 176 |

| | | | | Example 1-14 | Example 1-15 | Example 1-16 |
|---|---|---|---|---|---|---|
| | Branched Conjugated Diene-based Polymer (Sample No.) | | | 1-14 | 1-15 | 1-16 |
| Polymerization Conditions | Butadiene | | (g/min) | 18.6 | 18.6 | 18.6 |
| | Styrene | | (g/min) | 10.0 | 10.0 | 10.0 |
| | n-Hexane | | (g/min) | 175.2 | 175.2 | 175.2 |
| | Polymerization Temperature | | (° C.) | 70 | 70 | 70 |

TABLE 2-continued

|  |  |  | | | | |
|---|---|---|---|---|---|---|
|  |  | n-Butyllithium for Treatment | (mmol/min) | 0.103 | 0.103 | 0.103 |
|  |  | n-Butyllithium as Polymerization Initiator | (mmol/min) | 0.143 | 0.143 | 0.143 |
|  |  | Amount of Polar Material Added | (mmol/min) | 0.081 | 0.081 | 0.081 |
|  | Branching Agent | Type |  | BS-3 | BS-3 | BS-3 |
|  |  | Amount Added | (mmol/min) | 0.0120 | 0.0120 | 0.0120 |
|  | Coupling Agent | Type |  | B | D | F |
|  |  | Amount Added | (mmol/min) | 0.0360 | 0.0360 | 0.0160 |
| Physical Property Values | Conjugated Diene-based Polymer | (Physical Property 4) Weight Average Molecular Weight | ($10^4$ g/mol) | 74.5 | 74.5 | 74.5 |
|  |  | (Physical Property 4) Number Average Molecular Weight | ($10^4$ g/mol) | 37.8 | 37.8 | 37.8 |
|  |  | (Physical Property 4) Mw/Mn |  | 1.97 | 1.97 | 1.97 |
|  |  | (Physical Property 1) Mooney Viscosity (110° C.) |  | 99.1 | 99.1 | 99.1 |
|  | Coupled Conjugated Diene-based Polymer | Type of Rubber Softener |  | SRAE | SRAE | SRAE |
|  |  | Amount of Rubber Softener Added | (phm) | 25.0 | 25.0 | 25.0 |
|  |  | (Physical Property 1) Mooney Viscosity (100° C.) |  | 94 | 96 | 82 |
|  |  | (Physical Property 2) Mooney Relaxation Rate (100° C.) |  | 0.260 | 0.256 | 0.280 |
|  |  | (Physical Property 3) Branch Number Bn | per molecule | 17.4 | 18.0 | 30.0 |
|  |  | (Physical Property 4) Weight Average Molecular Weight | ($10^4$ g/mol) | 112.6 | 115.0 | 135.0 |
|  |  | (Physical Property 4) Number Average Molecular Weight | ($10^4$ g/mol) | 56.9 | 57.2 | 69.6 |
|  |  | (Physical Property 4) Mw/Mn |  | 1.98 | 2.01 | 1.94 |
|  |  | (Physical Property 5) Modification Ratio | (%) | — | 82 | 85 |
|  |  | (Physical Property 6) Amount of Bound Styrene | (mass %) | 35 | 35 | 35 |
|  |  | (Physical Property 7) Amount of Bound Vinyl (Amount of 1,2-Vinyl Bond) | (mol %) | 40 | 40 | 40 |
|  |  | (Physical Property 8) Absolute Molecular Weight (Mw-i) | ($10^4$ Daltons) | 153 | 160 | 335 |

TABLE 3

|  |  |  | | Example 1-17 | Example 1-18 | Example 1-19 | Example 1-20 |
|---|---|---|---|---|---|---|---|
|  | Branched Conjugated Diene-based Polymer (Sample No.) |  |  | 1-17 | 1-18 | 1-19 | 1-20 |
| Polymerization Conditions |  | Butadiene | (g/min) | 18.6 | 18.6 | 18.6 | 18.6 |
|  |  | Styrene | (g/min) | 10.0 | 10.0 | 10.0 | 10.0 |
|  |  | n-Hexane | (g/min) | 175.2 | 175.2 | 175.2 | 175.2 |
|  |  | Polymerization Temperature | (° C.) | 70 | 70 | 70 | 70 |
|  |  | n-Butyllithium for Treatment | (mmol/min) | 0.103 | 0.103 | 0.103 | 0.103 |
|  |  | n-Butyllithium as Polymerization Initiator | (mmol/min) | 0.143 | 0.143 | 0.143 | 0.143 |
|  |  | Amount of Polar Material Added | (mmol/min) | 0.081 | 0.081 | 0.081 | 0.081 |
|  | Branching Agent | Type |  | BS-4 | BS-4 | BS-4 | BS-5 |
|  |  | Amount Added | (mmol/min) | 0.0210 | 0.0210 | 0.0210 | 0.0190 |
|  | Coupling Agent | Type |  | B | D | F | B |
|  |  | Amount Added | (mmol/min) | 0.0360 | 0.0360 | 0.0160 | 0.0360 |
| Physical Property Values | Conjugated Diene-based Polymer | (Physical Property 4) Weight Average Molecular Weight | ($10^4$ g/mol) | 61.5 | 61.5 | 61.5 | 63.9 |
|  |  | (Physical Property 4) Number Average Molecular Weight | ($10^4$ g/mol) | 31.1 | 31.1 | 31.1 | 33.1 |
|  |  | (Physical Property 4) Mw/Mn |  | 1.98 | 1.98 | 1.98 | 1.93 |
|  |  | (Physical Property 1) Mooney Viscosity (110° C.) |  | 90.6 | 90.6 | 90.6 | 92.1 |
|  | Coupled Conjugated Diene-based Polymer | Type of Rubber Softener |  | SRAE | SRAE | SRAE | SRAE |
|  |  | Amount of Rubber Softener Added | (phm) | 25.0 | 25.0 | 25.0 | 25.0 |
|  |  | (Physical Property 1) Mooney Viscosity (100° C.) |  | 95 | 97 | 99 | 97 |
|  |  | (Physical Property 2) Mooney Relaxation Rate (100° C.) |  | 0.258 | 0.255 | 0.252 | 0.255 |
|  |  | (Physical Property 3) Branch Number Bn | per molecule | 8.4 | 8.5 | 14.2 | 8.4 |
|  |  | (Physical Property 4) Weight Average Molecular Weight | ($10^4$ g/mol) | 90.3 | 91.0 | 102.3 | 90.6 |

TABLE 3-continued

|  |  |  |  |  |  |  |
|---|---|---|---|---|---|---|
|  | (Physical Property 4) Number Average Molecular Weight | (10⁴ g/mol) | 45.8 | 46.0 | 51.9 | 45.8 |
|  | (Physical Property 4) Mw/Mn |  | 1.97 | 1.98 | 1.97 | 1.98 |
|  | (Physical Property 5) Modification Ratio | (%) | — | 82 | 62 | — |
|  | (Physical Property 6) Amount of Bound Styrene | (mass %) | 35 | 35 | 35 | 35 |
|  | (Physical Property 7) Amount of Bound Vinyl (Amount of 1,2-Vinyl Bond) | (mol %) | 40 | 40 | 40 | 40 |
|  | (Physical Property 8) Absolute Molecular Weight (Mw-i) | (10⁴ Daltons) | 128 | 135 | 184 | 138 |

|  |  |  |  | Example 1-21 | Example 1-22 | Example 1-23 |
|---|---|---|---|---|---|---|
|  | Branched Conjugated Diene-based Polymer (Sample No.) |  |  | 1-21 | 1-22 | 1-23 |
| Polymerization Conditions |  | Butadiene | (g/min) | 18.6 | 18.6 | 18.6 |
|  |  | Styrene | (g/min) | 10.0 | 10.0 | 10.0 |
|  |  | n-Hexane | (g/min) | 175.2 | 175.2 | 175.2 |
|  |  | Polymerization Temperature | (° C.) | 70 | 70 | 70 |
|  |  | n-Butyllithium for Treatment | (mmol/min) | 0.103 | 0.103 | 0.103 |
|  |  | n-Butyllithium as Polymerization Initiator | (mmol/min) | 0.143 | 0.143 | 0.143 |
|  |  | Amount of Polar Material Added | (mmol/min) | 0.081 | 0.081 | 0.081 |
|  | Branching Agent | Type |  | BS-5 | BS-5 | BS-1 |
|  |  | Amount Added | (mmol/min) | 0.0190 | 0.0190 | 0.0100 |
|  | Coupling Agent | Type |  | D | F | F |
|  |  | Amount Added | (mmol/min) | 0.0360 | 0.0160 | 0.0190 |
| Physical Property Values | Conjugated Diene-based Polymer | (Physical Property 4) Weight Average Molecular Weight | (10⁴ g/mol) | 63.9 | 63.9 | 55.9 |
|  |  | (Physical Property 4) Number Average Molecular Weight | (10⁴ g/mol) | 33.1 | 33.1 | 28.5 |
|  |  | (Physical Property 4) Mw/Mn |  | 1.93 | 1.93 | 1.96 |
|  |  | (Physical Property 1) Mooney Viscosity (110° C.) |  | 92.1 | 92.1 | 88.1 |
|  | Coupled Conjugated Diene-based Polymer | Type of Rubber Softener |  | SRAE | SRAE | SRAE |
|  |  | Amount of Rubber Softener Added | (phm) | 25.0 | 25.0 | 25.0 |
|  |  | (Physical Property 1) Mooney Viscosity (100° C.) |  | 99 | 101 | 102 |
|  |  | (Physical Property 2) Mooney Relaxation Rate (100° C.) |  | 0.252 | 0.248 | 0.247 |
|  |  | (Physical Property 3) Branch Number Bn | per molecule | 8.7 | 15.8 | 12.5 |
|  |  | (Physical Property 4) Weight Average Molecular Weight | (10⁴ g/mol) | 92.0 | 105.3 | 98.1 |
|  |  | (Physical Property 4) Number Average Molecular Weight | (10⁴ g/mol) | 46.7 | 53.4 | 50.6 |
|  |  | (Physical Property 4) Mw/Mn |  | 1.97 | 1.97 | 1.94 |
|  |  | (Physical Property 5) Modification Ratio | (%) | 88 | 86 | 92 |
|  |  | (Physical Property 6) Amount of Bound Styrene | (mass %) | 35 | 35 | 35 |
|  |  | (Physical Property 7) Amount of Bound Vinyl (Amount of 1,2-Vinyl Bond) | (mol %) | 40 | 40 | 40 |
|  |  | (Physical Property 8) Absolute Molecular Weight (Mw-i) | (10⁴ Daltons) | 144 | 186 | 245 |

TABLE 4

|  |  |  |  | Example 1-24 | Example 1-25 | Example 1-26 | Example 1-27 |
|---|---|---|---|---|---|---|---|
|  | Branched Conjugated Diene-based Polymer (Sample No.) |  |  | 1-24 | 1-25 | 1-26 | 1-27 |
| Polymerization Conditions |  | Butadiene | (g/min) | 18.6 | 18.6 | 18.6 | 18.6 |
|  |  | Styrene | (g/min) | 10.0 | 10.0 | 10.0 | 10.0 |
|  |  | n-Hexane | (g/min) | 175.2 | 175.2 | 175.2 | 175.2 |
|  |  | Polymerization Temperature | (° C.) | 70 | 70 | 70 | 70 |
|  |  | n-Butyllithium for Treatment | (mmol/min) | 0.103 | 0.103 | 0.103 | 0.103 |
|  |  | n-Butyllithium as Polymerization Initiator | (mmol/min) | 0.143 | 0.143 | 0.143 | 0.143 |

TABLE 4-continued

|  |  |  |  |  |  |  |  |
|---|---|---|---|---|---|---|---|
|  |  | Amount of Polar Material Added | (mmol/min) | 0.081 | 0.081 | 0.081 | 0.081 |
|  | Branching | Type |  | BS-1 | BS-1 | BS-1 | BS-1 |
|  | Agent | Amount Added | (mmol/min) | 0.0250 | 0.0350 | 0.0190 | 0.0190 |
|  | Coupling | Type |  | F | F | F | F |
|  | Agent | Amount Added | (mmol/min) | 0.0190 | 0.0190 | 0.0190 | 0.0190 |
| Physical | Conjugated | (Physical Property 4) Weight | ($10^4$ g/mol) | 78.8 | 89.3 | 63.9 | 63.9 |
| Property | Diene-based | Average Molecular Weight |  |  |  |  |  |
| Values | Polymer | (Physical Property 4) Number | ($10^4$ g/mol) | 40.1 | 45.1 | 33.1 | 33.1 |
|  |  | Average Molecular Weight |  |  |  |  |  |
|  |  | (Physical Property 4) Mw/Mn |  | 1.97 | 1.98 | 1.93 | 1.93 |
|  |  | (Physical Property 1) Mooney |  | 98.1 | 105.3 | 92.1 | 92.1 |
|  |  | Viscosity (110° C.) |  |  |  |  |  |
|  | Coupled | Type of Rubber Softener |  | SRAE | SRAE | Liquid | Resin |
|  | Conjugated |  |  |  |  | rubber |  |
|  | Diene-based | Amount of Rubber | (phm) | 25.0 | 25.0 | 25.0 | 25.0 |
|  | Polymer | Softener Added |  |  |  |  |  |
|  |  | (Physical Property 1) Mooney |  | 105 | 107 | 92 | 101 |
|  |  | Viscosity (100° C.) |  |  |  |  |  |
|  |  | (Physical Property 2) Mooney |  | 0.242 | 0.239 | 0.263 | 0.248 |
|  |  | Relaxation Rate (100° C.) |  |  |  |  |  |
|  |  | (Physical Property 3) Branch | per molecule | 25.3 | 30.1 | 15.8 | 15.8 |
|  |  | Number Bn |  |  |  |  |  |
|  |  | (Physical Property 4) Weight | ($10^4$ g/mol) | 117.0 | 125.0 | 105.3 | 105.3 |
|  |  | Average Molecular Weight |  |  |  |  |  |
|  |  | (Physical Property 4) Number | ($10^4$ g/mol) | 59.7 | 62.2 | 53.4 | 53.4 |
|  |  | Average Molecular Weight |  |  |  |  |  |
|  |  | (Physical Property 4) Mw/Mn |  | 1.96 | 2.01 | 1.97 | 1.97 |
|  |  | (Physical Property 5) | (%) | 75 | 68 | 86 | 86 |
|  |  | Modification Ratio |  |  |  |  |  |
|  |  | (Physical Property 6) | (mass %) | 35 | 35 | 35 | 35 |
|  |  | Amount of Bound Styrene |  |  |  |  |  |
|  |  | (Physical Property 7) | (mol %) | 40 | 40 | 40 | 40 |
|  |  | Amount of Bound Vinyl |  |  |  |  |  |
|  |  | (Amount of 1,2-Vinyl Bond) |  |  |  |  |  |
|  |  | (Physical Property 8) | ($10^4$ Daltons) | 320 | 360 | 186 | 186 |
|  |  | Absolute Molecular |  |  |  |  |  |
|  |  | Weight (Mw-i) |  |  |  |  |  |

|  |  |  |  | Example 1-28 | Example 1-29 | Example 1-30 |
|---|---|---|---|---|---|---|
|  | Branched Conjugated Diene-based Polymer (Sample No.) |  |  | 1-28 | 1-29 | 1-30 |
| Polymerization |  | Butadiene | (g/min) | 18.6 | 18.6 | 18.6 |
| Conditions |  | Styrene | (g/min) | 10.0 | 10.0 | 10.0 |
|  |  | n-Hexane | (g/min) | 175.2 | 175.2 | 175.2 |
|  |  | Polymerization Temperature | (° C.) | 70 | 70 | 70 |
|  |  | n-Butyllithium for Treatment | (mmol/min) | 0.103 | 0.103 | 0.103 |
|  |  | n-Butyllithium as Polymerization Initiator | (mmol/min) | 0.143 | 0.143 | 0.143 |
|  |  | Amount of Polar Material Added | (mmol/min) | 0.081 | 0.081 | 0.081 |
|  | Branching | Type |  | BS-1 | BS-1 | BS-1 |
|  | Agent | Amount Added | (mmol/min) | 0.0190 | 0.0190 | 0.0190 |
|  | Coupling | Type |  | F | F | F |
|  | Agent | Amount Added | (mmol/min) | 0.0190 | 0.0190 | 0.0190 |
| Physical | Conjugated | (Physical Property 4) Weight | ($10^4$ g/mol) | 63.9 | 63.9 | 63.9 |
| Property | Diene-based | Average Molecular Weight |  |  |  |  |
| Values | Polymer | (Physical Property 4) Number | ($10^4$ g/mol) | 33.1 | 33.1 | 33.1 |
|  |  | Average Molecular Weight |  |  |  |  |
|  |  | (Physical Property 4) Mw/Mn |  | 1.93 | 1.93 | 1.93 |
|  |  | (Physical Property 1) Mooney |  | 92.1 | 92.1 | 92.1 |
|  |  | Viscosity (110° C.) |  |  |  |  |
|  | Coupled | Type of Rubber Softener |  | Naphthenic | — | SRAE |
|  | Conjugated |  |  | oil |  |  |
|  | Diene-based | Amount of Rubber | (phm) | 25.0 | 0.0 | 37.5 |
|  | Polymer | Softener Added |  |  |  |  |
|  |  | (Physical Property 1) Mooney |  | 103 | 157 | 83 |
|  |  | Viscosity (100° C.) |  |  |  |  |
|  |  | (Physical Property 2) Mooney |  | 0.245 | 0.159 | 0.296 |
|  |  | Relaxation Rate (100° C.) |  |  |  |  |
|  |  | (Physical Property 3) Branch | per molecule | 15.8 | 15.8 | 15.8 |
|  |  | Number Bn |  |  |  |  |
|  |  | (Physical Property 4) Weight | ($10^4$ g/mol) | 105.3 | 105.3 | 105.3 |
|  |  | Average Molecular Weight |  |  |  |  |
|  |  | (Physical Property 4) Number | ($10^4$ g/mol) | 53.4 | 53.4 | 53.4 |
|  |  | Average Molecular Weight |  |  |  |  |
|  |  | (Physical Property 4) Mw/Mn |  | 1.97 | 1.97 | 1.97 |
|  |  | (Physical Property 5) | (%) | 86 | 86 | 86 |
|  |  | Modification Ratio |  |  |  |  |
|  |  | (Physical Property 6) | (mass %) | 35 | 35 | 35 |
|  |  | Amount of Bound Styrene |  |  |  |  |

TABLE 4-continued

| | | | | | |
|---|---|---|---|---|---|
| (Physical Property 7) Amount of Bound Vinyl (Amount of 1,2-Vinyl Bond) | (mol %) | 40 | 40 | 40 |
| (Physical Property 8) Absolute Molecular Weight (Mw-i) | ($10^4$ Daltons) | 186 | 186 | 186 |

TABLE 5

| | | | | Example 1-31 | Example 1-32 | Example 1-33 | Example 1-34 |
|---|---|---|---|---|---|---|---|
| | Branched Conjugated Diene-based Polymer (Sample No.) | | | 1-31 | 1-32 | 1-33 | 1-34 |
| Polymerization Conditions | | Butadiene | (g/min) | 18.6 | 18.6 | 18.6 | 18.6 |
| | | Styrene | (g/min) | 10.0 | 10.0 | 10.0 | 10.0 |
| | | n-Hexane | (g/min) | 175.2 | 175.2 | 175.2 | 175.2 |
| | | Polymerization Temperature | (° C.) | 70 | 70 | 70 | 70 |
| | | n-Butyllithium for Treatment | (mmol/min) | 0.103 | 0.103 | 0.103 | 0.103 |
| | | n-Butyllithium as Polymerization Initiator | (mmol/min) | 0.143 | 0.143 | 0.143 | 0.143 |
| | | Amount of Polar Material Added | (mmol/min) | 0.081 | 0.081 | 0.081 | 0.081 |
| | Branching Agent | Type | | BS-1 | BS-1 | BS-1 | BS-2 |
| | | Amount Added | (mmol/min) | 0.0190 | 0.0190 | 0.0190 | 0.0350 |
| | Coupling Agent | Type | | — | A | F | A |
| | | Amount Added | (mmol/min) | — | 0.0120 | 0.0038 | 0.0120 |
| Physical Property Values | Conjugated Diene-based Polymer | (Physical Property 4) Weight Average Molecular Weight | ($10^4$ g/mol) | 63.9 | 63.9 | 63.9 | 63.9 |
| | | (Physical Property 4) Number Average Molecular Weight | ($10^4$ g/mol) | 33.1 | 33.1 | 33.1 | 33.1 |
| | | (Physical Property 4) Mw/Mn | | 1.93 | 1.93 | 1.93 | 1.93 |
| | | (Physical Property 1) Mooney Viscosity (110° C.) | | 92.1 | 92.1 | 92.1 | 92.1 |
| | Coupled Conjugated Diene-based Polymer | Type of Rubber Softener | | SRAE | SRAE | SRAE | SRAE |
| | | Amount of Rubber Softener Added | (phm) | 25.0 | 25.0 | 25.0 | 25.0 |
| | | (Physical Property 1) Mooney Viscosity (100° C.) | | 52 | 65 | 74 | 53 |
| | | (Physical Property 2) Mooney Relaxation Rate (100° C.) | | 0.655 | 0.617 | 0.591 | 0.652 |
| | | (Physical Property 3) Branch Number Bn | per molecule | 1.7 | 4.6 | 7.1 | 2.7 |
| | | (Physical Property 4) Weight Average Molecular Weight | ($10^4$ g/mol) | 63.9 | 65.1 | 71.8 | 64.7 |
| | | (Physical Property 4) Number Average Molecular Weight | ($10^4$ g/mol) | 31.8 | 32.4 | 38.2 | 34.6 |
| | | (Physical Property 4) Mw/Mn | | 2.01 | 2.01 | 1.88 | 1.87 |
| | | (Physical Property 5) Modification Ratio | (%) | — | — | 24 | — |
| | | (Physical Property 6) Amount of Bound Styrene | (mass %) | 35 | 35 | 35 | 35 |
| | | (Physical Property 7) Amount of Bound Vinyl (Amount of 1,2-Vinyl Bond) | (mol %) | 40 | 40 | 40 | 40 |
| | | (Physical Property 8) Absolute Molecular Weight (Mw-i) | ($10^4$ Daltons) | 38 | 72 | 84 | 71 |

| | | | | Example 1-35 | Example 1-36 | Example 1-37 |
|---|---|---|---|---|---|---|
| | Branched Conjugated Diene-based Polymer (Sample No.) | | | 1-35 | 1-36 | 1-37 |
| Polymerization Conditions | | Butadiene | (g/min) | 18.6 | 18.6 | 1st reactor: 13.95 2nd reactor: 4.65 |
| | | Styrene | (g/min) | 10.0 | 10.0 | 10.0 |
| | | n-Hexane | (g/min) | 175.2 | 175.2 | 175.2 |
| | | Polymerization Temperature | (° C.) | 70 | 70 | 70 |
| | | n-Butyllithium for Treatment | (mmol/min) | 0.103 | 0.103 | 0.103 |
| | | n-Butyllithium as Polymerization Initiator | (mmol/min) | 0.143 | 0.143 | 0.143 |
| | | Amount of Polar Material Added | (mmol/min) | 0.081 | 0.081 | 0.081 |
| | Branching Agent | Type | | BS-3 | BS-1 | BS-1 |
| | | Amount Added | (mmol/min) | 0.0120 | 0.0190 | 0.0190 |
| | Coupling | Type | | A | G | A |

TABLE 5-continued

|  |  |  |  |  |  |  |
|---|---|---|---|---|---|---|
|  | Agent | Amount Added | (mmol/min) | 0.0120 | 0.0620 | 0.048 |
| Physical Property Values | Conjugated Diene-based Polymer | (Physical Property 4) Weight Average Molecular Weight | (10⁴ g/mol) | 63.9 | 63.9 | 63.9 |
|  |  | (Physical Property 4) Number Average Molecular Weight | (10⁴ g/mol) | 33.1 | 33.1 | 33.1 |
|  |  | (Physical Property 4) Mw/Mn |  | 1.93 | 1.93 | 1.93 |
|  |  | (Physical Property 1) Mooney Viscosity (110° C.) |  | 92.1 | 92.1 | 95.1 |
|  | Coupled Conjugated Diene-based Polymer | Type of Rubber Softener |  | SRAE | SRAE | SRAE |
|  |  | Amount of Rubber Softener Added | (phm) | 25.0 | 25.0 | 25.0 |
|  |  | (Physical Property 1) Mooney Viscosity (100° C.) |  | 60 | 91 | 91 |
|  |  | (Physical Property 2) Mooney Relaxation Rate (100° C.) |  | 0.632 | 0.264 | 0.260 |
|  |  | (Physical Property 3) Branch Number Bn | per molecule | 3.7 | 8.2 | 8.6 |
|  |  | (Physical Property 4) Weight Average Molecular Weight | (10⁴ g/mol) | 62.1 | 89.3 | 89.3 |
|  |  | (Physical Property 4) Number Average Molecular Weight | (10⁴ g/mol) | 33.0 | 45.6 | 45.2 |
|  |  | (Physical Property 4) Mw/Mn |  | 1.88 | 1.96 | 1.98 |
|  |  | (Physical Property 5) Modification Ratio | (%) | — | — | — |
|  |  | (Physical Property 6) Amount of Bound Styrene | (mass %) | 35 | 35 | 35 |
|  |  | (Physical Property 7) Amount of Bound Vinyl (Amount of 1,2-Vinyl Bond) | (mol %) | 40 | 40 | 40 |
|  |  | (Physical Property 8) Absolute Molecular Weight (Mw-i) | (10⁴ Daltons) | 68 | 132 | 140 |

TABLE 6

|  |  |  |  | Comparative Example 1-1 | Comparative Example 1-2 | Comparative Example 1-3 |
|---|---|---|---|---|---|---|
|  | Coupled Conjugated Diene-based Polymer (Sample No.) |  |  | 1-38 | 1-39 | 1-40 |
| Polymerization Conditions |  | Butadiene | (g/min) | 18.6 | 18.6 | 18.6 |
|  |  | Styrene | (g/min) | 10.0 | 10.0 | 10.0 |
|  |  | n-Hexane | (g/min) | 175.2 | 175.2 | 175.2 |
|  | Polymerization Temperature |  | (° C.) | 70 | 70 | 70 |
|  | n-Butyllithium for Treatment |  | (mmol/min) | 0.103 | 0.103 | 0.103 |
|  | n-Butyllithium as Polymerization Initiator |  | (mmol/min) | 0.143 | 0.143 | 0.143 |
|  | Amount of Polar Material Added |  | (mmol/min) | 0.081 | 0.081 | 0.081 |
|  | Branching Agent | Type |  | — | — | — |
|  |  | Amount Added | (mmol/min) | — | — | — |
|  | Coupling Agent | Type |  | A | D | F |
|  |  | Amount Added | (mmol/min) | 0.0480 | 0.0360 | 0.0190 |
| Physical Property Values | Conjugated Diene-based Polymer | (Physical Property 4) Weight Average Molecular Weight | (10⁴ g/mol) | 48.9 | 48.9 | 48.9 |
|  |  | (Physical Property 4) Number Average Molecular Weight | (10⁴ g/mol) | 27.9 | 27.9 | 27.9 |
|  |  | (Physical Property 4) Mw/Mn |  | 1.75 | 1.75 | 1.75 |
|  |  | (Physical Property 1) Mooney Viscosity (110° C.) |  | 72.5 | 72.5 | 72.5 |
|  | Coupled Conjugated Diene-based Polymer | Type of Rubber Softener |  | SRAE | SRAE | SRAE |
|  |  | Amount of Rubber Softener Added | (phm) | 25.0 | 25.0 | 25.0 |
|  |  | (Physical Property 1) Mooney Viscosity (100° C.) |  | 74 | 84 | 90 |
|  |  | (Physical Property 2) Mooney Relaxation Rate (100° C.) |  | 0.761 | 0.621 | 0.422 |
|  |  | (Physical Property 3) Branch Number Bn | per molecule | 1.1 | 2.9 | 5.9 |
|  |  | (Physical Property 4) Weight Average Molecular Weight | (10⁴ g/mol) | 73.4 | 82.1 | 97.3 |
|  |  | (Physical Property 4) Number Average Molecular Weight | (10⁴ g/mol) | 39.3 | 40.8 | 49.1 |
|  |  | (Physical Property 4) Mw/Mn |  | 1.87 | 2.01 | 1.98 |
|  |  | (Physical Property 5) Modification Ratio | (%) | — | 83 | 80 |
|  |  | (Physical Property 6) Amount of Bound Styrene | (mass %) | 35 | 35 | 35 |

TABLE 6-continued

|  |  |  | Comparative Example 1-1 | Comparative Example 1-2 | Comparative Example 1-3 |
|---|---|---|---|---|---|
|  | (Physical Property 7) Amount of Bound Vinyl (Amount of 1,2-Vinyl Bond) | (mol %) | 40 | 40 | 40 |
|  | (Physical Property 8) Absolute Molecular Weight (Mw-i) | ($10^4$ Daltons) | 84 | 96 | 142 |

TABLE 7

|  |  |  |  | Example A-1 | Example A-2 | Comparative Example B-1 | Comparative Example B-2 |
|---|---|---|---|---|---|---|---|
|  | Coupled Conjugated Diene-based Polymer (Sample No.) |  |  | A-1 | A-2 | B-1 | B-2 |
| Polymerization Conditions | Butadiene | (g/min) |  | 14.0 | 14.0 | 18.6 | 18.6 |
|  | Styrene | (g/min) |  | 10.0 | 8.0 | 10.0 | 10.0 |
|  | n-Hexane | (g/min) |  | 175.2 | 175.2 | 175.2 | 175.2 |
|  | Butadiene Added | (g/min) |  | 4.6 | 4.6 | — | — |
|  | Styrene Added | (g/min) |  | — | 2.0 | — | — |
|  | Polymerization Temperature | (° C.) |  | 70 | 70 | 70 | 70 |
|  | n-Butyllithium for Treatment | (mmol/min) |  | 0.103 | 0.103 | 0.103 | 0.103 |
|  | n-Butyllithium as Polymerization Initiator | (mmol/min) |  | 0.143 | 0.143 | 0.143 | 0.143 |
|  | Amount of Polar Material Added | (mmol/min) |  | 0.081 | 0.081 | 0.081 | 0.081 |
|  | Branching Agent | Type |  | BS-1 | BS-1 | BS-1 |  |
|  |  | Amount Added | (mmol/min) | 0.0190 | 0.0190 | 0.0190 |  |
|  | Coupling Agent | Type |  | D | D | A | Z-1 |
|  |  | Amount Added | (mmol/min) | 0.0360 | 0.0360 | 0.0480 | 0.0036 |
| Physical Property Values | Conjugated Diene-based Polymer | (Physical Property 4) Weight Average Molecular Weight | ($10^4$ g/mol) | 63.9 | 63.9 | 48.9 | 48.9 |
|  |  | (Physical Property 4) Number Average Molecular Weight | ($10^4$ g/mol) | 33.1 | 33.1 | 27.9 | 27.9 |
|  |  | (Physical Property 4) Mw/Mn |  | 1.93 | 1.93 | 1.75 | 1.75 |
|  |  | (Physical Property 1) Mooney Viscosity (110° C.) |  | 92.1 | 92.1 | 72.5 | 72.5 |
|  | Coupled Conjugated Diene-based Polymer | Type of Rubber Softener |  | SRAE | SRAE | SRAE | SRAE |
|  |  | Amount of Rubber Softener Added | (phm) | 25.0 | 25.0 | 25.0 | 25.0 |
|  |  | (Physical Property 1) Mooney Viscosity (100° C.) |  | 98 | 98 | 90 | 46 |
|  |  | (Physical Property 2) Mooney Relaxation Rate (100° C.) |  | 0.253 | 0.253 | 0.372 | 0.379 |
|  |  | (Physical Property 3) Branch Number Bn | per molecule | 8.7 | 8.7 | 7.1 | 10.2 |
|  |  | (Physical Property 4) Weight Average Molecular Weight | ($10^4$ g/mol) | 92.0 | 93.0 | 97.3 | 74.8 |
|  |  | (Physical Property 4) Number Average Molecular Weight | ($10^4$ g/mol) | 46.7 | 47.2 | 49.1 | 36.8 |
|  |  | (Physical Property 4) Mw/Mn |  | 1.97 | 1.97 | 1.98 | 2.03 |
|  |  | (Physical Property 5) Modification Ratio | (%) | 88 | 88 | 80 | — |
|  |  | (Physical Property 6) Amount of Bound Styrene | (mass %) | 35 | 35 | 35 | 35 |
|  |  | (Physical Property 7) Amount of Bound Vinyl (Amount of 1,2-Vinyl Bond) | (mol %) | 40 | 40 | 40 | 40 |
|  |  | (Physical Property 8) Absolute Molecular Weight (Mw-i) | ($10^4$ Daltons) | 144 | 145 | 86 | 96.2 |

Examples 1-38 to 1-74, Examples a-1 to a-2, Comparative Examples 1-4 to 1-6, and Comparative Examples b-1 to b-2

The samples 1-1 to 1-40 shown in Tables 1 to 6 and the samples (A-1 to A-2, and B-1 to B-2) shown in Table 7 were respectively used as raw material rubbers to obtain rubber compositions respectively containing the raw material rubbers in accordance with the following composition:

(Rubber Component)
Branched conjugated diene-based polymer or coupled conjugated diene-based polymer (each of the samples 1-1 to 1-40, A-1 to A-2 and B-1 to B-2): 80 parts by mass (excluding a rubber softener)
High cis-polybutadiene (trade name "UBEPOL BR150" manufactured by Ube Industries, Ltd.): 20 parts by mass (Blending Conditions)
The amount of each blending component to be added was indicated in parts by mass based on 100 parts by mass of the rubber component excluding a rubber softener.
Silica 1 (trade name "Ultrasil 7000GR", manufactured by Evonik Degussa, nitrogen adsorption specific surface area: 170 m²/g): 50.0 parts by mass Silica 2 (trade name "Zeosil Premium 200MP" manufactured by Rhodia, nitrogen adsorption specific surface area: 220 m²/g): 25.0 parts by mass Carbon black (trade name "Seast KH (N339)", manufactured by Tokai Carbon Co., Ltd.): 5.0 parts by mass Silane coupling agent: (trade name "Si75", manufactured by Evonik Degussa, bis(triethoxysilylpropyl)disulfide): 6.0 parts by mass SRAE oil (trade name "Process NC140", manufactured by JX Nippon Oil & Energy Corporation): 42.0 parts by mass (including an amount precedently added as the rubber softener contained in each of the samples 1-1 to 1-40, A-1 to A-2, and B-1 to B-2)

Zinc oxide: 2.5 parts by mass

Stearic acid: 1.0 part by mass

Anti-ageing agent (N-(1,3-dimethylbutyl)-N'-phenyl-p-phenylenediamine): 2.0 parts by mass Sulfur: 2.2 parts by mass Vulcanization accelerator 1 (N-cyclohexyl-2-benzothiazylsulfinamide): 1.7 parts by mass Vulcanization accelerator 2 (diphenylguanidine): 2.0 parts by mass Total: 239.4 parts by mass (Kneading Method)

The above-described materials were kneaded by the following method to obtain a rubber composition. A closed kneader (having an internal volume of 0.3 L) equipped with a temperature controller was used to knead, as a first stage of kneading, the raw material rubber (each of the samples 1-1 to 1-40, the samples A-1 to A-2, and the samples B-1 to B-2), the fillers (silica 1, silica 2 and carbon black), the silane coupling agent, the SRAE oil, zinc oxide and stearic acid under conditions of a filling ratio of 65% and a rotor rotation speed of 30 to 50 rpm. Here, the temperature of the closed kneader was controlled to obtain each rubber composition (compound) at a discharging temperature of 155 to 160° C.

Next, after cooling the compound obtained as described above to room temperature, as a second stage of the kneading, the anti-ageing agent was added thereto, and the resultant was kneaded again to improve dispersibility of the silica. Also in this case, the discharging temperature for the compound was adjusted to 155 to 160° C. by the temperature control of the kneader.

After cooling, as a third stage of the kneading, sulfur and the vulcanization accelerators 1 and 2 were added, and the resultant was kneaded by an open roll set to 70° C.

Thereafter, the resultant was molded and vulcanized at 160° C. for 20 minutes by a vulcanizing press. The rubber compositions prior to the vulcanization, and the rubber compositions after the vulcanization were evaluated. Specifically, the evaluations were performed as described below. Results are shown in Tables 8 to 14.

(Evaluation of Properties)

(Evaluation 1) Mooney Viscosity of Compound

Each compound obtained after the second stage of the kneading and before the third stage of the kneading was used as a sample to measure a viscosity by using a Mooney viscometer in accordance with ISO 289 after preheating the compound at 130° C. for 1 minute, and after rotating a rotor for 4 minutes at 2 rpm. The viscosity was shown as an index obtained assuming that a result of Comparative Example 1-4 was 100. A smaller index indicates better processability.

(Evaluation 2) Tensile Strength and Tensile Elongation

Tensile strength and tensile elongation were measured in accordance with a tensile test method according to JIS K6251, and were shown as indexes obtained assuming that results of Comparative Example 1-4 were 100. A larger index indicates better tensile strength and tensile elongation (fracture strength).

(Evaluation 3) Abrasion Resistance

An Acron abrasion tester (manufactured by Yasuda Seiki Seisakusho, Ltd.) was used to measure an abrasion amount through 1000 rotations at a load of 44.4 N in accordance with JIS K6264-2, and the abrasion amount was shown as an index obtained assuming that a result of Comparative Example 1-4 was 100. A larger index indicates better abrasion resistance.

(Evaluation 4) Viscoelasticity Parameter

A viscoelasticity testing machine "ARES" manufactured by Rheometric Scientific, Inc. was used to measure a viscoelasticity parameter in a torsion mode. Each measured value was shown as an index obtained assuming that a result obtained in the rubber composition of Comparative Example 1-4 was 100.

A tan δ measured at 0° C. at a frequency of 10 Hz and strain of 1% was used as an index of wet skid performance. A larger index indicates better wet skid performance.

Besides, a tan δ measured at 50° C. at a frequency of 10 Hz and strain of 3% was used as an index of fuel efficiency. A smaller index indicates higher fuel efficiency.

Besides, an elastic modulus (G') measured at 50° C. at a frequency of 10 Hz and strain of 3% was used as an index of steering stability. A larger index indicates better steering stability.

TABLE 8

| | | | Example 1-38 | Example 1-39 | Example 1-40 | Example 1-41 | Example 1-42 | Example 1-43 | Example 1-44 | Example 1-45 |
|---|---|---|---|---|---|---|---|---|---|---|
| | Branched Conjugated Diene-based Polymer (Sample No.) | | 1-1 | 1-2 | 1-3 | 1-4 | 1-5 | 1-6 | 1-7 | 1-8 |
| | (Physical Property 1) Mooney Viscosity of Polymer (100° C.) | | 91 | 98 | 99 | 98 | 98 | 97 | 95 | 99 |
| | (Evaluation 1) Mooney Viscosity of Compound (130° C.) | Index | 85 | 88 | 86 | 83 | 85 | 80 | 78 | 83 |
| Physical | (Evaluation 2) Tensile Strength | Index | 112 | 117 | 121 | 113 | 128 | 134 | 139 | 142 |
| Property | (Evaluation 2) Tensile Elongation | Index | 109 | 108 | 114 | 116 | 120 | 118 | 124 | 125 |
| Values | (Evaluation 3) Abrasion Resistance | Index | 110 | 113 | 128 | 125 | 130 | 142 | 148 | 152 |
| | (Evaluation 4) 50° C. Elastic Modulus (strain: 3%) | Index | 111 | 110 | 128 | 125 | 120 | 117 | 126 | 130 |
| | (Evaluation 4) 50° C. tanδ (strain: 3%) | Index | 97 | 96 | 86 | 80 | 75 | 71 | 72 | 69 |
| | (Evaluation 4) 0° C. tanδ (strain: 1%) | Index | 104 | 104 | 113 | 120 | 125 | 131 | 128 | 122 |

TABLE 9

| | | | Example 1-46 | Example 1-47 | Example 1-48 | Example 1-49 | Example 1-50 | Example 1-51 | Example 1-52 | Example 1-53 |
|---|---|---|---|---|---|---|---|---|---|---|
| | Branched Conjugated Diene-based Polymer (Sample No.) | | 1-9 | 1-10 | 1-11 | 1-12 | 1-13 | 1-14 | 1-15 | 1-16 |
| | (Physical Property 1) Mooney Viscosity of Polymer (100° C.) | | 93 | 89 | 93 | 94 | 97 | 94 | 96 | 82 |
| | (Evaluation 1) Mooney Viscosity of Compound (130° C.) | Index | 77 | 74 | 88 | 84 | 78 | 86 | 82 | 80 |
| Physical Property Values | (Evaluation 2) Tensile Strength | Index | 137 | 133 | 109 | 112 | 129 | 110 | 138 | 146 |
| | (Evaluation 2) Tensile Elongation | Index | 122 | 120 | 112 | 120 | 132 | 113 | 122 | 124 |
| | (Evaluation 3) Abrasion Resistance | Index | 144 | 137 | 118 | 122 | 143 | 128 | 157 | 162 |
| | (Evaluation 4) 50° C. Elastic Modulus (strain: 3%) | Index | 121 | 120 | 129 | 126 | 125 | 123 | 120 | 118 |
| | (Evaluation 4) 50° C. tanδ (strain: 3%) | Index | 75 | 78 | 92 | 83 | 75 | 91 | 77 | 74 |
| | (Evaluation 4) 0° C. tanδ (strain: 1%) | Index | 133 | 137 | 107 | 117 | 122 | 110 | 120 | 122 |

TABLE 10

| | | | Example 1-54 | Example 1-55 | Example 1-56 | Example 1-57 | Example 1-58 | Example 1-59 | Example 1-60 |
|---|---|---|---|---|---|---|---|---|---|
| | Branched Conjugated Diene-based Polymer (Sample No.) | | 1-17 | 1-18 | 1-19 | 1-20 | 1-21 | 1-22 | 1-23 |
| | (Physical Property 1) Mooney Viscosity of Polymer (100° C.) | | 95 | 97 | 99 | 97 | 99 | 101 | 102 |
| | (Evaluation 1) Mooney Viscosity of Compound (130° C.) | Index | 93 | 89 | 82 | 91 | 86 | 88 | 87 |
| Physical Property Values | (Evaluation 2) Tensile Strength | Index | 109 | 112 | 125 | 107 | 109 | 127 | 109 |
| | (Evaluation 2) Tensile Elongation | Index | 113 | 116 | 120 | 118 | 117 | 123 | 118 |
| | (Evaluation 3) Abrasion Resistance | Index | 113 | 123 | 137 | 120 | 126 | 137 | 131 |
| | (Evaluation 4) 50° C. Elastic Modulus (strain: 3%) | Index | 118 | 116 | 113 | 122 | 123 | 129 | 127 |
| | (Evaluation 4) 50° C. tanδ (strain: 3%) | Index | 93 | 88 | 76 | 92 | 82 | 78 | 83 |
| | (Evaluation 4) 0° C. tanδ (strain: 1%) | Index | 107 | 114 | 123 | 110 | 119 | 126 | 127 |

TABLE 11

| | | | Example 1-61 | Example 1-62 | Example 1-63 | Example 1-64 | Example 1-65 | Example 1-66 | Example 1-67 |
|---|---|---|---|---|---|---|---|---|---|
| | Branched Conjugated Diene-based Polymer (Sample No.) | | 1-24 | 1-25 | 1-26 | 1-27 | 1-28 | 1-29 | 1-30 |
| | (Physical Property 1) Mooney Viscosity of Polymer (100° C.) | | 105 | 107 | 92 | 101 | 103 | 157 | 83 |
| | (Evaluation 1) Mooney Viscosity of Compound (130° C.) | Index | 90 | 92 | 78 | 84 | 81 | 83 | 78 |
| Physical Property Values | (Evaluation 2) Tensile Strength | Index | 145 | 153 | 120 | 143 | 130 | 132 | 135 |
| | (Evaluation 2) Tensile Elongation | Index | 117 | 124 | 110 | 128 | 121 | 115 | 120 |
| | (Evaluation 3) Abrasion Resistance | Index | 152 | 157 | 132 | 141 | 137 | 145 | 140 |
| | (Evaluation 4) 50° C. Elastic Modulus (strain: 3%) | Index | 131 | 130 | 124 | 139 | 124 | 118 | 122 |
| | (Evaluation 4) 50° C. tanδ (strain: 3%) | Index | 85 | 87 | 78 | 88 | 82 | 73 | 71 |
| | (Evaluation 4) 0° C. tanδ (strain: 1%) | Index | 113 | 110 | 118 | 137 | 122 | 128 | 130 |

TABLE 12

| | | | Example 1-68 | Example 1-69 | Example 1-70 | Example 1-71 | Example 1-72 | Example 1-73 | Example 1-74 |
|---|---|---|---|---|---|---|---|---|---|
| | Branched Conjugated Diene-based Polymer (Sample No.) | | 1-31 | 1-32 | 1-33 | 1-34 | 1-35 | 1-36 | 1-37 |
| | (Physical Property 1) Mooney Viscosity of Polymer (100° C.) | | 52 | 65 | 74 | 53 | 60 | 100 | 91 |
| | (Evaluation 1) Mooney Viscosity of Compound (130° C.) | Index | 74 | 92 | 93 | 90 | 90 | 95 | 87 |

TABLE 12-continued

|  |  |  | Example 1-68 | Example 1-69 | Example 1-70 | Example 1-71 | Example 1-72 | Example 1-73 | Example 1-74 |
|---|---|---|---|---|---|---|---|---|---|
| Physical Property Values | (Evaluation 2) Tensile Strength | Index | 82 | 98 | 106 | 102 | 104 | 140 | 112 |
|  | (Evaluation 2) Tensile Elongation | Index | 89 | 99 | 103 | 100 | 102 | 130 | 109 |
|  | (Evaluation 3) Abrasion Resistance | Index | 71 | 102 | 103 | 106 | 103 | 140 | 114 |
|  | (Evaluation 4) 50° C. Elastic Modulus (strain: 3%) | Index | 97 | 101 | 100 | 102 | 102 | 116 | 111 |
|  | (Evaluation 4) 50° C. tanδ (strain: 3%) | Index | 102 | 103 | 104 | 98 | 95 | 90 | 97 |
|  | (Evaluation 4) 0° C. tanδ (strain: 1%) | Index | 100 | 102 | 103 | 92 | 92 | 114 | 104 |

TABLE 13

|  |  |  | Comparative Example 1-4 | Comparative Example 1-5 | Comparative Example 1-6 |
|---|---|---|---|---|---|
| Coupled Conjugated Diene-based Polymer (Sample No.) |  |  | 1-38 | 1-39 | 1-40 |
| (Physical Property 1) Mooney Viscosity of Polymer (100° C.) |  |  | 74 | 84 | 90 |
| (Evaluation 1) Mooney Viscosity of Compound (130° C.) |  | Index | 100 | 113 | 116 |
| Physical Property Values | (Evaluation 2) Tensile Strength | Index | 100 | 117 | 112 |
|  | (Evaluation 2) Tensile Elongation | Index | 100 | 102 | 98 |
|  | (Evaluation 3) Abrasion Resistance | Index | 100 | 109 | 103 |
|  | (Evaluation 4) 50° C. Elastic Modulus (strain: 3%) | Index | 100 | 98 | 98 |
|  | (Evaluation 4) 50° C. tanδ (strain: 3%) | Index | 100 | 112 | 124 |
|  | (Evaluation 4) 0° C. tanδ (strain: 1%) | Index | 100 | 107 | 112 |

TABLE 14

|  |  |  | Example a-1 | Example a-2 | Comparative Example b-1 | Comparative Example b-2 |
|---|---|---|---|---|---|---|
| Coupled Conjugated Diene-based Polymer (Sample No.) |  |  | A-1 | A-2 | B-1 | B-2 |
| (Physical Property 1) Mooney Viscosity of Polymer (100° C.) |  |  | 98 | 99 | 78 | 46 |
| (Evaluation 1) Mooney Viscosity of Compound (130° C.) |  | Index | 83 | 84 | 97 | 73 |
| Physical Property Values | (Evaluation 2) Tensile Strength | Index | 113 | 114 | 100 | 78 |
|  | (Evaluation 2) Tensile Elongation | Index | 116 | 117 | 98 | 87 |
|  | (Evaluation 3) Abrasion Resistance | Index | 125 | 126 | 105 | 82 |
|  | (Evaluation 4) 50° C. Elastic Modulus (strain: 3%) | Index | 130 | 129 | 100 | 107 |
|  | (Evaluation 4) 50° C. tanδ (strain: 3%) | Index | 75 | 76 | 98 | 109 |
|  | (Evaluation 4) 0° C. tanδ (strain: 1%) | Index | 125 | 126 | 99 | 102 |

As shown in Tables 8 to 13, it was confirmed that Examples 1-38 to 1-74 have, as compared with Comparative Examples 1-4 to 1-6, a low Mooney viscosity of the compound when used for obtaining a vulcanizate and exhibit good processability, are excellent in abrasion resistance, steering stability and fracture strength when in the form of a vulcanizate, and are excellent in balance between a low hysteresis loss property and wet skid resistance.

As shown in Table 14, it was confirmed that Examples a-1 and a-2 have, as compared with Comparative Examples b-1 and b-2, a low Mooney viscosity of the compound when used for obtaining a vulcanizate and exhibit good processability, are excellent in abrasion resistance, steering stability and fracture strength when in the form of a vulcanizate, and are excellent in balance between a low hysteresis loss property and wet skid resistance.

Second Example

The present embodiment will now be described in detail with reference to specific examples and comparative examples described as a second example, and it is noted that the present embodiment is not limited at all to the following examples and comparative examples.

In the following description, a conjugated diene-based polymer modified with a modifier is referred to as a "modified conjugated diene-based polymer", and a conjugated diene-based polymer coupled with a coupling agent is referred to as a "coupled conjugated diene-based polymer".

A conjugated diene-based polymer in an unmodified state is referred to as an "unmodified conjugated diene-based polymer". In tables, it is shown simply as "Conjugated Diene-based Polymer".

Besides, a conjugated diene-based polymer having a branch structure is referred to as a "branched conjugated diene-based polymer".

Various physical properties described in the examples and comparative examples were measured by the following methods.

(Physical Property 1) Mooney Viscosity of Polymer

A conjugated diene-based polymer prior to a modification reaction, a conjugated diene-based polymer modified with a modifier containing a silicon atom and a sulfur atom (modified conjugated diene-based polymer), or a conjugated diene-based polymer modified with a modifier containing a silicon atom and a sulfur atom, and further coupled with a coupling agent (coupled conjugated diene-based polymer) was used as a sample to measure a Mooney viscosity by using a Mooney viscometer (trade name "VR1132" manufactured by Ueshima Seisakusho Co., Ltd.) in accordance with ISO 289 with an L-type rotor used.

A measurement temperature was 110° C. when a conjugated diene-based polymer prior to a modification reaction was used as a sample, and was 100° C. when a conjugated diene-based polymer modified with a modifier containing a silicon atom and a sulfur atom, or a polymer modified with a modifier containing a silicon atom and a sulfur atom, and further coupled with a coupling agent was used as a sample.

First, the sample was preheated at the test temperature for 1 minute, a rotor was rotated at 2 rpm, a torque was measured 4 minutes after, and the thus measured value was determined as a Mooney viscosity ($ML_{(1+4)}$)

(Physical Property 2) Branch Number (Bn)

The branch number (Bn) of a conjugated diene-based polymer was measured by viscosity detector-equipped GPC-light scattering measurement as follows.

The modified conjugated diene-based polymer or the coupled conjugated diene-based polymer was used as a sample, and a gel permeation chromatography (GPC) measurement apparatus (trade name "GPCmax VE-2001" manufactured by Malvern Panalytical Ltd.) including a series of three columns using a polystyrene-based gel as a filler was used. The measurement was performed by using three detectors, that is, a light scattering detector, an RI detector, and a viscosity detector (trade name "TDA305" manufactured by Malvern Panalytical Ltd.) connected in the stated order. Based on standard polystyrene, an absolute molecular weight was obtained from results obtained by using the light scattering detector and the RI detector, and an intrinsic viscosity was obtained from results obtained by using the RI detector and the viscosity detector.

A straight-chain polymer was used under assumption of having an intrinsic viscosity [η] of $-3.883 \, M^{0.771}$, and a contracting factor (g') was calculated as a ratio in the intrinsic viscosity to each molecular weight. It is noted that M herein represents the absolute molecular weight.

Thereafter, the thus obtained contracting factor (g') was used to calculate a branch number (Bn) defined as g'=6 Bn/{(Bn+1)(Bn+2)}.

As an eluent, tetrahydrofuran (hereinafter also referred to as "THF") containing 5 mmol/L of triethylamine was used.

As the columns, a series of columns of trade names "TSKgel G4000HXL", "TSKgel G5000HXL" and "TSKgel G6000HXL" manufactured by Tosoh Corporation were connected and used.

Twenty (20) mg of a sample for the measurement was dissolved in 10 mL of THF to obtain a measurement solution, and 100 μL of the measurement solution was injected into the GPC measurement apparatus for performing the measurement under conditions of an oven temperature of 40° C. and a THF flow rate of 1 mL/min.

(Physical Property 3) Silicon Atom Content

Purification of Sample:

The modified conjugated diene-based polymer or the coupled conjugated diene-based polymer was used as a sample, and the sample was dissolved in toluene, and to the thus obtained solution of the sample in toluene, a poor solvent obtained by mixing ethanol and acetone in a volume ratio of 7:3 was added to precipitate the polymer, and thus, a rubber softener and a stabilizer contained in the sample were removed.

The thus collected polymer was dissolved in toluene again, and the poor solvent was added thereto to precipitate the polymer.

After repeating this operation 5 times, the resultant was dried for 5 hours by using a vacuum dryer adjusted to 40° C. to obtain a purified sample from which the rubber softener and the stabilizer contained in the sample had been completely removed (hereinafter referred to as the purified sample).

Decomposition of Sample:

After accurately weighing the purified sample, 5 mL of 96% sulfuric acid (for atomic absorption analysis) and 3 mL of 60% nitric acid (for atomic absorption analysis) were added thereto, and the purified sample was subjected to acidolysis by using a microwave decomposition apparatus (ETHOS-1, manufactured by Milestone General K.K.). After the acidolysis, the resultant was dissolved in pure water to be diluted to 50 mL to be used as a sample of ICP analysis.

Measurement of Amount of Silicon Atoms:

The sample adjusted as described above was used to measure an amount of silicon in the purified sample by using an inductively coupled plasma emission spectrometer (iCAP 7400 Duo, manufactured by Thermo Fisher Scientific)

A calibration curve was created by using a silicon standard solution for ICP (manufactured by Agilent Technologies Japan, Ltd.) to quantitatively determine the amount of silicon in the purified sample.

(Physical Property 4) Sulfur Atom Content

Purification of Sample:

The modified conjugated diene-based polymer or the coupled conjugated diene-based polymer was used as a sample, and the sample was dissolved in toluene, and to the thus obtained solution of the sample in toluene, a poor solvent obtained by mixing ethanol and acetone in a volume ratio of 7:3 was added to precipitate the polymer, and thus, a rubber softener and a stabilizer contained in the sample were removed.

The thus collected polymer was dissolved in toluene again, and the poor solvent was added thereto to precipitate the polymer.

After repeating this operation 5 times, the resultant was dried for 5 hours by using a vacuum dryer adjusted to 40° C. to obtain a purified sample from which the rubber softener and the stabilizer contained in the sample had been completely removed (hereinafter referred to as the purified sample).

Measurement of Amount of Sulfur Atoms:

A trace sulfur analyzer (TS-2100H, manufactured by Mitsubishi Chemical Analytech Co., Ltd.) was used to measure an amount of sulfur in the purified sample by an oxidative decomposition-ultraviolet fluorescence method. A calibration curve was created by using a solution of dibutyl disulfide in toluene to quantitatively determine an amount of sulfur in the purified sample.

(Physical Property 5) Molecular Weight

Measurement Conditions 1:

A conjugated diene-based polymer prior to modification, a modified conjugated diene-based polymer, or a coupled conjugated diene-based polymer used as a sample was measured for a chromatogram using a GPC measurement apparatus (trade name "HLC-8320GPC" manufactured by Tosoh Corporation) including a series of three columns using a polystyrene-based gel as a filler with an RI detector (trade name "HLC8020" manufactured by Tosoh Corporation) used, and on the basis of a calibration curve obtained using standard polystyrene, a weight average molecular weight (Mw), a number average molecular weight (Mn) and a molecular weight distribution (Mw/Mn) were obtained.

As an eluent, THF (tetrahydrofuran) containing 5 mmol/L of triethylamine was used. As the columns, trade name "TSKguardcolumn Super MP(HZ)-H" manufactured by Tosoh Corporation connected, as a guard column at a previous stage, to a series of three columns of trade name "TSKgel SuperMultipore HZ-H" manufactured by Tosoh Corporation were used.

Ten (10) mg of a sample for the measurement was dissolved in 10 mL of THF to obtain a measurement solution, and 10 μL of the measurement solution was injected into the GPC measurement apparatus for performing the measurement under conditions of an oven temperature of 40° C. and a THF flow rate of 0.35 mL/min.

With respect to a sample out of the various samples having been subjected to the measurement under the measurement conditions 1 and found to have a molecular weight distribution (Mw/Mn) value of less than 1.6, the measurement was performed again under the following measurement conditions 2.

With respect to a sample having been subjected to the measurement under the measurement conditions 1 and found to have a molecular weight distribution value of 1.6 or more, the measurement was performed under the measurement conditions 1.

Measurement Conditions 2:

The conjugated diene-based polymer prior to modification, the modified conjugated diene-based polymer or the coupled conjugated diene-based polymer used as a sample was measured for a chromatogram using a GPC measurement apparatus including a series of three columns using a polystyrene-based gel as a filler, and on the basis of a calibration curve obtained using standard polystyrene, a weight average molecular weight (Mw), and a number average molecular weight (Mn) were obtained.

As an eluent, THF containing 5 mmol/L of triethylamine was used. As the columns, a guard column of trade name "TSKguardcolumn Super H-H" manufactured by Tosoh Corporation, and columns of trade names "TSKgel SuperH5000", "TSKgel SuperH6000", and "TSKgel SuperH7000" manufactured by Tosoh Corporation were used.

An RI detector (trade name "HLC8020" manufactured by Tosoh Corporation) was used under conditions of an oven temperature of 40° C. and a THF flow rate of 0.6 mL/min. Ten (10) mg of a sample for the measurement was dissolved in 20 mL of THF to obtain a measurement solution, and 20 μL of the measurement solution was injected into the GPC measurement apparatus for performing the measurement.

With respect to a sample having been subjected to the measurement under the measurement conditions 1 and found to have a molecular weight distribution less than 1.6, the measurement was performed under the measurement conditions 2.

(Physical Property 6) Amount of Bound Styrene

One hundred (100) mg of a modified conjugated diene-based polymer not containing a rubber softener, or a coupled conjugated diene-based polymer used as a sample was dissolved in chloroform to be diluted to 100 mL, and the resultant was used as a measurement sample.

Based on the amount of absorption of a phenyl group of styrene at a UV absorption wavelength (about 254 nm), the amount of bound styrene (% by mass) based on 100% by mass of the sample of the modified conjugated diene-based polymer or the coupled conjugated diene-based polymer was measured (measurement apparatus: spectrophotometer "UV-2450" manufactured by Shimadzu Corporation).

(Physical Property 7) Microstructure of Butadiene Portion (Amount of 1,2-Vinyl Bond)

Fifty (50) mg of a modified conjugated diene-based polymer not containing a rubber softener, or a coupled conjugated diene-based polymer used as a sample was dissolved in 10 mL of carbon disulfide, and the resultant was used as a measurement sample.

A solution cell was used to measure an infrared spectrum in a range of 600 to 1000 cm-1, and in accordance with a calculation formula of the Hampton method (R. R. Hampton, Analytical Chemistry 21, 923 (1949)) based on absorbance at a prescribed wavelength, a microstructure of a butadiene portion, namely, an amount of 1,2-vinyl bond (mol %), was obtained (measurement apparatus: Fourier transform infrared spectrophotometer "FT-IR230" manufactured by JASCO Corporation).

Branched Conjugated Diene-Based Polymer (Example 2-1) Modified Conjugated Diene-Based Polymer (Sample 2-1)

Two tank pressure vessels, each of which was a stirrer-equipped tank reactor having an internal volume of 10 L and a ratio (L/D) of an internal height (L) and a diameter (D) of 4.0, having an inlet at a bottom and an outlet at a top, and equipped with a stirrer and a temperature controlling jacket, were connected to each other as polymerization reactors.

1,3-Butadiene, from which a water content had been precedently removed, styrene and n-hexane were mixed under conditions of 18.6 g/min, 10.0 g/min and 175.2 g/min, respectively to obtain a mixed solution. In a static mixer provided in the middle of a pipe for supplying the mixed solution to the inlet of the reactor, n-butyllithium to be used for residual impurity inactivation was added and mixed in an amount of 0.103 mmol/min, and the resultant was continuously supplied to the bottom of the reactor. Besides, 2,2-bis (2-oxolanyl)propane used as a polar material and n-butyl-lithium used as a polymerization initiator were supplied, at rates of respectively 0.081 mmol/min and 0.143 mmol/min, to the bottom of the first reactor in which materials were vigorously mixed by the stirrer, and the internal temperature of the reactor was kept at 67° C.

The thus obtained polymer solution was continuously taken out from the top of the first reactor to be continuously supplied to the bottom of the second reactor for continuing the reaction at 70° C., and the resultant was further supplied to a static mixer from the top of the second reactor. When the polymerization was sufficiently stabilized, trimethoxy(4- vinylphenyl)silane (shown as "BS-1" in the table) used as a branching agent was added at a rate of 0.0190 mmol/min from the bottom of the second reactor. When the polymerization reaction and the branching reaction were stabilized, a small amount of a conjugated diene-based polymer solution prior to addition of a modifier was taken out, an antioxidant (BHT) was added thereto in an amount of 0.2 g per 100 g of the polymer, then the solvent was removed, and a Mooney viscosity at 110° C. and various molecular weights were measured. The physical properties are shown in Table 15.

Next, to the polymer solution flowing out of the outlet of the reactor, S-trimethylsilylmercaptopropyltrimethoxysilane (shown as "T-1" in the table) was added, as a modifier, continuously at a rate of 0.073 mmol/min, and the resultant was mixed by using a static mixer for performing a modification reaction. Here, a time until the addition of the modifier to the polymer solution flowing out of the outlet of the reactor was 4.8 min, the temperature was 68° C., and a difference between the temperature in the polymerizing step and the temperature until the addition of the modifier was 2° C. To the polymer solution resulting from the modification reaction, an antioxidant (BHT) was added in an amount of 0.2 g per 100 g of the polymer continuously at 0.055 g/min (n-hexane solution) to complete the modification reaction. Simultaneously with the antioxidant, SRAE oil (JOMO Process NC 140, manufactured by JX Nippon Oil & Energy Corporation) was continuously added, as a rubber softener, in an amount of 25.0 g per 100 g of the polymer, and the resultant was mixed by using a static mixer. The solvent was removed by steam stripping, and thus, a modified conjugated diene-based polymer (sample 2-1) was obtained. Physical properties of the sample 2-1 are shown in Table 15.

(Example 2-2) Modified Conjugated Diene-Based Polymer (Sample 2-2)

A modified conjugated diene-based polymer (Sample 2-2) was obtained in the same manner as in Example 2-1 except that the modifier was changed from S-trimethylsilylmercaptopropyltrimethoxysilane to S-trimethylsilylmercaptopropylmethyldimethoxysilane (shown as "T-2" in the table) and that the amount thereof to be added was changed to 0.145 mmol/min. Physical properties of the sample 2-2 are shown in Table 15.

(Example 2-3) Coupled Conjugated Diene-Based Polymer (Sample 2-3)

At a stage previous to the addition of the modifier, tin tetrachloride was continuously added, as a coupling agent, at a rate of 0.011 mmol/min, and the resultant was mixed by using a static mixer for performing a coupling reaction.

Thereafter, a coupled conjugated diene-based polymer (sample 2-3) was obtained in the same manner as in Example 2-1 except that S-trimethylsilylmercaptopropyltrimethoxysilane (shown as "T-1" in the table) was continuously added as a modifier at a rate of 0.045 mmol/min, and that the resultant was mixed by using the static mixer provided at the latter stage for performing a modification reaction. Physical properties of the sample 2-3 are shown in Table 15.

(Example 2-4) Coupled Conjugated Diene-Based Polymer (Sample 2-4)

At a stage previous to the addition of the modifier, tin tetrachloride was continuously added as a coupling agent at a rate of 0.011 mmol/min, and the resultant was mixed by using a static mixer for performing a coupling reaction.

Thereafter, a coupled conjugated diene-based polymer (sample 2-4) was obtained in the same manner as in Example 2-1 except that the modifier was changed from S-trimethylsilylmercaptopropyltrimethoxysilane to S-trimethylsilylmercaptopropylmethyldimethoxysilane (shown as "T-2" in the table) to be continuously added in an amount to be added of 0.099 mmol/min, and that the resultant was mixed by using the static mixer provided at the latter stage for performing a modification reaction. Physical properties of the sample 2-4 are shown in Table 15.

(Example 2-5) Modified Conjugated Diene-Based Polymer (Sample 2-5)

The rate of adding 1,3-butadiene was changed from 18.6 g/min to 24.3 g/min, the rate of adding styrene was changed from 10.0 g/min to 4.3 g/min, the amount of 2,2-bis(2-oxolanyl)propane to be added as the polar material was changed from 0.081 mmol/min to 0.022 mmol/min, and a temperature of the second reactor was set to 80° C. Here, a difference between the temperature in the polymerizing step and the temperature until the addition of the modifier was 3° C., and the temperature at which the modifier was added was 77° C. In the same manner as in Example 2-1 except for these, a modified conjugated diene-based polymer (sample 2-5) was obtained. Physical properties of the sample 2-5 are shown in Table 15.

(Example 2-6) Modified Conjugated Diene-Based Polymer (Sample 2-6)

The rate of adding 1,3-butadiene was changed from 18.6 g/min to 17.2 g/min, the rate of adding styrene was changed from 10.0 g/min to 11.4 g/min, the amount of 2,2-bis(2-oxolanyl)propane to be added as the polar material was changed from 0.081 mmol/min to 0.283 mmol/min, and a temperature of the second reactor was set to 65° C. Here, a difference between the temperature in the polymerizing step and the temperature until the addition of the modifier was 2° C., and the temperature at which the modifier was added was 63° C. In the same manner as in Example 2-1 except for these, a modified conjugated diene-based polymer (sample 2-6) was obtained. Physical properties of the sample 2-6 are shown in Table 15.

(Example 2-7) Modified Conjugated Diene-Based Polymer (Sample 2-7)

A modified conjugated diene-based polymer (sample 2-7) was obtained in the same manner as in Example 2-1 except that the amount of n-butyllithium to be added as the polymerization initiator was changed from 0.143 mmol/min to 0.101 mmol/min, and that the amount of 2,2-bis(2-oxolanyl) propane to be added as the polar material was changed from 0.081 mmol/min to 0.059 mmol/min. Physical properties of the sample 2-7 are shown in Table 15.

(Example 2-8) Modified Conjugated Diene-Based Polymer (Sample 2-8)

A modified conjugated diene-based polymer (sample 2-8) was obtained in the same manner as in Example 2-1 except that the amount of n-butyllithium to be added as the polymerization initiator was changed from 0.143 mmol/min to 0.152 mmol/min, and that the amount of 2,2-bis(2-oxolanyl)

propane to be added as the polar material was changed from 0.081 mmol/min to 0.086 mmol/min. Physical properties of the sample 2-8 are shown in Table 15.

(Example 2-9) Modified Conjugated Diene-Based Polymer (Sample 2-9)

A modified conjugated diene-based polymer (sample 2-9) was obtained in the same manner as in Example 2-1 except that the branching agent was changed from trimethoxy(4-vinylphenyl)silane to dimethylmethoxy(4-vinylphenyl)silane (shown as "BS-2" in the table), and that the amount thereof to be added was changed to 0.0383 mmol/min. Physical properties of the sample 2-9 are shown in Table 15.

(Example 2-10) Modified Conjugated Diene-Based Polymer (Sample 2-10)

A modified conjugated diene-based polymer (sample 2-10) was obtained in the same manner as in Example 2-1 except that the branching agent was changed from trimethoxy(4-vinylphenyl)silane to dimethylmethoxy(4-vinylphenyl)silane (shown as "BS-2" in the table), that the amount thereof to be added was changed to 0.0383 mmol/min, that the modifier was changed from S-trimethylsilylmercaptopropyltrimethoxysilane to S-trimethylsilylmercaptopropylmethyldimethoxysilane (shown as "T-2" in the table), and that the amount thereof to be added was changed to 0.145 mmol/min. Physical properties of the sample 2-10 are shown in Table 15.

(Example 2-11) Modified Conjugated Diene-Based Polymer (Sample 2-11)

A modified conjugated diene-based polymer (sample 2-11) was obtained in the same manner as in Example 2-1 except that the branching agent was changed from trimethoxy(4-vinylphenyl)silane to 1,1-bis(4-(dimethylmethoxysilyl)phenyl)ethylene (shown as "BS-3" in the table), and that the amount thereof to be added was changed to 0.0255 mmol/min. Physical properties of the sample 2-11 are shown in Table 16.

(Example 2-12) Modified Conjugated Diene-Based Polymer (Sample 2-12)

A modified conjugated diene-based polymer (sample 2-12) was obtained in the same manner as in Example 2-1 except that the branching agent was changed from trimethoxy(4-vinylphenyl)silane to 1,1-bis(4-(dimethylmethoxysilyl)phenyl)ethylene (shown as "BS-3" in the table), that the amount thereof to be added was changed to 0.0255 mmol/min, that the modifier was changed from S-trimethylsilylmercaptopropyltrimethoxysilane to S-trimethylsilylmercaptopropylmethyldimethoxysilane (shown as "T-2" in the table), and that the amount thereof to be added was changed to 0.145 mmol/min. Physical properties of the sample 2-12 are shown in Table 16.

(Example 2-13) Modified Conjugated Diene-Based Polymer (Sample 2-13)

A modified conjugated diene-based polymer (sample 2-13) was obtained in the same manner as in Example 2-1 except that the branching agent was changed from trimethoxy(4-vinylphenyl)silane to 1,1-bis(4-trimethoxysilylphenyl)ethylene (shown as "BS-4" in the table), and that the amount thereof to be added was changed to 0.0109 mmol/min. Physical properties of the sample 2-13 are shown in Table 16.

(Example 2-14) Modified Conjugated Diene-Based Polymer (Sample 2-14)

A modified conjugated diene-based polymer (sample 2-14) was obtained in the same manner as in Example 2-1 except that the branching agent was changed from trimethoxy(4-vinylphenyl)silane to 1,1-bis(4-trimethoxysilylphenyl)ethylene (shown as "BS-4" in the table), that the amount thereof to be added was changed to 0.0109 mmol/min, that the modifier was changed from S-trimethylsilylmercaptopropyltrimethoxysilane to S-trimethylsilylmercaptopropylmethyldimethoxysilane (shown as "T-2" in the table), and that the amount thereof to be added was changed to 0.145 mmol/min. Physical properties of the sample 2-14 are shown in Table 16.

(Example 2-15) Modified Conjugated Diene-Based Polymer (Sample 2-15)

A modified conjugated diene-based polymer (sample 2-15) was obtained in the same manner as in Example 2-1 except that the branching agent was changed from trimethoxy(4-vinylphenyl)silane to trichloro(4-vinylphenyl)silane (shown as "BS-5" in the table). Physical properties of the sample 2-15 are shown in Table 16.

(Example 2-16) Modified Conjugated Diene-Based Polymer (Sample 2-16)

A modified conjugated diene-based polymer (sample 2-16) was obtained in the same manner as in Example 2-1 except that the branching agent was changed from trimethoxy(4-vinylphenyl)silane to trichloro(4-vinylphenyl)silane (shown as "BS-5" in the table), that the modifier was changed from S-trimethylsilylmercaptopropyltrimethoxysilane to S-trimethylsilylmercaptopropylmethyldimethoxysilane (shown as "T-2" in the table), and that the amount thereof to be added was changed to 0.145 mmol/min. Physical properties of the sample 2-16 are shown in Table 16.

(Example 2-17) Modified Conjugated Diene-Based Polymer (Sample 2-17)

A modified conjugated diene-based polymer (sample 2-17) was obtained in the same manner as in Example 2-1 except that SRAE oil used as the rubber softener was not added. Physical properties of the sample 2-17 are shown in Table 16.

(Example 2-18) Modified Conjugated Diene-Based Polymer (Sample 2-18)

A modified conjugated diene-based polymer (sample 2-18) was obtained in the same manner as in Example 2-1 except that the amount of SRAE oil to be added as the rubber softener was changed from 25.0 g to 37.5 g per 100 g of the polymer. Physical properties of the sample 2-18 are shown in Table 16.

(Example 2-19) Modified Conjugated Diene-Based Polymer (Sample 2-19)

A modified conjugated diene-based polymer (sample 2-19) was obtained in the same manner as in Example 2-1 except that SRAE oil to be added as the rubber softener was changed to naphthene oil (Naphthene Oil Nytex 810, manufactured by Nynas). Physical properties of the sample 2-19 are shown in Table 16.

(Example 2-20) Modified Conjugated Diene-Based Polymer (Sample 2-20)

A modified conjugated diene-based polymer (sample 2-20) was obtained in the same manner as in Example 2-1 except that SRAE oil to be added as the rubber softener was changed to a liquid rubber (liquid polybutadiene LBR-302, manufactured by Kuraray Co., Ltd.). Physical properties of the sample 2-20 are shown in Table 16.

(Example 2-21) Modified Conjugated Diene-Based Polymer (Sample 2-21)

A modified conjugated diene-based polymer (sample 2-21) was obtained in the same manner as in Example 2-1 except that SRAE oil to be added as the rubber softener was changed to a resin (terpene resin YS Resin PX1250, manufactured by Yasuhara Chemical Co., Ltd.). Physical properties of the sample 2-21 are shown in Table 16.

(Example 2-22) Coupled Conjugated Diene-Based Polymer (Sample 2-22)

A tank pressure vessel, that is, a stirrer-equipped tank reactor having an internal volume of 10 L and a ratio (L/D) of an internal height (L) and a diameter (D) of 4.0, and equipped with a stirrer and a temperature controlling jacket was used as a polymerization reactor, and the reactor was charged with 5000 g of n-hexane and n-butyllithium for neutralizing an impurity that was present in the reactor and could inhibit a polymerization reaction. The resultant was stirred at 70° C. for 5 minutes, and cooled to room temperature, and then the resultant solution was taken out to evacuate the reactor.

Next, the reactor was charged with 5022 g of n-hexane, 286.2 g of styrene, 478.3 g of 1,3-butadiene, 1.83 mmol of 2,2-bis(2-oxolanyl)propane used as a polar material, and 0.546 mmol of trimethoxy(4-vinylphenyl)silane (shown as "BS-1" in the table) used as a branching agent, from which impurities had been precedently removed, and the temperature within the reactor was controlled to 40° C. After the internal temperature of the reactor was stabilized, 4.402 mmol of n-butyllithium was added as a polymerization initiator to start polymerization.

Immediately after starting the polymerization, the temperature within the reactor increased, and reached a peak temperature, which was 76° C. Immediately after reaching the peak temperature, 53.1 g of 1,3-butadiene was added thereto, followed by stirring for 5 minutes. Thereafter, a small amount of the thus obtained polymer solution was sampled, an antioxidant (BHT) was added thereto in an amount of 0.2 g per 100 g of the polymer, then the solvent was removed by vacuum drying, and a Mooney viscosity at 110° C. and various molecular weights were measured. The physical properties are shown in Table 18.

Next, 0.314 mmol of tin tetrachloride was added thereto as a coupling agent, followed by stirring for 5 minutes. Then, 1.286 mmol of S-trimethylsilylmercaptopropyltrimethoxysilane (shown as "T-1" in the table) was added thereto as a modifier, followed by stirring for 5 minutes.

The reaction was stopped by adding 0.15 mmol of ethanol as a polymerization terminator, and thus, a conjugated diene-based polymer was obtained.

To the thus obtained polymer solution, an antioxidant (BHT) was added in an amount of 0.2 g per 100 g of the polymer, then the solvent was removed by steam stripping, and thus, a coupled conjugated diene-based polymer (sample 2-22) was obtained. Physical properties of the sample 2-22 are shown in Table 18.

(Example 2-23) Coupled Conjugated Diene-Based Polymer (Sample 2-23)

A coupled conjugated diene-based polymer (sample 2-23) was obtained in the same manner as in Example 2-22 except that the modifier was changed from S-trimethylsilylmercaptopropyltrimethoxysilane (shown as "T-1" in the table) to S-trimethylsilylmercaptopropylmethyldimethoxysilane (shown as "T-2" in the table), and that the amount thereof to be added was changed to 2.572 mmol/min. Physical properties of the sample 2-23 are shown in Table 18.

Coupled or Modified Conjugated Diene-Based Polymer (Comparative Example 2-1) Modified Conjugated Diene-Based Polymer (Sample 2-24)

Two tank pressure vessels, each of which was a stirrer-equipped tank reactor having an internal volume of 10 L and a ratio (L/D) of an internal height (L) and a diameter (D) of 4.0, having an inlet at a bottom and an outlet at a top, and equipped with a stirrer and a temperature controlling jacket, were connected to each other as polymerization reactors.

1,3-Butadiene, from which a water content had been precedently removed, styrene and n-hexane were mixed under conditions of 18.6 g/min, 10.0 g/min and 175.2 g/min, respectively. In a static mixer provided in the middle of a pipe for supplying the thus obtained mixed solution to the inlet of the reactor, n-butyllithium to be used for residual impurity inactivation was added and mixed in an amount of 0.103 mmol/min, and the resultant was continuously supplied to the bottom of the reactor. Besides, 2,2-bis(2-oxolanyl)propane used as a polar material and n-butyllithium used as a polymerization initiator were supplied, at rates of respectively 0.081 mmol/min and 0.143 mmol/min, to the bottom of the first reactor in which materials were vigorously mixed by the stirrer, and the internal temperature of the reactor was kept at 67° C.

The thus obtained polymer solution was continuously taken out from the top of the first reactor to be continuously supplied to the bottom of the second reactor for continuing the reaction at 70° C., and the resultant was further supplied to a static mixer from the top of the second reactor. When the polymerization reaction was stabilized, a small amount of a conjugated diene-based polymer solution prior to addition of a modifier was taken out, an antioxidant (BHT) was added thereto in an amount of 0.2 g per 100 g of the polymer, then the solvent was removed, and a Mooney viscosity at 110° C. and various molecular weights were measured. The physical properties are shown in Table 17.

Next, to the polymer solution flowing out of the outlet of the reactor, S-trimethylsilylmercaptopropyltrimethoxysilane (shown as "T-1" in the table) was added, as a modifier, continuously at a rate of 0.073 mmol/min, and the resultant was mixed by using a static mixer for performing a modification reaction. Here, a time until the addition of the modifier to the polymer solution flowing out of the outlet of the reactor was 4.8 min, the temperature was 68° C., and a difference between the temperature in the polymerizing step and the temperature until the addition of the modifier was 2° C. To the polymer solution resulting from the modification reaction, an antioxidant (BHT) was added in an amount of 0.2 g per 100 g of the polymer continuously at 0.055 g/min (n-hexane solution) to complete the modification reaction. Simultaneously with the antioxidant, SRAE oil (JOMO Process NC 140, manufactured by JX Nippon Oil & Energy Corporation) was continuously added as a rubber softener in an amount of 25.0 g per 100 g of the polymer, and the resultant was mixed by using a static mixer. The solvent was removed by steam stripping, and thus, a modified conjugated diene-based polymer (sample 2-24) was obtained. Physical properties of the sample 2-24 are shown in Table 17.

(Comparative Example 2-2) Modified Conjugated Diene-Based Polymer (Sample 2-25)

A modified conjugated diene-based polymer (Sample 2-25) was obtained in the same manner as in Comparative Example 2-1 except that the modifier was changed from S-trimethylsilylmercaptopropyltrimethoxysilane to S-trimethylsilylmercaptopropylmethyldimethoxysilane (shown as "T-2" in the table) and that the amount thereof to be added was changed to 0.145 mmol/min. Physical properties of the sample 2-25 are shown in Table 17.

(Comparative Example 2-3) Coupled Conjugated Diene-Based Polymer (Sample 2-26)

At a stage previous to the addition of the modifier, tin tetrachloride was continuously added, as a coupling agent, at a rate of 0.011 mmol/min, and the resultant was mixed by using a static mixer for performing a coupling reaction. Thereafter, a coupled conjugated diene-based polymer (sample 2-26) was obtained in the same manner as in Comparative Example 2-1 except that S-trimethylsilylmercaptopropyltrimethoxysilane (shown as "T-1" in the table) was continuously added as a modifier at a rate of 0.045 mmol/min, and that the resultant was mixed by using the static mixer provided at the latter stage for performing a modification reaction. Physical properties of the sample 2-26 are shown in Table 17.

(Comparative Example 2-4) Coupled Conjugated Diene-Based Polymer (Sample 2-27)

At a stage previous to the addition of the modifier, tin tetrachloride was continuously added as a coupling agent at a rate of 0.011 mmol/min, and the resultant was mixed by using a static mixer for performing a coupling reaction. Thereafter, a coupled conjugated diene-based polymer (sample 2-27) was obtained in the same manner as in Comparative Example 2-1 except that the modifier was changed from S-trimethylsilylmercaptopropyltrimethoxysilane to S-trimethylsilylmercaptopropylmethyldimethoxysilane (shown as "T-2" in the table) to be continuously added in an amount to be added of 0.099 mmol/min, and that the resultant was mixed by using the static mixer provided at the latter stage for performing a modification reaction. Physical properties of the sample 2-27 are shown in Table 17.

(Comparative Example 2-5) Conjugated Diene-Based Polymer (Sample 2-28)

A tank pressure vessel, that is, a stirrer-equipped tank reactor having an internal volume of 10 L and a ratio (L/D) of an internal height (L) and a diameter (D) of 4.0, and equipped with a stirrer and a temperature controlling jacket was used as a polymerization reactor, and the reactor was charged with 5000 g of n-hexane and n-butyllithium for neutralizing an impurity that was present in the reactor and could inhibit a polymerization reaction. The resultant was stirred at 70° C. for 5 minutes, and cooled to room temperature, and then the resultant solution was taken out to evacuate the reactor.

Next, the reactor was charged with 5022 g of n-hexane, 286.2 g of styrene, 478.3 g of 1,3-butadiene, and 1.83 mmol of 2,2-bis(2-oxolanyl)propane used as a polar material, from which impurities had been precedently removed, and the temperature within the reactor was controlled to 40° C. After the internal temperature of the reactor was stabilized, 4.402 mmol of n-butyllithium was added as a polymerization initiator to start polymerization.

Immediately after starting the polymerization, the temperature within the reactor increased, and reached a peak temperature, which was 76° C. Immediately after reaching the peak temperature, 53.1 g of 1,3-butadiene was added thereto, followed by stirring for 5 minutes. Thereafter, a small amount of the thus obtained polymer solution was sampled, an antioxidant (BHT) was added thereto in an amount of 0.2 g per 100 g of the polymer, then the solvent was removed by vacuum drying, and a Mooney viscosity at 110° C. and various molecular weights were measured. The physical properties are shown in Table 18.

Next, 0.314 mmol of tin tetrachloride was added thereto as a coupling agent, followed by stirring for 5 minutes. Then, 1.286 mmol of S-trimethylsilylmercaptopropyltrimethoxysilane was added thereto as a modifier, followed by stirring for 5 minutes.

The reaction was stopped by adding 0.15 mmol of ethanol as a polymerization terminator, and thus, a conjugated diene-based polymer was obtained.

To the thus obtained polymer solution, an antioxidant (BHT) was added in an amount of 0.2 g per 100 g of the polymer, then the solvent was removed by steam stripping, and thus, a conjugated diene-based polymer (sample 2-28) was obtained. Physical properties of the sample 2-28 are shown in Table 18.

(Comparative Example 2-6) Conjugated Diene-Based Polymer (Sample 2-29)

A conjugated diene-based polymer (sample 2-29) was obtained in the same manner as in Comparative Example 2-5 except that the modifier was changed from S-trimethylsilylmercaptopropyltrimethoxysilane (shown as "T-1" in the table) to S-trimethylsilylmercaptopropylmethyldimethoxysilane (shown as "T-2" in the table), and that the amount thereof to be added was changed to 2.572 mmol. Physical properties of the sample 2-29 are shown in Table 18.

Examples 2-24 to 2-46 and Comparative Examples 2-7 to 2-12

The samples 2-1 to 2-29 shown in Tables 15 to 18 were respectively used as raw material rubbers to obtain rubber compositions respectively containing the raw material rubbers in accordance with the following composition:
(Rubber Component)
Conjugated diene-based polymer (each of the samples 2-1 to 2-29): 80 parts by mass (excluding a rubber softener)

High cis-polybutadiene (trade name "UBEPOL BR150" manufactured by Ube Industries, Ltd.): 20 parts by mass (Blending Conditions)

The amount of each blending component to be added was indicated in parts by mass based on the amount of the rubber component excluding a rubber softener.

Silica 1 (trade name "Ultrasil 7000GR", manufactured by Evonik Degussa, nitrogen adsorption specific surface area: 170 m$^2$/g): 50.0 parts by mass Silica 2 (trade name "Zeosil Premium 200MP" manufactured by Rhodia, nitrogen adsorption specific surface area: 220 m$^2$/g): 25.0 parts by mass Carbon black (trade name "Seast KH (N339)", manufactured by Tokai Carbon Co., Ltd.): 5.0 parts by mass Silane coupling agent: (trade name "Si75", manufactured by Evonik Degussa, bis(triethoxysilylpropyl)disulfide): 6.0 parts by mass SRAE oil (trade name "Process NC140", manufactured by JX Nippon Oil & Energy Corporation): 30.0 parts by mass (including an amount precedently added as the rubber softener to be contained in each of the samples 2-1 to 2-29)

Zinc oxide: 2.5 parts by mass

Stearic acid: 1.0 part by mass

Anti-ageing agent (N-(1,3-dimethylbutyl)-N'-phenyl-p-phenylenediamine): 2.0 parts by mass Sulfur: 2.2 parts by mass Vulcanization accelerator 1 (N-cyclohexyl-2-benzothiazylsulfinamide): 1.7 parts by mass Vulcanization accelerator 2 (diphenylguanidine): 2.0 parts by mass Total: 239.4 parts by mass (Kneading Method)

The above-described materials were kneaded by the following method to obtain a rubber composition.

A closed kneader (having an internal volume of 0.3 L) equipped with a temperature controller was used to knead, as a first stage of kneading, the raw material rubber (each of the samples 1 to 29), the fillers (silica 1, silica 2 and carbon black), the silane coupling agent, the process oil, zinc oxide and stearic acid under conditions of a filling ratio of 65% and a rotor rotation speed of 30 to 50 rpm. Here, the temperature of the closed kneader was controlled to obtain each rubber composition (compound) at a discharging temperature of 155 to 160° C.

Next, after cooling the compound obtained as described above to room temperature, as a second stage of the kneading, the anti-ageing agent was added thereto, and the resultant was kneaded again to improve dispersibility of the silica. Also in this case, the discharging temperature for the compound was adjusted to 155 to 160° C. by the temperature controller of the kneader. After cooling, as a third stage of the kneading, sulfur and the vulcanization accelerators 1 and 2 were added, and the resultant was kneaded by an open roll set to 70° C. Thereafter, the resultant was molded and vulcanized at 160° C. for 20 minutes by a vulcanizing press.

The rubber compositions prior to the vulcanization, and the rubber compositions after the vulcanization were evaluated.

Specifically, the evaluations were performed by methods described below.

Results thus obtained are shown in Tables 19 to 22.

(Evaluation 1) Mooney Viscosity of Compound

Each compound obtained after the second stage of the kneading and before the third stage of the kneading was used as a sample to measure a viscosity by using a Mooney viscometer in accordance with ISO 289 after preheating the compound at 130° C. for 1 minute, and after rotating a rotor for 4 minutes at 2 rpm.

The thus obtained viscosity was shown as an index obtained assuming that the result of Comparative Example 2-7 or 2-11 was 100. A smaller index indicates better processability.

(Evaluation 2) Tensile Strength and Tensile Elongation

Tensile strength and tensile elongation were measured in accordance with a tensile test method according to JIS K6251, and were shown as indexes obtained assuming that results of Comparative Examples 2-7, 2-11 were 100. A larger index indicates better tensile strength and tensile elongation.

(Evaluation 3) Abrasion Resistance

An Acron abrasion tester (manufactured by Yasuda Seiki Seisakusho, Ltd.) was used to measure an abrasion amount through 1000 rotations at a load of 44.4 N in accordance with JIS K6264-2, and results were shown as indexes obtained assuming that the result of Comparative Examples 2-7, 2-11 were 100. A larger index indicates better abrasion resistance.

(Evaluation 4) Viscoelasticity Parameter

A viscoelasticity testing machine "ARES" manufactured by Rheometric Scientific, Inc. was used to measure a viscoelasticity parameter in a torsion mode. Each measured value was shown as an index obtained assuming that a result obtained by the rubber composition of Comparative Example 2-7 or 2-11 was 100.

An elastic modulus (G') measured at 50° C. at a frequency of 10 Hz and strain of 3% was used as an index of steering stability. A larger index indicates better steering stability.

TABLE 15

|  |  |  | Example 2-1 | Example 2-2 | Example 2-3 | Example 2-4 | Example 2-5 | Example 2-6 |
|---|---|---|---|---|---|---|---|---|
| Branched Conjugated Diene-based Polymer (Sample No.) | | | 2-1 | 2-2 | 2-3 | 2-4 | 2-5 | 2-6 |
| Polymerization | Butadiene | (g/min) | 18.6 | 18.6 | 18.6 | 18.6 | 24.3 | 17.2 |
| Conditions | Styrene | (g/min) | 10 | 10 | 10 | 10 | 4.3 | 11.4 |
| | n-Hexane | (g/min) | 175.2 | 175.2 | 175.2 | 175.2 | 175.2 | 175.2 |
| | Polymerization Temperature | (° C.) | 70 | 70 | 70 | 70 | 80 | 65 |
| | n-Butyllithium for Treatment | (mmol/min) | 0.103 | 0.103 | 0.103 | 0.103 | 0.103 | 0.103 |
| | n-Butyllithium as Polymerization Initiator | (mmol/min) | 0.143 | 0.143 | 0.143 | 0.143 | 0.143 | 0.143 |
| | Amount of Polar Material Added | (mmol/min) | 0.081 | 0.081 | 0.081 | 0.081 | 0.022 | 0.283 |
| Branching | Type | | BS-1 | BS-1 | BS-1 | BS-1 | BS-1 | BS-1 |
| Agent | Amount Added | (mmol/min) | 0.0191 | 0.0191 | 0.0191 | 0.0191 | 0.0191 | 0.0191 |
| Modifier | Type | | T-1 | T-2 | T-1 | T-2 | T-1 | T-1 |
| | Amount Added | | 0.073 | 0.145 | 0.045 | 0.099 | 0.073 | 0.073 |

TABLE 15-continued

| | | | | | | | | |
|---|---|---|---|---|---|---|---|---|
| | Coupling | Type | | — | — | SnCl$_4$ | SnCl$_4$ | — | — |
| | Agent | Amount Added | (mmol/min) | — | — | 0.011 | 0.011 | — | — |
| Physical Property Values | Conjugated Diene-based Polymer | (Physical Property 5) Weight Average Molecular Weight | (10$^4$ g/mol) | 63.9 | 63.9 | 64.2 | 64.2 | 62.4 | 63.2 |
| | | (Physical Property 5) Number Average Molecular Weight | (10$^4$ g/mol) | 33.1 | 33.1 | 33.3 | 33.3 | 30.9 | 34.5 |
| | | (Physical Property 5) Mw/Mn | | 1.93 | 1.93 | 1.93 | 1.93 | 2.02 | 1.83 |
| | | (Physical Property 1) Mooney Viscosity (110° C.) | | 93.1 | 93.1 | 94.2 | 94.2 | 87.6 | 90.2 |
| | Coupled Conjugated Diene-based Polymer or Modified Conjugated Diene-based Polymer | Type of Rubber Softener | | SRAE | SRAE | SRAE | SRAE | SRAE | SRAE |
| | | Amount of Rubber Softener Added | (phr) | 25 | 25 | 25 | 25 | 25 | 25 |
| | | (Physical Property 1) Mooney Viscosity (100° C.) | | 85 | 59 | 97.3 | 73 | 81 | 83 |
| | | (Physical Property 2) Branch Number Bn | | 4.7 | 4.2 | 5.6 | 4.8 | 4.6 | 4.7 |
| | | (Physical Property 5) Weight Average Molecular Weight | (10$^4$ g/mol) | 85.0 | 64.2 | 106.3 | 77.1 | 83.5 | 83.9 |
| | | (Physical Property 5) Number Average Molecular Weight | (10$^4$ g/mol) | 42.9 | 31.2 | 44.1 | 32.9 | 41.1 | 44.9 |
| | | (Physical Property 5) Mw/Mn | | 1.98 | 2.06 | 2.41 | 2.34 | 2.03 | 1.87 |
| | | (Physical Property 3) Silicon Atom Content | (ppm) | 84.1 | 163.2 | 53.7 | 112.1 | 83.9 | 83.2 |
| | | (Physical Property 4) Sulfur Atom Content | (ppm) | 92.5 | 163.4 | 65.8 | 117.8 | 93.6 | 92.7 |
| | | (Physical Properties 3, 4) Sulfur Atom/Silicon Atom Molar Ratio | (mol/mol) | 1.21 | 1.10 | 1.35 | 1.16 | 1.23 | 1.23 |
| | | (Physical Property 6) Amount of Bound Styrene | (mass %) | 35 | 35 | 35 | 35 | 15 | 40 |
| | | (Physical Property 7) Amount of Bound Vinyl (Amount of 1,2-Vinyl Bond) | (mol %) | 40 | 40 | 40 | 40 | 20 | 55 |

| | | | | Example 2-7 | Example 2-8 | Example 2-9 | Example 2-10 |
|---|---|---|---|---|---|---|---|
| | Branched Conjugated Diene-based Polymer (Sample No.) | | | 2-7 | 2-8 | 2-9 | 2-10 |
| Polymerization Conditions | Butadiene | | (g/min) | 18.6 | 18.6 | 18.6 | 18.6 |
| | Styrene | | (g/min) | 10 | 10 | 10 | 10 |
| | n-Hexane | | (g/min) | 175.2 | 175.2 | 175.2 | 175.2 |
| | Polymerization Temperature | | (° C.) | 70 | 70 | 70 | 70 |
| | n-Butyllithium for Treatment | | (mmol/min) | 0.103 | 0.103 | 0.103 | 0.103 |
| | n-Butyllithium as Polymerization Initiator | | (mmol/min) | 0.101 | 0.152 | 0.143 | 0.143 |
| | Amount of Polar Material Added | | (mmol/min) | 0.059 | 0.086 | 0.081 | 0.081 |
| | Branching Agent | Type | | BS-1 | BS-1 | BS-2 | BS-2 |
| | | Amount Added | (mmol/min) | 0.0139 | 0.0203 | 0.0383 | 0.0383 |
| | Modifier | Type | | T-1 | T-1 | T-1 | T-2 |
| | | Amount Added | (mmol/min) | 0.053 | 0.077 | 0.073 | 0.145 |
| | Coupling Agent | Type | | — | — | — | — |
| | | Amount Added | (mmol/min) | — | — | — | — |
| Physical Property Values | Conjugated Diene-based Polymer | (Physical Property 5) Weight Average Molecular Weight | (10$^4$ g/mol) | 73.1 | 39.8 | 60.3 | 60.3 |
| | | (Physical Property 5) Number Average Molecular Weight | (10$^4$ g/mol) | 37.5 | 20.8 | 32.2 | 32.2 |
| | | (Physical Property 5) Mw/Mn | | 1.95 | 1.91 | 1.87 | 1.87 |
| | | (Physical Property 1) Mooney Viscosity (110° C.) | | 121.4 | 32.1 | 88.2 | 88.2 |
| | Coupled Conjugated Diene-based Polymer or Modified Conjugated Diene-based Polymer | Type of Rubber Softener | | SRAE | SRAE | SRAE | SRAE |
| | | Amount of Rubber Softener Added | (phr) | 25 | 25 | 25 | 25 |
| | | (Physical Property 1) Mooney Viscosity (100° C.) | | 107 | 68 | 82 | 54 |
| | | (Physical Property 2) Branch Number Bn | | 4.5 | 4.5 | 2.4 | 1.8 |
| | | (Physical Property 5) Weight Average Molecular Weight | (10$^4$ g/mol) | 110.1 | 72.2 | 81.4 | 60.4 |
| | | (Physical Property 5) Number Average Molecular Weight | (10$^4$ g/mol) | 54.5 | 34.9 | 41.3 | 29.6 |
| | | (Physical Property 5) Mw/Mn | | 2.02 | 2.07 | 1.97 | 2.04 |
| | | (Physical Property 3) Silicon Atom Content | (ppm) | 57.1 | 137.2 | 85.2 | 161.9 |
| | | (Physical Property 4) Sulfur Atom Content | (ppm) | 63.5 | 153.7 | 113.8 | 182.3 |
| | | (Physical Properties 3, 4) Sulfur Atom/Silicon Atom Molar Ratio | (mol/mol) | 1.23 | 1.23 | 1.47 | 1.24 |
| | | (Physical Property 6) Amount of Bound Styrene | (mass %) | 35 | 35 | 35 | 35 |

TABLE 15-continued

|  |  |  | | | | |
|---|---|---|---|---|---|---|
| (Physical Property 7) Amount of Bound Vinyl (Amount of 1,2-Vinyl Bond) | (mol %) | | 40 | 40 | 40 | 40 |

TABLE 16

| | | | Example 2-11 | Example 2-12 | Example 2-13 | Example 2-14 | Example 2-15 | Example 2-16 |
|---|---|---|---|---|---|---|---|---|
| | Branched Conjugated Diene-based Polymer (Sample No.) | | 2-11 | 2-12 | 2-13 | 2-14 | 2-15 | 2-16 |
| Polymerization Conditions | Butadiene | (g/min) | 18.6 | 18.6 | 18.6 | 18.6 | 18.6 | 18.6 |
| | Styrene | (g/min) | 10 | 10 | 10 | 10 | 10 | 10 |
| | n-Hexane | (g/min) | 175.2 | 175.2 | 175.2 | 175.2 | 175.2 | 175.2 |
| | Polymerization Temperature | (° C.) | 70 | 70 | 70 | 70 | 70 | 70 |
| | n-Butyllithium for Treatment | (mmol/min) | 0.103 | 0.103 | 0.103 | 0.103 | 0.103 | 0.103 |
| | n-Butyllithium as Polymerization Initiator | (mmol/min) | 0.143 | 0.143 | 0.143 | 0.143 | 0.143 | 0.143 |
| | Amount of Polar Material Added | (mmol/min) | 0.081 | 0.081 | 0.081 | 0.081 | 0.081 | 0.081 |
| | Branching Agent Type | | BS-3 | BS-3 | BS-4 | BS-4 | BS-5 | BS-5 |
| | Amount Added | (mmol/min) | 0.0255 | 0.0255 | 0.0109 | 0.0109 | 0.0191 | 0.0191 |
| | Modifier Type | | T-1 | T-2 | T-1 | T-2 | T-1 | T-2 |
| | Amount Added | (mmol/min) | 0.073 | 0.145 | 0.073 | 0.145 | 0.073 | 0.145 |
| | Coupling Type | | — | — | — | — | — | — |
| | Agent Amount Added | (mmol/min) | — | — | — | — | — | — |
| Physical Property Values | Conjugated Diene-based Polymer | (Physical Property 5) Weight Average Molecular Weight ($10^4$ g/mol) | 73.9 | 73.9 | 61.8 | 61.8 | 64.1 | 64.1 |
| | | (Physical Property 5) Number Average Molecular Weight ($10^4$ g/mol) | 37.7 | 37.7 | 31.9 | 31.9 | 33.4 | 33.4 |
| | | (Physical Property 5) Mw/Mn | 1.96 | 1.96 | 1.94 | 1.94 | 1.92 | 1.92 |
| | | (Physical Property 1) Mooney Viscosity (110° C.) | 99.3 | 99.3 | 90.1 | 90.1 | 92.1 | 92.1 |
| | Coupled Conjugated Diene-based Polymer or Modified Conjugated Diene-based Polymer | Type of Rubber Softener | SRAE | SRAE | SRAE | SRAE | SRAE | SRAE |
| | | Amount of Rubber Softener Added (phr) | 25 | 25 | 25 | 25 | 25 | 25 |
| | | (Physical Property 1) Mooney Viscosity (100° C.) | 83 | 57 | 88 | 60 | 83 | 57 |
| | | (Physical Property 2) Branch Number Bn | 3.6 | 2.3 | 12.5 | 5.6 | 4.8 | 3.2 |
| | | (Physical Property 5) Weight Average Molecular Weight ($10^4$ g/mol) | 83.6 | 63.1 | 88.3 | 63.6 | 85.2 | 63.8 |
| | | (Physical Property 5) Number Average Molecular Weight ($10^4$ g/mol) | 42.7 | 30.5 | 42.9 | 30.0 | 43.5 | 31.4 |
| | | (Physical Property 5) Mw/Mn | 1.96 | 2.07 | 2.06 | 2.12 | 1.96 | 2.03 |
| | | (Physical Property 3) Silicon Atom Content (ppm) | 83.8 | 161.1 | 85.3 | 162.2 | 84.4 | 163.2 |
| | | (Physical Property 4) Sulfur Atom Content (ppm) | 98.1 | 170.1 | 85.6 | 155.1 | 93.4 | 163.5 |
| | | (Physical Properties 3, 4) Sulfur Atom/Silicon Atom Molar Ratio (mol/mol) | 1.29 | 1.16 | 1.11 | 1.05 | 1.22 | 1.10 |
| | | (Physical Property 6) Amount of Bound Styrene (mass %) | 35 | 35 | 35 | 35 | 35 | 35 |
| | | (Physical Property 7) Amount of Bound Vinyl (Amount of 1,2-Vinyl Bond) (mol %) | 40 | 40 | 40 | 40 | 40 | 40 |

| | | | Example 2-17 | Example 2-18 | Example 2-19 | Example 2-20 | Example 2-21 |
|---|---|---|---|---|---|---|---|
| | Branched Conjugated Diene-based Polymer (Sample No.) | | 2-17 | 2-18 | 2-19 | 2-20 | 2-21 |
| Polymerization Conditions | Butadiene | (g/min) | 18.6 | 18.6 | 18.6 | 18.6 | 18.6 |
| | Styrene | (g/min) | 10 | 10 | 10 | 10 | 10 |
| | n-Hexane | (g/min) | 175.2 | 175.2 | 175.2 | 175.2 | 175.2 |
| | Polymerization Temperature | (° C.) | 70 | 70 | 70 | 70 | 70 |
| | n-Butyllithium for Treatment | (mmol/min) | 0.103 | 0.103 | 0.103 | 0.103 | 0.103 |
| | n-Butyllithium as Polymerization Initiator | (mmol/min) | 0.143 | 0.143 | 0.143 | 0.143 | 0.143 |
| | Amount of Polar Material Added | (mmol/min) | 0.081 | 0.081 | 0.081 | 0.081 | 0.081 |
| | Branching Agent Type | | BS-1 | BS-1 | BS-1 | BS-1 | BS-1 |
| | Amount Added | (mmol/min) | 0.0191 | 0.0191 | 0.0191 | 0.0191 | 0.0191 |
| | Modifier Type | | T-1 | T-1 | T-1 | T-1 | T-1 |
| | Amount Added | (mmol/min) | 0.073 | 0.073 | 0.073 | 0.073 | 0.073 |
| | Coupling Type | | — | — | — | — | — |
| | Agent Amount Added | (mmol/min) | — | — | — | — | — |
| Physical Property | Conjugated Diene-based | (Physical Property 5) Weight Average Molecular Weight ($10^4$ g/mol) | 63.9 | 63.9 | 63.9 | 63.9 | 63.9 |

TABLE 16-continued

| | | | | | | | | |
|---|---|---|---|---|---|---|---|---|
| Values | Polymer | (Physical Property 5) Number Average Molecular Weight | ($10^4$ g/mol) | 33.1 | 33.1 | 33.1 | 33.1 | 33.1 |
| | | (Physical Property 5) Mw/Mn | | 1.93 | 1.93 | 1.93 | 1.93 | 1.93 |
| | | (Physical Property 1) Mooney Viscosity (110° C.) | | 93.1 | 93.1 | 93.1 | 93.1 | 93.1 |
| | Coupled Conjugated Diene-based Polymer or Modified Conjugated Diene-based Polymer | Type of Rubber Softener | | — | SRAE | Naphthenic oil | Liquid rubber | Resin |
| | | Amount of Rubber Softener Added | (phr) | 0 | 37.5 | 25 | 25 | 25 |
| | | (Physical Property 1) Mooney Viscosity (100° C.) | | 148 | 57 | 97 | 87 | 95 |
| | | (Physical Property 2) Branch Number Bn | | 4.3 | 4.2 | 4.2 | 4.2 | 4.2 |
| | | (Physical Property 5) Weight Average Molecular Weight | ($10^4$ g/mol) | 85.0 | 85.0 | 85.0 | 85.0 | 85.0 |
| | | (Physical Property 5) Number Average Molecular Weight | ($10^4$ g/mol) | 42.9 | 42.9 | 42.9 | 42.9 | 42.9 |
| | | (Physical Property 5) Mw/Mn | | 1.98 | 1.98 | 1.98 | 1.98 | 1.98 |
| | | (Physical Property 3) Silicon Atom Content | (ppm) | 84.5 | 84.7 | 85.2 | 85 | 84.2 |
| | | (Physical Property 4) Sulfur Atom Content | (ppm) | 93.4 | 92.8 | 93.5 | 92.2 | 92.8 |
| | | (Physical Properties 3, 4) Sulfur Atom/Silicon Atom Molar Ratio | (mol/mol) | 1.22 | 1.21 | 1.21 | 1.20 | 1.21 |
| | | (Physical Property 6) Amount of Bound Styrene | (mass %) | 35 | 35 | 35 | 35 | 35 |
| | | (Physical Property 7) Amount of Bound Vinyl (Amount of 1,2-Vinyl Bond) | (mol %) | 40 | 40 | 40 | 40 | 40 |

TABLE 17

| | | | | Comparative Example 2-1 | Comparative Example 2-2 | Comparative Example 2-3 | Comparative Example 2-4 |
|---|---|---|---|---|---|---|---|
| Coupled or Modified Conjugated Diene-based Polymer (Sample No.) | | | | 2-24 | 2-25 | 2-26 | 2-27 |
| Polymerization Conditions | Butadiene | | (g/min) | 18.6 | 18.6 | 18.6 | 18.6 |
| | Styrene | | (g/min) | 10 | 10 | 10 | 10 |
| | n-Hexane | | (g/min) | 175.2 | 175.2 | 175.2 | 175.2 |
| | Polymerization Temperature | | (° C.) | 70 | 70 | 70 | 70 |
| | n-Butyllithium for Treatment | | (mmol/min) | 0.103 | 0.103 | 0.103 | 0.103 |
| | n-Butyllithium as Polymerization Initiator | | (mmol/min) | 0.143 | 0.143 | 0.143 | 0.143 |
| | Amount of Polar Material Added | | (mmol/min) | 0.081 | 0.081 | 0.081 | 0.081 |
| | Branching Agent | Type | | — | — | — | — |
| | | Amount Added | (mmol/min) | — | — | — | — |
| | Modifier | Type | | T-1 | T-2 | T-1 | T-2 |
| | | Amount Added | (mmol/min) | 0.073 | 0.145 | 0.045 | 0.099 |
| | Coupling Agent | Type | | — | — | SnCl$_4$ | SnCl$_4$ |
| | | Amount Added | (mmol/min) | — | — | 0.011 | 0.011 |
| Physical Property Values | Conjugated Diene-based Polymer | (Physical Property 5) Weight Average Molecular Weight | ($10^4$ g/mol) | 48.2 | 48.2 | 48.2 | 48.2 |
| | | (Physical Property 5) Number Average Molecular Weight | ($10^4$ g/mol) | 27.3 | 27.3 | 27.3 | 27.3 |
| | | (Physical Property 5) Mw/Mn | | 1.77 | 1.77 | 1.77 | 1.77 |
| | | (Physical Property 1) Mooney Viscosity (110° C.) | | 71.8 | 71.8 | 71.8 | 71.8 |
| | Coupled Conjugated Diene-based Polymer or Modified Conjugated Diene-based Polymer | Type of Rubber Softener | | SRAE | SRAE | SRAE | SRAE |
| | | Amount of Rubber Softener Added | (phr) | 25 | 25 | 25 | 25 |
| | | (Physical Property 1) Mooney Viscosity (100° C.) | | 56 | 38 | 72 | 52 |
| | | (Physical Property 2) Branch Number Bn | | 0.7 | 0.6 | 5.2 | 3.5 |
| | | (Physical Property 5) Weight Average Molecular Weight | ($10^4$ g/mol) | 62.8 | 48.7 | 69.6 | 59.1 |
| | | (Physical Property 5) Number Average Molecular Weight | ($10^4$ g/mol) | 32.9 | 25.2 | 30.8 | 27.1 |
| | | (Physical Property 5) Mw/Mn | | 1.91 | 1.93 | 2.26 | 2.18 |
| | | (Physical Property 3) Silicon Atom Content | (ppm) | 84.2 | 162.9 | 52.7 | 52.2 |
| | | (Physical Property 4) Sulfur Atom Content | (ppm) | 74.7 | 145.2 | 45.7 | 47.2 |

TABLE 17-continued

|  |  |  | Comparative Example 2-1 | Comparative Example 2-2 | Comparative Example 2-3 | Comparative Example 2-4 |
|---|---|---|---|---|---|---|
| | (Physical Properties 3, 4) Sulfur Atom/Silicon Atom Molar Ratio | (mol/mol) | 0.98 | 0.98 | 0.96 | 1.00 |
| | (Physical Property 6) Amount of Bound Styrene | (mass %) | 35 | 35 | 35 | 35 |
| | (Physical Property 7) Amount of Bound Vinyl (Amount of 1,2-Vinyl Bond) | (mol %) | 40 | 40 | 40 | 40 |

TABLE 18

|  |  |  |  | Example 2-22 | Example 2-23 | Comparative Example 2-5 | Comparative Example 2-6 |
|---|---|---|---|---|---|---|---|
| | Coupled Conjugated Diene-based Polymer (Sample No.) | | | 2-22 | 2-23 | 2-28 | 2-29 |
| Polymerization Conditions | | Butadiene | (g) | 478.3/53.1 | 478.3/53.1 | 478.3/53.1 | 478.3/53.1 |
| | | Styrene | (g) | 286.2 | 286.2 | 286.2 | 286.2 |
| | | n-Hexane | (g) | 5022 | 5022 | 5022 | 5022 |
| | | Polymerization Start Temperature | (° C.) | 40 | 40 | 40 | 40 |
| | | n-Butyllithium as Polymerization Initiator | (mmol) | 4.402 | 4.402 | 4.402 | 4.402 |
| | | Amount of Polar Material Added | (mmol) | 1.803 | 1.803 | 1.803 | 1.803 |
| | Branching Agent | Type | | BS-1 | BS-1 | — | — |
| | | Amount Added | (mmol) | 0.5460 | 0.546 | — | — |
| | Modifier | Type | | T-1 | T-2 | T-1 | T-2 |
| | | Amount Added | (mmol) | 1.286 | 2.572 | 1.286 | 2.572 |
| | Coupling Agent | Type | | SnCl4 | SnCl4 | SnCl4 | SnCl4 |
| | | Amount Added | (mmol) | 0.314 | 0.314 | 0.314 | 0.314 |
| Physical Property Values | Conjugated Diene-based Polymer | (Physical Property 5) Weight Average Molecular Weight | ($10^4$ g/mol) | 38.4 | 38.1 | 37.6 | 38.9 |
| | | (Physical Property 5) Number Average Molecular Weight | ($10^4$ g/mol) | 31.7 | 31.0 | 30.8 | 30.6 |
| | | (Physical Property 5) Mw/Mn | | 1.21 | 1.23 | 1.22 | 1.27 |
| | | (Physical Property 1) Mooney Viscosity (110° C.) | | 42.4 | 41.7 | 41.6 | 43.1 |
| | Coupled Conjugated Diene-based Polymer or Modified Conjugated Diene-based Polymer | (Physical Property 1) Mooney Viscosity (100° C.) | | 82 | 74 | 74 | 67 |
| | | (Physical Property 2) Branch Number Bn | | 5.2 | 4.2 | 3.6 | 3.5 |
| | | (Physical Property 5) Weight Average Molecular Weight | ($10^4$ g/mol) | 51.7 | 45.1 | 44.9 | 40.6 |
| | | (Physical Property 5) Number Average Molecular Weight | ($10^4$ g/mol) | 36.4 | 32.7 | 32.5 | 28.6 |
| | | (Physical Property 5) Mw/Mn | | 1.42 | 1.38 | 1.38 | 1.42 |
| | | (Physical Property 3) Silicon Atom Content | (ppm) | 67.8 | 113.8 | 45.8 | 91.4 |
| | | (Physical Property 4) Sulfur Atom Content | (ppm) | 46.3 | 86.6 | 41.5 | 83.1 |
| | | (Physical Properties 3, 4) Sulfur Atom/Silicon Atom Molar Ratio | (mol/mol) | 1.61 | 1.45 | 1.00 | 1.00 |
| | | (Physical Property 6) Amount of Bound Styrene | (mass %) | 35 | 35 | 35 | 35 |
| | | (Physical Property 7) Amount of Bound Vinyl (Amount of 1,2-Vinyl Bond) | (mol %) | 40 | 40 | 40 | 40 |

TABLE 19

|  | Example 2-24 | Example 2-25 | Example 2-26 | Example 2-27 | Example 2-28 | Example 2-29 |
|---|---|---|---|---|---|---|
| Branched Conjugated Diene-based Polymer (Sample No.) | 2-1 | 2-2 | 2-3 | 2-4 | 2-5 | 2-6 |
| (Physical Property 1) Mooney Viscosity of Conjugated Diene-based Polymer (100° C.) | 85 | 59 | 97 | 73 | 81 | 83 |
| (Evaluation 1) Mooney Viscosity of Compound Index (130° C.) | 102 | 97 | 107 | 95 | 105 | 102 |

TABLE 19-continued

| Physical Property Values | | | | | | | | |
|---|---|---|---|---|---|---|---|---|
| | (Evaluation 2) Tensile Strength | Index | 134 | 130 | 138 | 134 | 151 | 129 |
| | (Evaluation 2) Tensile Elongation | Index | 118 | 122 | 115 | 117 | 129 | 114 |
| | (Evaluation 3) Abrasion Resistance | Index | 142 | 140 | 138 | 140 | 158 | 126 |
| | (Evaluation 4) 50° C. Elastic Modulus (strain: 3%) | Index | 117 | 118 | 115 | 117 | 139 | 110 |

| | | | Example 2-30 | Example 2-31 | Example 2-32 | Example 2-33 |
|---|---|---|---|---|---|---|
| Branched Conjugated Diene-based Polymer (Sample No.) | | | 2-7 | 2-8 | 2-9 | 2-10 |
| (Physical Property 1) Mooney Viscosity of Conjugated Diene-based Polymer (100° C.) | | | 107 | 68 | 82 | 54 |
| (Evaluation 1) Mooney Viscosity of Compound (130° C.) | | Index | 114 | 85 | 102 | 92 |
| Physical Property Values | (Evaluation 2) Tensile Strength | Index | 162 | 115 | 138 | 132 |
| | (Evaluation 2) Tensile Elongation | Index | 129 | 120 | 122 | 121 |
| | (Evaluation 3) Abrasion Resistance | Index | 163 | 121 | 148 | 137 |
| | (Evaluation 4) 50° C. Elastic Modulus (strain: 3%) | Index | 127 | 114 | 119 | 116 |

TABLE 20

| | | | Example 2-34 | Example 2-35 | Example 2-36 | Example 2-37 | Example 2-38 | Example 2-39 |
|---|---|---|---|---|---|---|---|---|
| Branched Conjugated Diene-based Polymer (Sample No.) | | | 2-11 | 2-12 | 2-13 | 2-14 | 2-15 | 2-16 |
| (Physical Property 1) Mooney Viscosity of Conjugated Diene-based Polymer (100° C.) | | | 83 | 57 | 88 | 60 | 83 | 57 |
| (Evaluation 1) Mooney Viscosity of Compound (130° C.) | | Index | 102 | 94 | 100 | 90 | 106 | 96 |
| Physical Property Values | (Evaluation 2) Tensile Strength | Index | 131 | 128 | 142 | 140 | 135 | 132 |
| | (Evaluation 2) Tensile Elongation | Index | 127 | 120 | 126 | 128 | 120 | 125 |
| | (Evaluation 3) Abrasion Resistance | Index | 138 | 137 | 145 | 138 | 145 | 143 |
| | (Evaluation 4) 50° C. Elastic Modulus (strain: 3%) | Index | 116 | 119 | 127 | 124 | 121 | 119 |

| | | | Example 2-40 | Example 2-41 | Example 2-42 | Example 2-43 | Example 2-44 |
|---|---|---|---|---|---|---|---|
| Branched Conjugated Diene-based Polymer (Sample No.) | | | 2-17 | 2-18 | 2-19 | 2-20 | 2-21 |
| (Physical Property 1) Mooney Viscosity of Conjugated Diene-based Polymer (100° C.) | | | 148 | 57 | 97 | 87 | 95 |
| (Evaluation 1) Mooney Viscosity of Compound (130° C.) | | Index | 106 | 104 | 105 | 106 | 110 |
| Physical Property Values | (Evaluation 2) Tensile Strength | Index | 134 | 137 | 130 | 134 | 146 |
| | (Evaluation 2) Tensile Elongation | Index | 119 | 123 | 121 | 137 | 134 |
| | (Evaluation 3) Abrasion Resistance | Index | 143 | 138 | 137 | 141 | 152 |
| | (Evaluation 4) 50° C. Elastic Modulus (strain: 3%) | Index | 119 | 116 | 124 | 143 | 155 |

TABLE 21

| | | | Comparative Example 2-7 | Comparative Example 2-8 | Comparative Example 2-9 | Comparative Example 2-10 |
|---|---|---|---|---|---|---|
| Coupled or Modified Conjugated Diene-based Polymer (Sample No.) | | | 2-24 | 2-25 | 2-26 | 2-27 |
| (Physical Property 1) Mooney Viscosity of Conjugated Diene-based Polymer (100° C.) | | | 56 | 38 | 72 | 52 |
| (Evaluation 1) Mooney Viscosity of Compound (130° C.) | | Index | 100 | 92 | 102 | 97 |
| Physical Property Values | (Evaluation 2) Tensile Strength | Index | 100 | 71 | 101 | 83 |
| | (Evaluation 2) Tensile Elongation | Index | 100 | 83 | 92 | 88 |
| | (Evaluation 3) Abrasion Resistance | Index | 100 | 74 | 103 | 78 |
| | (Evaluation 4) 50° C. Elastic Modulus (strain: 3%) | Index | 100 | 93 | 102 | 91 |

TABLE 22

|  | | Example 2-45 | Example 2-46 | Comparative Example 2-11 | Comparative Example 2-12 |
|---|---|---|---|---|---|
| Coupled Conjugated Diene-based Polymer (Sample No.) | | 2-22 | 2-23 | 2-28 | 2-29 |
| (Physical Property 1) Mooney Viscosity of Conjugated Diene-based Polymer (100° C.) | | 82 | 74 | 74 | 67 |
| (Evaluation 1) Mooney Viscosity of Compound (130° C.) | Index | 103 | 96 | 100 | 92 |
| Physical | (Evaluation 2) Tensile Strength Index | 122 | 114 | 100 | 98 |
| Property | (Evaluation 2) Tensile Elongation Index | 105 | 108 | 100 | 102 |
| Values | (Evaluation 3) Abrasion Resistance Index | 127 | 120 | 100 | 81 |
|  | (Evaluation 4) 50° C. Elastic Modulus (strain: 3%) Index | 129 | 125 | 100 | 87 |

It was confirmed that Examples 2-24 to 2-46 have, as compared with Comparative Examples 2-7 to 2-12, a low Mooney viscosity of the compound when used for obtaining a vulcanizate and exhibit good processability, are excellent in fracture performance and abrasion resistance when in the form of a vulcanizate, and are good in steering stability.

INDUSTRIAL APPLICABILITY

A branched conjugated diene-based polymer according to the present invention is industrially applicable in the fields of tire treads, interiors and exteriors of vehicles, anti-vibration rubbers, belts, shoes, foam bodies, and various industrial products.

What is claimed is:

1. A production method for a branched conjugated diene-based polymer, comprising the following sequential steps:
   (i) a polymerizing step of obtaining a conjugated diene-based polymer having an active end by polymerizing or copolymerizing a conjugated diene compound, or a conjugated diene compound and an aromatic vinyl compound with an organic lithium-based compound used as a polymerization initiator;
   (ii) a branching step of introducing a branch structure by reacting a styrene derivative as a branching agent with the active end of the conjugated diene-based polymer, wherein the active end reacts with a vinyl group and a functional group of the styrene derivative, respectively, and the active end reacted with the vinyl group polymerizes with the conjugated diene compound and/or the aromatic vinyl compound while retaining a polymerization activity;
   (iii) adding a second conjugated diene compound and/or a second aromatic vinyl compound to a reaction system during and/or after the branching step such that the second conjugated diene compound and/or the second aromatic vinyl compound reacts with the active end of the conjugated diene-based polymer; and
   (iv) a reaction step of reacting a coupling agent containing silicon and a sulfur atom with the active end of the conjugated diene-based polymer resulting from the branching step.

2. The production method for the branched conjugated diene-based polymer according to claim 1, wherein the coupling agent is, in the reaction step, a silane sulfide compound represented by the following formula (3):

$$(R^1O)_x(R^2)_ySi\text{—}R^3\text{—}S\text{—}SiR^4_3 \quad (3)$$

wherein Si represents a silicon atom, O represents an oxygen atom, and S represents a sulfur atom;
x represents an integer of 1 to 3, y represents 0, or an integer of 1 to 2, and x+y is 3; and $R^1$, $R^2$, and $R^4$ may be the same or different, and represent an alkyl group having 1 to 16 carbon atoms, and $R^3$ represents an aryl group having 6 to 16 carbon atoms, an alkylene group having 1 to 16 carbon atoms, or an alkyl chain having 1 to 16 carbon atoms.

3. The production method for the branched conjugated diene-based polymer according to claim 1, wherein the styrene derivative is a compound represented by the following formula (1) and/or formula (2):

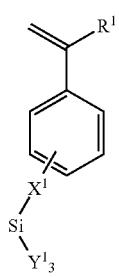

(1)

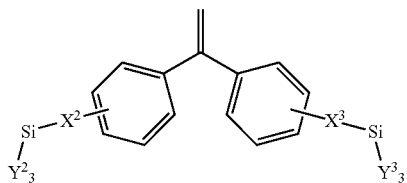

(2)

wherein $R^1$ represents any one selected from the group consisting of a hydrogen atom, an alkyl group having 1 to 20 carbon atoms, and an aryl group having 6 to 20 carbon atoms, and may have a branch structure in a part thereof;
$X^1$, $X^2$ and $X^3$ represent a single bond, or an organic group containing any one selected from the group consisting of carbon, hydrogen, nitrogen, sulfur, and oxygen,
$Y^1$, $Y^2$ and $Y^3$ represent any one selected from the group consisting of an alkyl group having 1 to 20 carbon atoms, an alkoxy group having 1 to 20 carbon atoms, and a halogen atom; and they are respectively independent and may be the same or different.

4. A production method for a rubber composition, comprising:
   a step of obtaining a branched conjugated diene-based polymer by the production method according to claim 1;
   a step of obtaining a rubber component containing 10% by mass or more of the branched conjugated diene-based polymer; and a step of obtaining a rubber composition by causing 5.0 parts by mass or more and 150 parts by mass or less of a filler to be contained based on 100 parts by mass of the rubber component.

5. A production method for a tire, comprising:
a step of obtaining a rubber composition by the production method for the rubber composition according to claim 4; and
a step of obtaining a tire by molding the rubber composition.

6. The production method for the branched conjugated diene-based polymer according to claim 1, wherein the branched conjugated diene-based polymer has a branch number (Bn) obtained by viscosity detector-equipped GPC-light scattering measurement of 4.2 or more.

7. The production method for the branched conjugated diene-based polymer according to claim 1, wherein the polymerizing step of obtaining the conjugated diene-based polymer having the active end comprises the polymerizing the conjugated diene compound.

8. The production method for the branched conjugated diene-based polymer according to claim 1, wherein the polymerizing step of obtaining the conjugated diene-based polymer having the active end comprises the copolymerizing the conjugated diene compound and the aromatic vinyl compound.

9. The production method for the branched conjugated diene-based polymer according to claim 1, wherein the adding comprises the adding the second conjugated diene compound.

10. The production method for the branched conjugated diene-based polymer according to claim 1, wherein the adding comprises the adding the second aromatic vinyl compound.

11. The production method for the branched conjugated diene-based polymer according to claim 1, wherein the adding comprises the adding the second conjugated diene compound and the second aromatic vinyl compound.

12. The production method for the branched conjugated diene-based polymer according to claim 1, wherein the first and second conjugated diene compounds are the same or different from each other.

* * * * *